US006016356A

United States Patent [19]
Ito et al.

[11] Patent Number: 6,016,356
[45] Date of Patent: *Jan. 18, 2000

[54] IMAGE SUPERPOSITION PROCESSING METHOD

[75] Inventors: Wataru Ito; Hiroaki Yasuda; Shoji Nanami, all of Kanagawa-ken, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,970

[22] Filed: Oct. 24, 1997

Related U.S. Application Data

[63] Continuation of application No. 08/406,076, Mar. 17, 1995, abandoned.

[30] Foreign Application Priority Data

| Mar. 31, 1994 | [JP] | Japan | 6-062476 |
| Apr. 8, 1994 | [JP] | Japan | 6-070748 |
| Apr. 15, 1994 | [JP] | Japan | 6-077034 |
| Apr. 15, 1994 | [JP] | Japan | 6-077035 |
| Jun. 30, 1994 | [JP] | Japan | 6-149380 |
| Oct. 14, 1994 | [JP] | Japan | 6-249614 |
| Oct. 17, 1994 | [JP] | Japan | 6-250909 |

[51] Int. Cl.[7] .................................... G06K 9/00
[52] U.S. Cl. ................................ 382/132; 382/284
[58] Field of Search .................... 382/128, 130, 382/132, 284; 348/584; 358/450; 378/62, 98.11; 250/584, 587

[56] References Cited

U.S. PATENT DOCUMENTS

| 4,346,295 | 8/1982 | Tanaka et al. | 250/327.2 |
| 4,356,398 | 10/1982 | Komaki et al. | 250/327.2 |
| 5,048,110 | 9/1991 | Nukajima | 382/130 |
| 5,172,418 | 12/1992 | Ito et al. | 382/128 |
| 5,325,449 | 6/1994 | Burt et al. | 382/284 |
| 5,488,674 | 1/1996 | Burt et al. | 348/584 |
| 5,535,289 | 7/1996 | Ito | 382/130 |

FOREIGN PATENT DOCUMENTS

| 0319303 | 6/1989 | European Pat. Off. | G06F 15/68 |
| 0604291 | 6/1994 | European Pat. Off. | G06F 15/68 |
| 0629964 | 12/1994 | European Pat. Off. | G06F 15/68 |
| 65-117212 | 6/1985 | Japan | G02B 26/10 |
| 62-90615 | 4/1987 | Japan | G02B 26/10 |

OTHER PUBLICATIONS

Rioul et al, "Wavelets and Signal Processing", IEEE SP Magazine, Oct. 1991, pp. 14–38.
Mallat, "Zero–Crossings of a Wavelet Transform", IEE Transactions on Information Theory, vol. 17, No. 4, Jul. 1991, pp. 1019–1033.
Abstract of JP–A–62–090615.
Abstract of JP–A–60–117212.
Proceedings of the SPIE—The International Society for Optical Engineering, vol. 1828, Nov. 15, 1992, USA pp. 124–131, Akermann A III 'Pyramidal Techniques for Multisensor Fusion'.

*Primary Examiner*—Christopher S. Kelley
*Attorney, Agent, or Firm*—Sughrue, Mion, Zinn Macpeak & Seas, PLLC

[57] ABSTRACT

A plurality of image signals are obtained, which represent a radiation image of a single object or radiation images of the single object, and which have different frequency characteristics, each of the image signals being made up of a series of image signal components. The image signal components of the plurality of the image signals, which image signal components represent corresponding picture elements, are weighted with predetermined weight factors. The weighted image signal components of the plurality of the image signals, which image signal components represent corresponding picture elements, are added to one another, and an addition signal is thereby obtained. The value of the weight factor with respect to the frequency components, which have a low signal-to-noise ratio, is rendered smaller than the value of the weight factor with respect to the frequency components, which have a high signal-to-noise ratio, in accordance with the frequency characteristics of each of the image signals.

43 Claims, 31 Drawing Sheets

F I G. 16
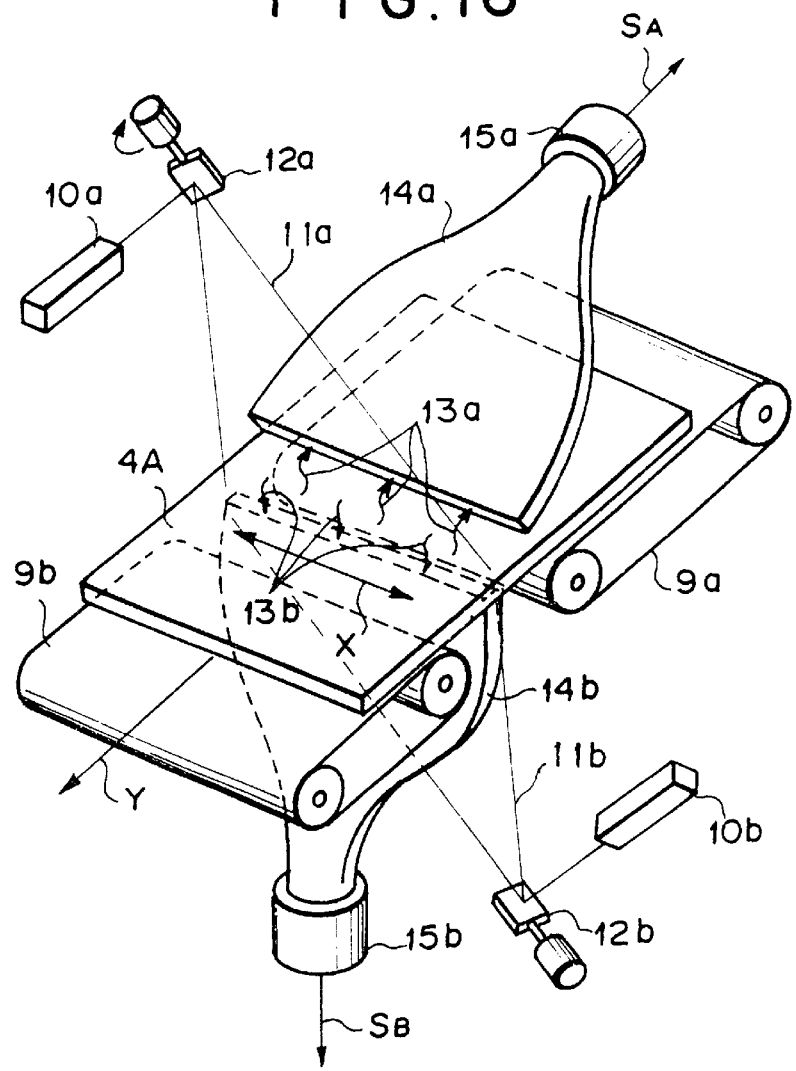
F I G. 17
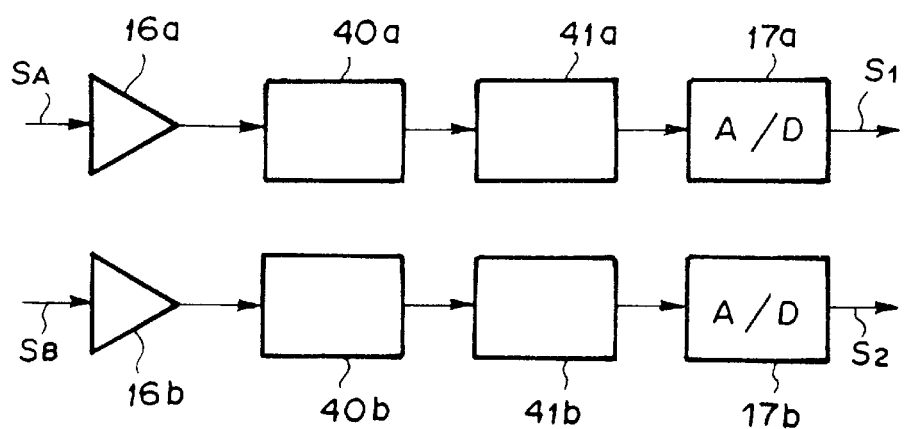

F I G. 21
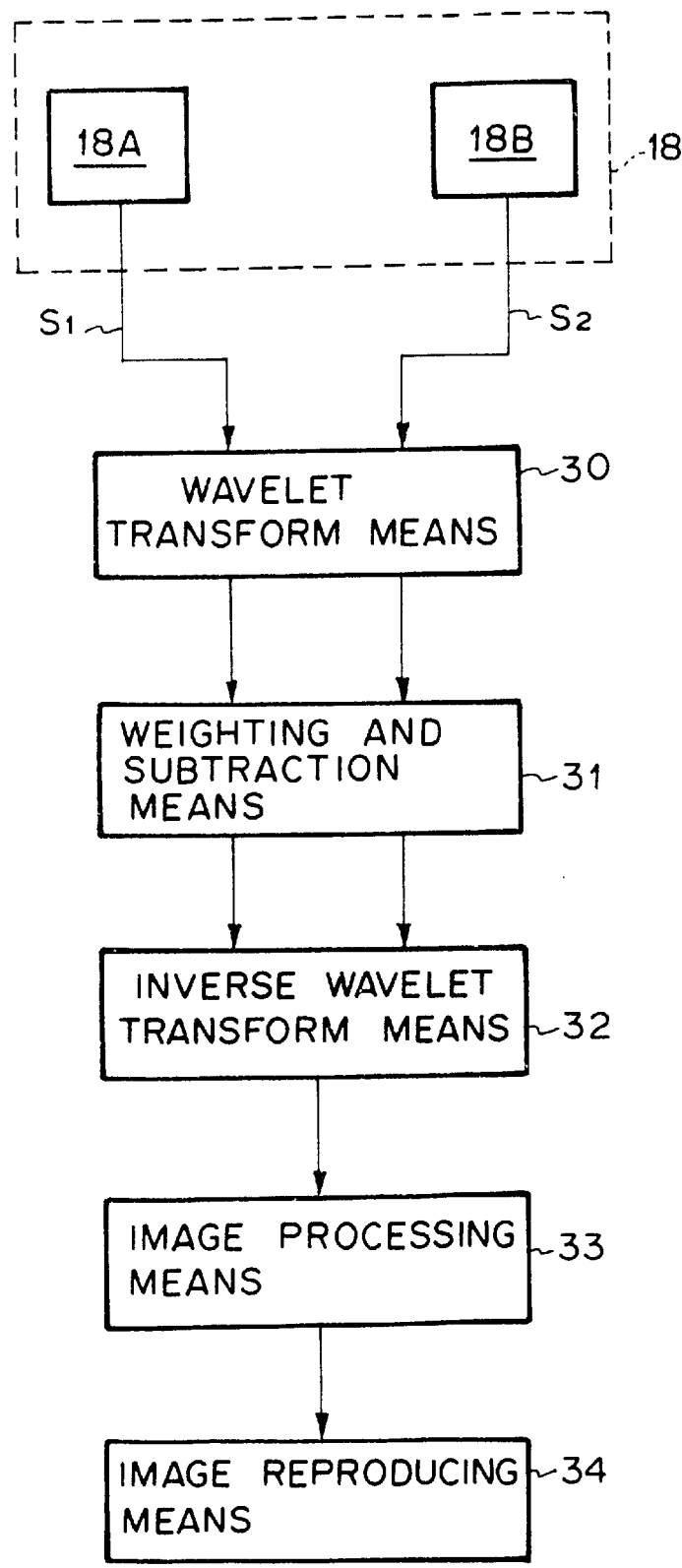

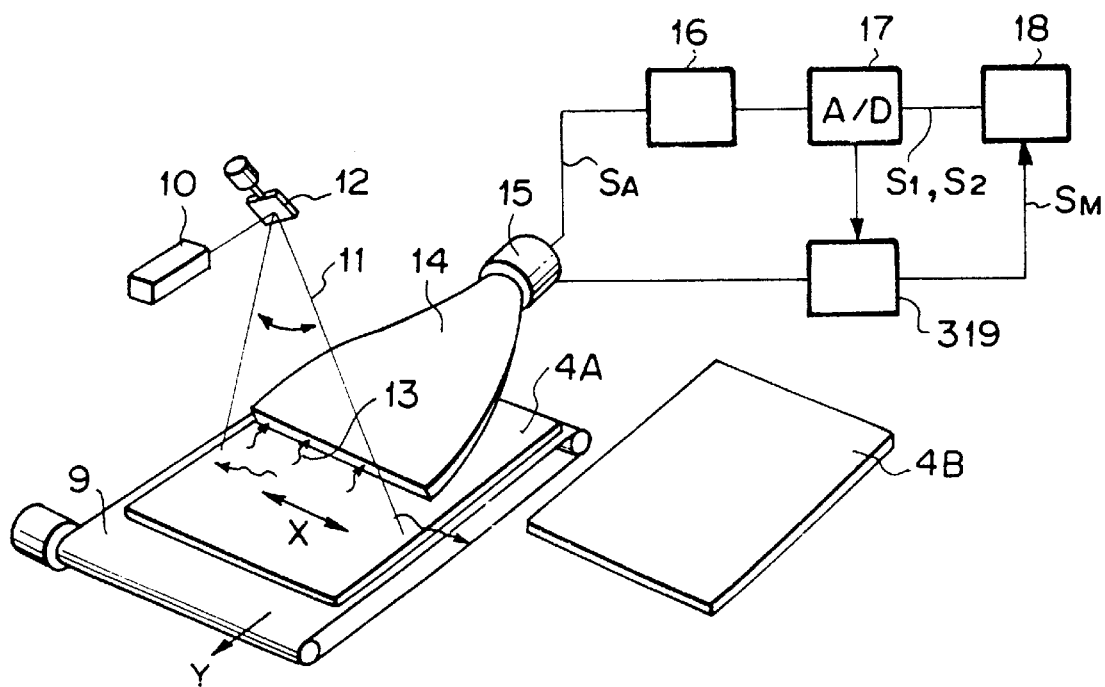
F I G. 40

IMAGE SUPERPOSITION PROCESSING METHOD

This is a Continuation of application Ser. No. 08/406,076, filed on Mar. 17, 1995 now abandoned.

BACKGROUND OF THE INVENTION

1. Field of the Invention

This invention relates to a superposition processing method for a radiation image, wherein an addition process is carried out on a plurality of image signals, which represent a radiation image of a single object or radiation images of the single object. This invention also relates to an energy subtraction processing method, wherein a subtraction process is carried out on a plurality of image signals representing radiation images of a single object.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, the X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high graininess, or the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

Techniques for carrying out superposition processing on radiation images have heretofore been disclosed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object can be detected accurately in the radiation image. The extent, to which such differences in the radiation energy absorption characteristics can be detected in a radiation image, is referred to as the contrast detection performance or simply as the detection performance. A radiation image having better detection performance has better image quality and can serve as a more effective tool in, particularly, the efficient and accurate diagnosis of an illness. Therefore, in order for the image quality to be improved, it is desirable that the detection performance of the radiation image may be enhanced. Practically, the detection performance is adversely affected by various noises.

For example, in radiation image recording and reproducing systems using stimulable phosphor sheets, it has been found that the noises described below occur during the step for recording a radiation image on a stimulable phosphor sheet and reading out the radiation image therefrom.

(1) A quantum noise of radiation produced by a radiation source.

(2) A noise due to nonuniformity in how a stimulable phosphor coated on the stimulable phosphor sheet is distributed or how stimulable phosphor grains are distributed on the stimulable phosphor sheet.

(3) A noise of stimulating rays, which cause the stimulable phosphor sheet to emit light in proportion to the amount of energy stored thereon during its exposure to radiation.

(4) A noise of light, which is emitted by the stimulable phosphor sheet, guided and detected.

(5) An electric noise in the system for amplifying and processing an electric signal.

Superposition processing is carried out in order to reduce the aforesaid noises markedly so that even small differences in the radiation energy absorption characteristics among structures of an object can be found accurately in a visible radiation image, which is reproduced finally, i.e. the detection performance of the radiation image can be improved markedly. Ordinary techniques and effects of the superposition processing are as described below.

A radiation image is stored on each of a plurality of recording media, which have been placed one upon another. Thereafter, an image read-out operation is carried out for each of the recording media. A plurality of image signals, which have been obtained from the image read-out operations, are then superposed one upon another. In this manner, various noises described above can be reduced. Specifically, in general, noises described in (1) through (5) for the stimulable phosphor sheets exhibit different distributions for different radiation images stored on the stimulable phosphor sheets. When the image signals detected from the stimulable phosphor sheets are superposed one upon another, the noises can be averaged. Therefore, the noises become imperceptible in a superposition image, which is obtained from superposition processing. Specifically, an image signal having a high signal-to-noise ratio (S/N ratio) is obtained from superposition processing. The same effects can be obtained also when radiation images having been recorded on sheets of X-ray film are read out. More specifically, most of the noises described in (1) through (5), particularly, the noise described in (1), which is one of dominant factors among the noises in a radiation image, can be approximated by the Poisson statistics. In cases where noises can be approximated by the Poisson statistics and two radiation images yield equivalent levels of signals S1 and S2 and equivalent levels of noises N1 and N2, the level of the signal corresponding to a superposition image, which is obtained by carrying out superposition processing on the two radiation images, becomes equal to S1+S2, and the level of noise in the superposition image is represented by Formula (1).

$$\sqrt{N_1^2 + N_2^2} \qquad (1)$$

As for the signal-to-noise ratio, which is one of indexes representing the detection performance of a radiation image, the signal-to-noise ratios of the two radiation images prior to superposition processing are represented by the formulas S1/N1 and S2/N2. After superposition processing has been carried out on the two radiation images, the signal-to-noise ratio of the resulting superposition image is represented by Formula (2).

$$(S_1 + S_2) / \sqrt{N_1^2 + N_2^2} \qquad (2)$$

Therefore, as a result of superposition processing, the signal-to-noise ratio can be improved. When superposition processing is carried out on image signals representing the two radiation images, the values of the image signals may be weighted such that a markedly high signal-to-noise ratio can be obtained.

By way of example, when superposition processing is to be carried out by using the stimulable phosphor sheets, two stimulable phosphor sheets have heretofore been housed in a cassette such that they overlap one upon the other. Radiation images of an object are then recorded on the two stimulable phosphor sheets housed in the cassette. Thereafter, an image read-out operation is carried out on each of the two stimulable phosphor sheets, and two image signals are thereby obtained.

Also, techniques for carrying out subtraction processing on radiation images have heretofore been known. When subtraction processing is to be carried out, a plurality of (basically, two) radiation images recorded under different conditions are photoelectrically read out, and digital image signals which represent the radiation images are thereby obtained. The image signal components of the digital image signals, which represent corresponding picture elements in the radiation images, are then subtracted from each other, and a difference signal is thereby obtained which represents the image of a specific structure or part of the object represented by the radiation images. With the subtraction processing method, the plurality of digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the entire object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images, in which different images of a specific structure of the object are embedded, are obtained. Thereafter, the image signals representing the plurality of radiation images are weighted appropriately, when necessary, and subjected to a subtraction process, and the image of the specific structure of the object is thereby extracted.

In the aforesaid radiation image recording and reproducing systems utilizing the stimulable phosphor sheets, the radiation image stored on the stimulable phosphor sheet is read out directly as an electric image signal. Therefore, with such radiation image recording and reproducing systems, the aforesaid subtraction processing can be carried out easily. In cases where energy subtraction processing is to be carried out by using the stimulable phosphor sheets, radiation images may be stored on, for example, two stimulable phosphor sheets such that the parts of the radiation images corresponding to a specific structure may be different in the two radiation images. For this purposes, two-shot energy subtraction processing may be employed wherein the operation for recording a radiation image is carried out twice with two kinds of radiation having different energy distributions. Alternatively, one-shot energy subtraction processing may be employed wherein, for example, two stimulable phosphor sheets placed one upon the other (they may be in contact with each other or spaced away from each other) are simultaneously exposed to radiation, which has passed through an object, such that they may be exposed to radiation having different energy distributions.

As a method for photoelectrically detecting light emitted by a stimulable phosphor sheet, a method for detecting light emitted by two surfaces of a stimulable phosphor sheet has been proposed in, for example, U.S. Pat. No. 4,346,295. With the proposed method for detecting light emitted by two surfaces of a stimulable phosphor sheet, two photoelectric read-out means are located on opposite sides of the stimulable phosphor sheet. The two surfaces or only one surface of the stimulable phosphor sheet is scanned with the stimulating rays, and the light emitted by the two surfaces of the stimulable phosphor sheet is photoelectrically detected by the two photoelectric read-out means. With the proposed method for detecting light emitted by two surfaces of a stimulable phosphor sheet, a single radiation image is stored on the stimulable phosphor sheet, and the light emitted by two surfaces of the stimulable phosphor sheet is detected on the two sides of the stimulable phosphor sheet. Therefore, the efficiency, with which the light emitted by the stimulable phosphor sheet is guided and detected, can be kept high, and a high signal-to-noise ratio can be obtained.

With the method for detecting light emitted by two surfaces of a stimulable phosphor sheet, which has been proposed in U.S. Pat. No. 4,346,295, the stimulable phosphor sheet is placed on a transparent holder, and two photoelectric read-out means are respectively located above and below the holder. Specifically, the light emitted from the front surface of the stimulable phosphor sheet is detected by the photoelectric read-out means, which is located above the holder. Also, the light emitted from the back surface of the stimulable phosphor sheet is detected by the photoelectric read-out means, which is located below the holder.

When the image signals to be subjected to the superposition processing are to be obtained, for example, it is necessary to record radiation images on a plurality of stimulable phosphor sheets superposed one upon another. In such cases, the image signal, which is obtained from a stimulable phosphor sheet located at the position remote from the radiation source, contains image information in the low frequency band as in the image signal, which is obtained from a stimulable phosphor sheet located at the position close to the radiation source. However, in the image signal, which is obtained from the stimulable phosphor sheet located at the position remote from the radiation source, the frequency dependency in the high frequency band is lower than in the image signal, which is obtained from the stimulable phosphor sheet located at the position close to the radiation source. In the image signal, which is obtained from the stimulable phosphor sheet located at the position remote from the radiation source, as for the high frequency band, the amount of image information becomes small, and the amount of the noise components due to the effects of scattered radiation, or the like, becomes large. Therefore, if the image signal, which is obtained from the stimulable phosphor sheet located at the position remote from the radiation source, and the image signal, which is obtained from the stimulable phosphor sheet located at the position close to the radiation source, are weighted in the same manner and added to each other, the image quality can be kept good in the low frequency band in the addition signal obtained from the addition process, but the noise components will be emphasized and adversely affect the image quality in the high frequency band. Such adverse effects upon the image quality will also occur with the image signal, which is obtained from the front surface of the stimulable phosphor sheet by the method for detecting light emitted by two surfaces of the stimulable phosphor sheet, and the image signal, which is obtained from the back surface of the stimulable phosphor sheet. Further, as for the image signals to be subjected to the energy subtraction processing, the proportion of the noise components varies for different frequency bands of the image signal. Therefore, when the subtraction process is carried out on the image signals, it often occurs that the amount of the noise components in the difference signal becomes large, depending on the weight factor employed for each of the image signals.

Recently, it is desired to increase the speed, with which a radiation image is read out. Therefore, in Japanese Unexamined Patent Publication Nos. 60(1985)-117212 and 62(1987)-90615, the applicant proposed radiation image read-out apparatuses, which are capable of quickly reading out a radiation image from a stimulable phosphor sheet.

Also, in order for the speed, with which a radiation image is read out, to be increased, it has been proposed to increase the response speed of a stimulable phosphor with respect to stimulating rays, i.e. to increase the speed of light emission response of the stimulable phosphor with respect to the irradiation of the stimulating rays, with a method wherein, for example, cerium is added to the stimulable phosphor. When the response speed of the stimulable phosphor sheet with respect to the stimulating rays is kept higher, it becomes necessary to employ stimulating rays having a higher output power for the scanning of the stimulable phosphor sheet. Therefore, the stimulable phosphor sheet is quickly scanned with a laser beam, which serves as the stimulating rays and which has a high output power of at least 50 mW.

However, in cases where the aforesaid operation for quickly reading out a radiation image is carried out, the stimulating rays are moved very quickly on the stimulable phosphor sheet. Therefore, with certain kinds of stimulable phosphors constituting the stimulable phosphor sheets, the problems often occur in that the stimulable phosphor sheet cannot emit light immediately after being exposed to the stimulating rays, and a time lag occurs between when the stimulable phosphor sheet is exposed to the stimulating rays and when the stimulable phosphor sheet emits light. At an image contour portion, or the like, the amount of the light emitted by the stimulable phosphor sheet changes sharply. Therefore, the values of the image signal, which correspond to an image contour portion, or the like, should change sharply in the main scanning direction. However, if the time lag occurs between when the stimulable phosphor sheet is exposed to the stimulating rays and when the stimulable phosphor sheet emits light, the values of the obtained image signal, which correspond to an image contour portion, or the like, will not change sharply in the main scanning direction. As a result, the visible image reproduced from the image signal becomes unsharp in the main scanning direction, and the sharpness of the reproduced image cannot be kept high.

As for an image signal actually obtained from a stimulable phosphor sheet, or the like, the response characteristics will vary for different frequency bands. Therefore, such that a well-balanced visible image can be reproduced, it is desired to enhance the signal-to-noise ratio by reducing the noise components in the obtained addition signal or the obtained subtraction signal, and to emphasize or reduce the components of a desired frequency band in the obtained addition signal or the obtained subtraction signal. In such cases, it is necessary to carry out filtering processing on the obtained addition signal or the obtained subtraction signal by using, for example, a mask filter shown in FIG. 35. However, in such cases, the problems occur in that a long calculation time is required to carry out the filtering processing, and in that a complicated apparatus must be used.

Noise contained in an image signal is also affected by the dose of radiation delivered to the stimulable phosphor sheet. Specifically, when the dose of radiation delivered to the stimulable phosphor sheet is large, the proportion of the fixed noise due to the structure of the stimulable phosphor sheet, such as the state in which the stimulable phosphor is applied to the stimulable phosphor sheet, becomes higher than the proportion of the quantum noise of the radiation. Therefore, the ratio, in which a frequency band of the image signal is to be weighted such that the image quality of the reproduced image obtained from the addition signal or the subtraction signal may be kept best, varies for different doses of radiation delivered to the object.

SUMMARY OF THE INVENTION

The primary object of the present invention is to provide a superposition processing method for a radiation image, wherein a superposition image having good image quality and containing little noise component is obtained.

Another object of the present invention is to provide an energy subtraction processing method, wherein an energy subtraction image having good image quality and containing little noise component is obtained.

A further object of the present invention is to provide a superposition processing method for a radiation image, wherein the addition process on image signals is carried out simply, at a low cost, quickly, and for each of different frequencies.

A still further object of the present invention is to provide a superposition processing method for a radiation image, wherein a reproduced image having a high sharpness is obtained from image signals detected with operations for quickly reading out a radiation image.

Another object of the present invention is to provide a superposition processing method for a radiation image, wherein the addition process on image signals is carried out simply, at a low cost, quickly, and for each of different frequencies, and wherein the components of a desired frequency band in an image signal are capable of being altered.

A further object of the present invention is to provide an energy subtraction processing method, wherein the subtraction process on image signals is carried out simply, at a low cost, quickly, and for each of different frequencies, and wherein the components of a desired frequency band in an image signal are capable of being altered.

A still further object of the present invention is to provide a superposition processing method for a radiation image, wherein a reproduced image having good image quality is obtained regardless of the dose of radiation delivered to an object, and wherein the addition process on image signals is carried out simply, at a low cost, quickly, and for each of different frequencies.

Another object of the present invention is to provide an energy subtraction processing method, wherein a reproduced image having good image quality is obtained regardless of the dose of radiation delivered to an object, and wherein the subtraction process on image signals is carried out simply, at a low cost, quickly, and for each of different frequencies.

The present invention provides a first superposition processing method for a radiation image, comprising the steps of:

i) obtaining a plurality of image signals, which represent a radiation image of a single object or radiation images of the single object, and which have different frequency characteristics, each of the image signals being made up of a series of image signal components, ii) weighting the image signal components of the plurality of the image signals, which image signal components represent corresponding picture elements, with predetermined weight factors, and iii) adding the weighted image signal components of the plurality of the image signals to one another, which image signal components represent corresponding picture elements, an addition signal being thereby obtained, wherein the value of the weight factor with respect to the frequency components, which have a low signal-to-noise ratio, is rendered smaller than the value of the weight factor with respect to the frequency components, which have a high signal-to-noise ratio, in accordance with the frequency characteristics of each of the image signals.

The present invention also provides a second superposition processing method for a radiation image, wherein the first superposition processing method for a radiation image in accordance with the present invention is modified such that the image superposition processing may be carried out by:

a) carrying out a Fourier transform on each of the image signals, each of the image signals being thereby decomposed into a plurality of Fourier transform factor signals, each being of one of different frequency bands, b) weighting the Fourier transform factor signals, which are of a single frequency band, with the weight factors, such that the values of the weight factors may be varied for the Fourier transform factor signals of the different frequency bands, c) adding the weighted Fourier transform factor signals, which are of a single frequency band, to one another, an addition Fourier transform factor signal being thereby obtained for each of the different frequency bands, and d) carrying out an inverse Fourier transform on the addition Fourier transform factor signal.

The present invention further provides a third superposition processing method for a radiation image, wherein the first superposition processing method for a radiation image in accordance with the present invention is modified such that the image superposition processing may be carried out by:

a) subjecting each of the image signals to a transform to multi-resolution space, each of the image signals being thereby decomposed into a plurality of transform factor signals, each being of one of different frequency bands, b) weighting the transform factor signals, which are of a single frequency band, with the weight factors, such that the values of the weight factors may be varied for the transform factor signals of the different frequency bands, c) adding the weighted transform factor signals, which are of a single frequency band, to one another, an addition transform factor signal being thereby obtained for each of the different frequency bands, and d) carrying out an inverse transform on the addition transform factor signal.

The term "transform to multi-resolution space" as used herein means a transform, such as a wavelet transform or a sub-band transform, wherein an image signal is decomposed into a plurality of signals of different frequency bands by using a filter, which is shorter than a filter employed in the Fourier transform.

How the wavelet transform is carried out will be described hereinbelow.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transform, a signal is transformed into frequency signals, each being of one of a plurality of different frequency bands, by utilizing a function h, which is shown in FIG. 22, as a basic function and in accordance with the formula $$W(a, b) = \int_{-\infty}^{\infty} f(t)h(a, b)dt \quad (3)$$

wherein f(t): the signal having an arbitrary wave form,

W(a,b): the wavelet transform of f(t), $$h(a, b) = \frac{1}{\sqrt{a}} h(at - b)$$

a: the degree of contraction of the function, b: the amount of movement in the horizontal axis direction.

Therefore, the problems with regard to a false oscillation, which occurs with the Fourier transform, do not occur. Specifically, when filtering processing is carried out by changing the period and the degree of contraction of the function h and moving the function h on an original signal, frequency signals, each of which is adapted to one of desired frequencies ranging from a fine frequency to a coarse frequency. By way of example, FIG. 23 shows signals, which are obtained by carrying out the wavelet transform on an original signal Sorg and then carrying out the inverse wavelet transform for each of frequency bands. FIG. 24 shows signals, which are obtained by carrying out the Fourier transform on the original signal Sorg and then carrying out the inverse Fourier transform for each of the frequency bands. As will be understood from FIGS. 23 and 24, the wavelet transform has the advantage over the Fourier transform in that a frequency signal of a frequency band corresponding to the oscillation of the original signal Sorg can be obtained. Specifically, with the Fourier transform, an oscillation occurs in a part B' of a frequency band 7, which corresponds to a part B of the original signal Sorg. However, with the wavelet transform, as in the original signal Sorg, no oscillation occurs in a part A' of a frequency band W7, which corresponds to a part A of the original signal Sorg.

The present invention still further provides a fourth superposition processing method for a radiation image, wherein the third superposition processing method for a radiation image in accordance with the present invention is modified such that the transform to multi-resolution space may be carried out with a wavelet transform.

The present invention also provides a fifth superposition processing method for a radiation image, wherein the first, third, or fourth superposition processing method for a radiation image in accordance with the present invention is modified such that the value of the weight factor with respect to a portion of the radiation image, to which a large dose of radiation reached during an operation for recording the radiation image, may be rendered larger than the value of the weight factor with respect to a portion of the radiation image, to which a small dose of radiation reached during the operation for recording the radiation image, in accordance with the portions of the object, the patterns of which are embedded in the radiation image.

The present invention further provides a sixth superposition processing method for a radiation image, wherein the first, second, third, fourth, or fifth superposition processing method for a radiation image in accordance with the present invention is modified such that the plurality of the image signals are obtained by:

exposing the two surfaces or either one of the two surfaces of a single stimulable phosphor sheet, on which the radiation image has been stored, to stimulating rays, which cause the stimulable phosphor sheet to emit light in proportion to the amount of energy stored thereon during its exposure to radiation, and photoelectrically detecting the emitted light independently on the opposite surface sides of the stimulable phosphor sheet.

The present invention still further provides a seventh superposition processing method for a radiation image, wherein the first superposition processing method for a radiation image in accordance with the present invention is modified such that the plurality of the image signals may be analog image signals, and the image superposition processing may be carried out by:

a) filtering all of the analog image signals with filters, which have weights changing the frequency characteristics of the analog image signals, and b) adding the analog image signals, which have been obtained from the filtering process, to one another.

The present invention also provides an eighth superposition processing method for a radiation image, wherein the first superposition processing method for a radiation image in accordance with the present invention is modified such that the plurality of the image signals may be analog image signals, and the image superposition processing may be carried out by:

a) filtering at least a single desired analog image signal, which is among the analog image signals, with a filter, which has a weight changing the frequency characteristics of the desired analog image signal, and b) adding the analog image signal, which has been obtained from the filtering process, and the other analog image signals to one another.

The present invention further provides a ninth superposition processing method for a radiation image, wherein the first, second, third, fourth, fifth, seventh, or eighth superposition processing method for a radiation image in accordance with the present invention is modified such that the plurality of the image signals are obtained by:

exposing each of at least two stimulable phosphor sheets, on each of which a radiation image has been stored, to stimulating rays, which cause the stimulable phosphor sheet to emit light in proportion to the amount of energy stored thereon during its exposure to radiation, and photoelectrically detecting the emitted light.

The present invention still further provides a first energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of the radiation images, with predetermined weight factors, and iv) subtracting the weighted image signal components of the plurality of the image signals from one another, which image signal components represent corresponding picture elements in the plurality of the radiation images, a difference signal representing an image of a specific structure of the object being thereby obtained, wherein the value of the weight factor with respect to the frequency components, which have a low signal-to-noise ratio, is rendered smaller than the value of the weight factor with respect to the frequency components, which have a high signal-to-noise ratio, in accordance with the frequency characteristics of each of the image signals.

In the above-described first energy subtraction processing method and also in the below-described various other methods according to the present invention, including those defined in claims, the expression of "with a plurality of kinds of radiation having different energy distributions" does not necessarily means a plurality of separate radiations but includes a plurality of kinds of radiations originated from a single radiation wherein, for example, one is a direct radiation from a radiation source, and the other is a radiation from the same radiation source, which has passed through a recording medium (e.g., a stimulable phosphor sheet) and/or a filter, or the like, and the low energy components of which have been filtered out. Therefore, the plurality of the radiation images can be formed one after another by using different radiations having different energy distributions. Alternatively, the plurality of the radiation images can be formed simultaneously by using a single radiation and placing a plurality of recording media (e.g., stimulable phosphor sheets) one upon another with or without a filter interposed therebetween. When the filter is not used, the stimulable phosphor sheet located closer to the radiation source serves as a filter for filtering out the low energy components of the radiation.

The present invention also provides a second energy subtraction processing method, wherein the first energy subtraction processing method in accordance with the present invention is modified such that the difference signal may be obtained by:

a) carrying out a Fourier transform on each of the image signals, each of the image signals being thereby decomposed into a plurality of Fourier transform factor signals, each being of one of different frequency bands, b) weighting the Fourier transform factor signals, which are of a single frequency band, with the weight factors, such that the values of the weight factors may be varied for the Fourier transform factor signals of the different frequency bands, c) subtracting the weighted Fourier transform factor signals, which are of a single frequency band, from one another, a subtraction Fourier transform factor signal being thereby obtained for each of the different frequency bands, and d) carrying out an inverse Fourier transform on the subtraction Fourier transform factor signal.

The present invention further provides a third energy subtraction processing method, wherein the first energy subtraction processing method in accordance with the present invention is modified such that the subtraction signal may be obtained by:

a) subjecting each of the image signals to a transform to multi-resolution space, each of the image signals being thereby decomposed into a plurality of transform factor signals, each being of one of different frequency bands, b) weighting the transform factor signals, which are of a single frequency band, with the weight factors, such that the values of the weight factors may be varied for the transform factor signals of the different frequency bands, c) subtracting the weighted transform factor signals, which are of a single frequency band, from one another, a subtraction transform factor signal being thereby obtained for each of the different frequency bands, and d) carrying out an inverse transform on the subtraction transform factor signal.

The present invention still further provides a fourth energy subtraction processing method, wherein the third energy subtraction processing method in accordance with the present invention is modified such that the transform to multi-resolution space may be carried out with a wavelet transform.

The present invention also provides a fifth energy subtraction processing method, wherein the first, third, or fourth energy subtraction processing method in accordance with the present invention is modified such that the value of the weight factor with respect to a portion of each radiation image, to which a large dose of radiation reached during an operation for recording the radiation image, may be rendered larger than the value of the weight factor with respect to a portion of the radiation image, to which a small dose of radiation reached during the operation for recording the radiation image, in accordance with the portions of the object, the patterns of which are embedded in the radiation image.

The present invention further provides a sixth energy subtraction processing method, wherein the first energy subtraction processing method in accordance with the present invention is modified such that the plurality of the image signals may be analog image signals, and the difference signal may be obtained by:

a) filtering all of the analog image signals with filters, which have weights changing the frequency characteristics of the analog image signals, and b) subtracting the analog image signals, which have been obtained from the filtering process, from one another.

The present invention still further provides a seventh energy subtraction processing method, wherein the first energy subtraction processing method in accordance with the present invention is modified such that the plurality of the image signals may be analog image signals, and the difference signal may be obtained by:

a) filtering at least a single desired analog image signal, which is among the analog image signals, with a filter, which has a weight changing the frequency characteristics of the desired analog image signal, and b) subtracting the analog image signal, which has been obtained from the filtering process, and the other analog image signals from one another.

With the first to ninth superposition processing methods for a radiation image in accordance with the present invention, the value of the weight factor with respect to the frequency components, which have a low signal-to-noise ratio, is rendered smaller than the value of the weight factor with respect to the frequency components, which have a high signal-to-noise ratio, in accordance with the frequency characteristics of each of the image signals. Therefore, the addition signal, which is obtained from the addition process, has a high signal-to-noise ratio over the entire frequency bands. Accordingly, a superposition image having good image quality can be reproduced from the addition signal.

Specifically, the Fourier transform may be carried out on each of the image signals, and each of the image signals may thereby be decomposed into a plurality of Fourier transform factor signals, each being of one of different frequency bands. The weighted addition process may then be carried out on the Fourier transform factor signals, which are of a single frequency band, such that the values of the weight factors may be varied for the Fourier transform factor signals of the different frequency bands. In this manner, the value of the weight factor with respect to the frequency components, which have a low signal-to-noise ratio, can be rendered smaller than the value of the weight factor with respect to the frequency components, which have a high signal-to-noise ratio. Therefore, a superposition image having good image quality can be obtained.

Also, each of the image signals may be subjected to the transform to multi-resolution space, such as the wavelet transform or the sub-band transform, and may thereby be decomposed into a plurality of the transform factor signals, each being of one of different frequency bands. An addition signal may then be obtained from the transform factor signals. In this manner, the image signal can be decomposed into the plurality of the frequency bands by using a short filter. Therefore, the apparatus for carrying out the superposition processing method for a radiation image in accordance with the present invention can be kept simple.

Further, the transform factor signals, each of which is of one of different frequency bands, are obtained by transforming each of the image signals to multi-resolution space. Each of the transform factor signals thus obtained is constituted of an image signal contracted from the image signal before being transformed. Therefore, the dose of radiation, which reached to a portion of the radiation image during the operation for recording the radiation image, can be detected by carrying out, for example, an analysis of the probability density function of each of the transform factor signals. Thereafter, the value of the weight factor with respect to a portion of the radiation image, to which a large dose of radiation reached during the operation for recording the radiation image, can be rendered larger than the value of the weight factor with respect to a portion of the radiation image, to which a small dose of radiation reached during the operation for recording the radiation image. In this manner, an image having good image quality can be obtained.

Furthermore, the plurality of the image signals may be taken as analog image signals. Filtering may be carried out on all of the analog image signals by using the filters, which have weights changing the frequency characteristics of the analog image signals. In this manner, the weighting process is effected on desired frequency bands of the analog image signals. Alternatively, filtering may be carried out on at least a single desired analog image signal, which is among the analog image signals, by using a filter, which has a weight changing the frequency characteristics of the desired analog image signal. In this manner, the weighting process is effected on a desired frequency band of the analog image signal. Thereafter, the addition signal may be obtained by carrying out the addition process on the image signals. In this manner, as in the aforesaid method utilizing the Fourier transform, the wavelet transform, or the sub-band transform, a superposition image having good image quality can be obtained from the addition signal.

In cases where the image signals are obtained with the aforesaid method for detecting light emitted by two surfaces of a stimulable phosphor sheet, the high frequency components of the image signal, which has been obtained from the back surface side of the stimulable phosphor sheet (i.e. the side of the stimulable phosphor sheet, which was remote from the radiation source during the operation for recording the radiation image), contain a large amount of noise components due to scattered radiation, or the like. Also, in cases where the image signals are obtained by recording the radiation images respectively on a plurality of stimulable phosphor sheets placed one upon another, the high frequency components of the image signal having been obtained from a stimulable phosphor sheet, which was remote from the radiation source during the operation for recording the radiation images, contain a large amount of noise components due to scattered radiation, or the like. Therefore, the value of the weight factor with respect to the high frequency components of the image signal, which has been obtained from the side of the stimulable phosphor sheet remote from the radiation source or which has been obtained from the stimulable phosphor sheet remote from the radiation source, is rendered smaller than the value of the weight factor with respect to the high frequency components of the image signal, which has been obtained from the side of the stimulable phosphor sheet close to the radiation source or which has been obtained from the stimulable phosphor sheet close to the radiation source. In this manner, a superposition image containing little noise component can be obtained.

The aforesaid process for varying the value of the weight factor for different frequency bands of the image signal can be applied to the energy subtraction processing method. Specifically, the value of the weight factor with respect to the frequency components, which have a low signal-to-noise ratio, is rendered smaller than the value of the weight factor with respect to the frequency components, which have a high signal-to-noise ratio, in accordance with the frequency characteristics of each of the image signals, which are to be subjected to the subtraction process. In such cases, a subtraction signal, which has been obtained from the subtraction process, contains little noise component, and a subtraction image having good image quality can be reproduced from the subtraction signal.

The present invention also provides a tenth superposition processing method for a radiation image, comprising the steps of:

i) obtaining a plurality of image signals, which represent a radiation image of a single object or radiation images of the single object, and which have different frequency characteristics, each of the image signals being made up of a series of image signal components, and ii) adding the image signal components of the plurality of the image signals to one another, which image signal components represent corresponding picture elements, an addition signal being thereby obtained, wherein, such that the signal-to-noise ratio of the addition signal may be kept high, the addition signal is obtained by:

a) subjecting at least a single desired image signal, which is among the plurality of the image signals, to image processing, which changes the frequency characteristics of the desired image signal, and b) adding the image signal, which has been obtained from the image processing, and the other image signals to one another.

The image processing may be carried out on all of the plurality of the image signals.

The image processing may be the processing for carrying out the convolution of the desired image signal with a mask filter, which has predetermined frequency characteristics. The processing with the convolution may be carried out on all of the plurality of the image signals.

In cases where the processing with the convolution is carried out on all of the plurality of the image signals, the sum of the frequency characteristics of the mask filters employed for the plurality of the image signals may be equal to 1 at an arbitrary frequency.

The tenth superposition processing method for a radiation image in accordance with the present invention should preferably be modified such that each of the plurality of the image signals may be obtained by scanning a stimulable phosphor sheet, on which the radiation image has been stored, with stimulating rays, which cause the stimulable phosphor sheet to emit light in proportion to the amount of energy stored thereon during its exposure to radiation, in the main scanning direction and the sub-scanning direction, the emitted light being detected photoelectrically, and the image processing is the processing for emphasizing the high frequency components of the desired image signal with respect to the main scanning direction.

The processing should more preferably be the processing for carrying out the convolution of the desired image signal with respect to the main scanning direction with a mask filter, which has frequency characteristics capable of emphasizing the high frequency components of the desired image signal with respect to the main scanning direction.

The image processing with the convolution may be carried out on each of the image signals by using a single mask filter.

The present invention further provides an eleventh superposition processing method for a radiation image, comprising the steps of:

i) obtaining two image signals, which represent a radiation image of a single object or radiation images of the single object, and which have different frequency characteristics, each of the image signals being made up of a series of image signal components, and ii) adding the image signal components of the two image signals to one another, which image signal components represent corresponding picture elements, an addition signal being thereby obtained, wherein, such that the signal-to-noise ratio of the addition signal may be kept high, the addition signal is obtained by:

a) obtaining a difference signal between the two image signals, b) carrying out the convolution of the difference signal with either one of two mask filters, which have predetermined frequency characteristics, the sum of the frequency characteristics of the two mask filters being equal to 1 at an arbitrary frequency, and c) adding the difference signal, which has been obtained from the convolution, and either one of the two image signals to each other.

The present invention still further provides an eighth energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of the radiation images, with predetermined weight factors, and iv) subtracting the weighted image signal components of the plurality of the image signals from one another, which image signal components represent corresponding picture elements in the plurality of the radiation images, a difference signal representing an image of a specific structure of the object being thereby obtained, wherein, such that the signal-to-noise ratio of the difference signal may be kept high, the difference signal is obtained by:

a) subjecting at least a single desired image signal, which is among the plurality of the image signals, to image processing, which changes the frequency characteristics of the desired image signal, and b) subtracting the image signal, which has been obtained from the image processing, and the other image signals from one another.

In the eighth energy subtraction processing method in accordance with the present invention, the image processing may be carried out on all of the plurality of the image signals.

Also, the image processing may be the processing for carrying out the convolution of the desired image signal with a mask filter, which has predetermined frequency characteristics. The processing with the convolution may be carried out on all of the plurality of the image signals.

With the tenth superposition processing method for a radiation image in accordance with the present invention, at least a single desired image signal, which is among the plurality of the image signals, is subjected to the image processing, which changes the frequency characteristics of the desired image signal. The frequency characteristics of the desired image signal can be changed such that noise may be reduced. Therefore, the radiation image represented by the addition signal can have good image quality and little noise. In addition, with the tenth superposition processing method for a radiation image in accordance with the present invention, the image processing, which changes the frequency characteristics of the image signal, is carried out on the entire image signal. Therefore, it is not necessary to carry out a frequency transform, such as the wavelet transform or the Fourier transform. Accordingly, the amount of calculation can be kept small, and the apparatus for carrying out the superposition processing method for a radiation image in accordance with the present invention can be kept simple. As a result, a superposition image having good image quality can be obtained quickly and at a low cost.

Also, in cases where the image processing, which changes the frequency characteristics, is carried out on all of the plurality of the image signals, an addition signal having better image quality can be obtained.

Further, in cases where the image processing is carried out by the convolution of the image signal with a mask filter, addition signals, in which the responses with respect to various frequency bands have been emphasized, can be obtained by changing the frequency characteristics of the mask filter.

Furthermore, in cases where the processing with the convolution is carried out on all of the plurality of the image signals, an addition signal having better image quality can be obtained.

Moreover, in cases where the sum of the frequency characteristics of the mask filters, which are employed for the plurality of the image signals, is equal to 1 at an arbitrary frequency, when the image signals obtained from the image processing are added to one another, it becomes unnecessary for the weighting process to be carried out such that the addition ratio of the image signals may be equal to 1. Therefore, the operation time can be kept short, and the addition process can be carried out quickly.

Also, in cases where the image processing with the convolution is carried out on each of the image signals by using a single mask filter, the number of the mask filters, which are to be stored in an apparatus for carrying out the superposition processing method for a radiation image in accordance with the present invention, can be kept small. Therefore, the apparatus can be kept simple.

With the eleventh superposition processing method for a radiation image in accordance with the present invention, wherein the superposition processing is carried out on two image signals, the difference signal between the two image signals is obtained. The convolution of the difference signal is carried out with either one of two mask filters, the sum of the frequency characteristics of the two mask filters being equal to 1 at an arbitrary frequency. The difference signal, which has been obtained from the convolution, and either one of the two image signals are then added to each other. Specifically, the process is carried out which is represented by one of the formulas $$S\ add = S_1 + F_2 * (S_2 - S_1)$$

$$S\ add = S_2 + F_1 * (S_1 - S_2)$$

where S1 and S2 represent the image signals, Sadd represents the addition signal, and F1 and F2 represent the mask filters satisfying the condition of F1+F2=1. Therefore, only a single convolution may be carried out on the values of the difference between the image signals. Also, the number of the mask filters, which are to be stored in the apparatus for carrying out the superposition processing method for a radiation image in accordance with the present invention, can be kept small. Therefore, the operation time can be kept short, and the apparatus can be kept simple.

In the tenth superposition processing method for a radiation image in accordance with the present invention, each of the plurality of the image signals may be obtained by scanning a stimulable phosphor sheet, on which the radiation image has been stored, with stimulating rays, which cause the stimulable phosphor sheet to emit light in proportion to the amount of energy stored thereon during its exposure to radiation, in the main scanning direction and the sub-scanning direction, the emitted light being detected photoelectrically. In such cases, the image processing may be the processing for carrying out the convolution of the desired image signal with respect to the main scanning direction with a mask filter, which has the frequency characteristics capable of emphasizing the high frequency components of the desired image signal with respect to the main scanning direction. Also, as the image processing, the convolution of the desired image signal may be carried out with respect to the sub-scanning direction with a mask filter, which has predetermined frequency characteristics. In this manner, the high frequency components of the image signal with respect to the main scanning direction, i.e. an image part, such as an contour part of the image, at which the values of the image signal change sharply, can be emphasized. As a result, the part, at which the value of the image signal should change sharply, but which has been rendered unsharp due to the quick image read-out operation, can be emphasized. An image signal, in which the problems with regard to the unsharp change have been eliminated, can thus be obtained. Therefore, in cases where the image read-out operation is carried out quickly, the image signal can be prevented from becoming unsharp with respect to the main scanning direction, and a reproduced image having a high sharpness can be obtained.

The processing carried out in the tenth or eleventh superposition processing method for a radiation image in accordance with the present invention can also be applied to the energy subtraction processing in the eighth energy subtraction processing method in accordance with the present invention. Therefore, with the eighth energy subtraction processing method in accordance with the present invention, a difference signal representing an image having good image quality and containing little noise can be obtained from the subtraction processing. Also, the image processing, which changes the frequency characteristics of the image signal, is carried out on the entire image signal. Therefore, it is not necessary to carry out a frequency transform, such as the wavelet transform or the Fourier transform. Accordingly, the amount of calculation can be kept small, and the apparatus for carrying out the eighth energy subtraction processing method in accordance with the present invention can be kept simple. As a result, a subtraction image having good image quality can be obtained quickly and at a low cost.

The present invention still further provides a twelfth superposition processing method for a radiation image, comprising the steps of:

i) obtaining a plurality of image signals, which represent a radiation image of a single object or radiation images of the single object, and which have different frequency characteristics, each of the image signals being made up of a series of image signal components, and ii) adding the image signal components of the plurality of the image signals to one another, which image signal components represent corresponding picture elements, an addition signal being thereby obtained, wherein the addition signal is obtained by:

a) carrying out the convolution of at least a single desired image signal, which is among the plurality of the image signals, with a mask filter, which has frequency characteristics capable of keeping the signal-to-noise ratio of the addition signal high and altering the response characteristics of the addition signal with respect to a desired frequency band when the addition signal is obtained by adding an image signal, that is obtained from the convolution of the desired image signal, and the other image signals to one another, a processed image signal being thereby obtained from the convolution, and b) adding the processed image signal and the other image signals to one another.

The twelfth superposition processing method for a radiation image in accordance with the present invention should preferably be modified such that each of the plurality of the image signals may be obtained by scanning a sheet-like recording medium, on which the radiation image has been recorded, with a light beam in the main scanning direction and the sub-scanning direction, the radiation image being thereby read out photoelectrically, and the processed image signal may be obtained by carrying out the convolution of the desired image signal with the mask filter, which has different frequency characteristics with respect to the main scanning direction and the sub-scanning direction, such that the frequency response characteristics of the addition signal with respect to the main scanning direction and the frequency response characteristics of the addition signal with respect to the sub-scanning direction may become approximately identical with each other.

Also, in the twelfth superposition processing method for a radiation image in accordance with the present invention, the processing with the convolution may be carried out on all of the plurality of the image signals.

In cases where the processing with the convolution is carried out on all of the plurality of the image signals, the term "other image signals" as used herein also means the image signals obtained from the convolution.

The present invention also provides a ninth energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of the radiation images, with predetermined weight factors, and iv) subtracting the weighted image signal components of the plurality of the image signals from one another, which image signal components represent corresponding picture elements in the plurality of the radiation images, a difference signal representing an image of a specific structure of the object being thereby obtained, wherein the difference signal is obtained by:

a) carrying out the convolution of at least a single desired image signal, which is among the plurality of the image signals, with a mask filter, which has frequency characteristics capable of keeping the signal-to-noise ratio of the difference signal high and altering the response characteristics of the difference signal with respect to a desired frequency band when the difference signal is obtained by subtracting an image signal, that is obtained from the convolution of the desired image signal, and the other image signals from one another, a processed image signal being thereby obtained from the convolution, and b) subtracting the processed image signal and the other image signals from one another.

As in the twelfth superposition processing method for a radiation image in accordance with the present invention, the ninth energy subtraction processing method in accordance with the present invention should preferably be modified such that each of the plurality of the image signals may be obtained by scanning a sheet-like recording medium, on which the radiation image has been recorded, with a light beam in the main scanning direction and the sub-scanning direction, the radiation image being thereby read out photoelectrically, and the processed image signal may be obtained by carrying out the convolution of the desired image signal with the mask filter, which has different frequency characteristics with respect to the main scanning direction and the sub-scanning direction, such that the frequency response characteristics of the difference signal with respect to the main scanning direction and the frequency response characteristics of the difference signal with respect to the sub-scanning direction may become approximately identical with each other.

Also, in the ninth energy subtraction processing method in accordance with the present invention, the processing with the convolution may be carried out on all of the plurality of the image signals.

In cases where the processing with the convolution is carried out on all of the plurality of the image signals, the term "other image signals" as used herein also means the image signals obtained from the convolution.

With the twelfth superposition processing method for a radiation image in accordance with the present invention, the convolution of at least a single desired image signal is carried out with the mask filter, which has frequency characteristics capable of keeping the signal-to-noise ratio of the addition signal high and altering the response characteristics of the addition signal with respect to a desired frequency band. The processed image signal obtained from the convolution and the other image signals are then added to one another. Therefore, in the obtained addition signal, noise components can be reduced, and the response characteristics with respect to a desired frequency band can be altered. Accordingly, the radiation image represented by the addition signal can have good image quality and little noise. Further, in the radiation image, the desired frequency band has been altered. As a result, a superposition image can be obtained which has good image quality and can serve as an effective tool in, particularly, the efficient and accurate diagnosis of an illness. In addition, with the twelfth superposition processing method for a radiation image in accordance with the present invention, the processing with the convolution is carried out on the entire image signal. Therefore, it is not necessary to carry out a frequency transform, such as the wavelet transform or the Fourier transform. Also, it is not necessary to carry out filtering processing on the addition signal. Accordingly, the amount of calculation can be kept small, and the apparatus for carrying out the superposition processing method for a radiation image in accordance with the present invention can be kept simple. As a result, a superposition image having good image quality can be obtained quickly and at a low cost.

Also, in cases where the processing with the convolution is carried out on all of the plurality of the image signals, an addition signal having better image quality can be obtained.

Further, as described above, each of the plurality of the image signals may be obtained by scanning the sheet-like recording medium, on which the radiation image has been recorded, with a light beam in two-dimensional directions. The processed image signal may then be obtained by carrying out the convolution of the desired image signal with the mask filter, which has different frequency characteristics with respect to the main scanning direction and the sub-scanning direction, such that the frequency response characteristics of the addition signal with respect to the main scanning direction and the frequency response characteristics of the addition signal with respect to the sub-scanning direction may become approximately identical with each other. In such cases, in the radiation image represented by the addition signal, the frequency characteristics with respect to the main scanning direction and the frequency characteristics with respect to the sub-scanning direction become well-balanced.

Accordingly, from the addition signal, a reproduced image can be obtained which has better image quality and can serve as a more effective tool in, particularly, the efficient and accurate diagnosis of an illness.

The processing carried out in the twelfth superposition processing method for a radiation image in accordance with the present invention can also be applied to the energy subtraction processing in the ninth energy subtraction processing method in accordance with the present invention. Therefore, with the ninth energy subtraction processing method in accordance with the present invention, a difference signal representing an image having good image quality and containing little noise can be obtained from the subtraction processing, and the response characteristics with respect to a desired frequency band can be altered. Accordingly, the radiation image represented by the difference signal can have good image quality and little noise. Further, in the radiation image, the desired frequency band has been altered. As a result, a subtraction image can be obtained which has good image quality and can serve as an effective tool in, particularly, the efficient and accurate diagnosis of an illness. In addition, with the ninth energy subtraction processing method in accordance with the present invention, the processing with the convolution is carried out on the entire image signal. Therefore, it is not necessary to carry out a frequency transform, such as the wavelet transform or the Fourier transform. Also, it is not necessary to carry out filtering processing on the difference signal. Accordingly, the amount of calculation can be kept small, and the apparatus for carrying out the energy subtraction processing method in accordance with the present invention can be kept simple. As a result, a subtraction image having good image quality can be obtained quickly and at a low cost.

The present invention further provides a thirteenth superposition processing method for a radiation image, comprising the steps of:

i) obtaining a plurality of image signals, which represent a radiation image of a single object or radiation images of the single object having been formed by delivering radiation to the single object, and which have different frequency characteristics, each of the image signals being made up of a series of image signal components, and ii) adding the image signal components of the plurality of the image signals to one another, which image signal components represent corresponding picture elements, an addition signal being thereby obtained, wherein the addition signal is obtained by:

a) calculating the dose of radiation delivered to the object, b) setting a mask filter for at least a single desired image signal, which is among the plurality of the image signals, in accordance with the calculated dose of radiation, the mask filter having frequency characteristics capable of keeping the signal-to-noise ratio of the addition signal high when the addition signal is obtained by adding an image signal, that is obtained from the convolution of the desired image signal, and the other image signals to one another, c) carrying out the convolution of the desired image signal with the mask filter, and d) adding the image signal, which has been obtained from the convolution, and the other image signals to one another.

In the thirteenth superposition processing method for a radiation image in accordance with the present invention, the processing with the convolution may be carried out on all of the plurality of the image signals. In such cases, the sum of the frequency characteristics of the mask filters employed for the plurality of the image signals may be equal to 1 at an arbitrary frequency.

In cases where the processing with the convolution is carried out on all of the plurality of the image signals, the term "other image signals" as used herein also means the image signals obtained from the convolution.

The thirteenth superposition processing method for a radiation image in accordance with the present invention may be modified such that the dose of radiation may be calculated for each of portions of the object, the patterns of which are embedded in the radiation image, the mask filter may be set for each of the portions of the object in accordance with the calculated dose of radiation, and the convolution of the desired image signal may be carried out with the mask filter, which has been set for each of the portions of the object.

Further, the image processing with the convolution may be carried out on each of the image signals by using a single mask filter.

The present invention still further provides a tenth energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of the radiation images, with predetermined weight factors, and iv) subtracting the weighted image signal components of the plurality of the image signals from one another, which image signal components represent corresponding picture elements in the plurality of the radiation images, a difference signal representing an image of a specific structure of the object being thereby obtained, wherein the difference signal is obtained by:

a) calculating the dose of radiation delivered to the object, b) setting a mask filter for at least a single desired image signal, which is among the plurality of the image signals, in accordance with the calculated dose of radiation, the mask filter having frequency characteristics capable of keeping the signal-to-noise ratio of the difference signal high when the difference signal is obtained by subtracting an image signal, that is obtained from the convolution of the desired image signal, and the other image signals from one another, c) carrying out the convolution of the desired image signal with the mask filter, and d) subtracting the image signal, which has been obtained from the convolution, and the other image signals from one another.

As in the thirteenth superposition processing method for a radiation image in accordance with the present invention, the tenth energy subtraction processing method in accordance with the present invention may be modified such that the dose of radiation may be calculated for each of portions of the object, the patterns of which are embedded in the radiation image, the mask filter may be set for each of the portions of the object in accordance with the calculated dose of radiation, and the convolution of the desired image signal may be carried out with the mask filter, which has been set for each of the portions of the object.

In the tenth energy subtraction processing method in accordance with the present invention, the processing with the convolution may be carried out on all of the plurality of the image signals. In such cases, the sum of the frequency characteristics of the mask filters employed for the plurality of the image signals may be equal to 1 at an arbitrary frequency.

In cases where the processing with the convolution is carried out on all of the plurality of the image signals, the term "other image signals" as used herein also means the image signals obtained from the convolution.

With the thirteenth superposition processing method for a radiation image in accordance with the present invention, the dose of radiation delivered to the object is calculated. The mask filter to be used for the convolution of at least a single desired image signal is set in accordance with the calculated dose of radiation. Therefore, the mask filter, which can yield the addition signal representing a radiation image having good image quality, can be set in accordance with the dose of radiation delivered to the object. As a result, a superposition image having good image quality can be obtained regardless of the dose of radiation delivered to the object. In addition, with the thirteenth superposition processing method for a radiation image in accordance with the present invention, the processing for changing the frequency characteristics is carried out on the entire image signal. Therefore, it is not necessary to carry out a frequency transform, such as the wavelet transform or the Fourier transform. Accordingly, the amount of calculation can be kept small, and the apparatus for carrying out the superposition processing method for a radiation image in accordance with the present invention can be kept simple. As a result, a superposition image having good image quality can be obtained quickly and at a low cost.

Also, in cases where the processing with the convolution is carried out on all of the plurality of the image signals, an addition signal having better image quality can be obtained.

Further, in cases where the sum of the frequency characteristics of the mask filters, which are employed for the plurality of the image signals, is equal to 1 at an arbitrary frequency, when the image signals obtained from the processing with the convolution are added to one another, it becomes unnecessary for the weighting process to be carried out such that the addition ratio of the image signals may be equal to 1. Therefore, the operation time can be kept short, and the addition process can be carried out quickly.

Furthermore, as described above, the dose of radiation may be calculated for each of portions of the object, the patterns of which are embedded in the radiation image. The mask filter may then be set for each of the portions of the object in accordance with the calculated dose of radiation. In such cases, it becomes possible to obtain an addition signal representing a radiation image which has good image quality with respect to each of the portions of the object and can serve as an effective tool in, particularly, the efficient and accurate diagnosis of an illness at each of the portions of the object. In this manner, a superposition image having better image quality can be obtained.

Moreover, in cases where the image processing with the convolution is carried out on each of the image signals by using a single mask filter, the number of the mask filters, which are to be stored in an apparatus for carrying out the superposition processing method for a radiation image in accordance with the present invention, can be kept small. Therefore, the apparatus can be kept simple.

The processing carried out in the thirteenth superposition processing method for a radiation image in accordance with the present invention can also be applied to the energy subtraction processing in the tenth energy subtraction processing method in accordance with the present invention. Therefore, with the tenth energy subtraction processing method in accordance with the present invention, a difference signal representing an image having good image quality and containing little noise in accordance with the dose of radiation delivered to the object can be obtained from the subtraction processing. Also, the image processing, which changes the frequency characteristics of the image signal, is carried out on the entire image signal. Therefore, it is not necessary to carry out a frequency transform, such as the wavelet transform or the Fourier transform. Accordingly, the amount of calculation can be kept small, and the apparatus for carrying out the tenth energy subtraction processing method in accordance with the present invention can be kept simple. As a result, a subtraction image having good image quality can be obtained quickly and at a low cost.

BRIEF DESCRIPTION OF THE DRAWINGS

FIG. 16 is a perspective view showing a different apparatus for detecting light emitted by two surfaces of a stimulable phosphor sheet, FIG. 17 is a block diagram showing how frequency processing is carried out on analog output signals, FIG. 21 is a block diagram showing an apparatus for carrying out a first embodiment of the energy subtraction processing method in accordance with the present invention, FIG. 40 is a perspective view showing an apparatus for reading out a radiation image from a stimulable phosphor sheet, on which the radiation image has been stored.

DESCRIPTION OF THE PREFERRED EMBODIMENTS

The present invention will hereinbelow be described in further detail with reference to the accompanying drawings.

Figure 1:
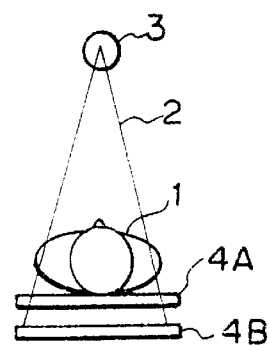
FIG. 1 is a schematic view showing how radiation images are recorded on stimulable phosphor sheets in an embodiment of the superposition processing method for a radiation image in accordance with the present invention.

FIG. 1 shows how radiation 2, which has passed through a single object 1, is irradiated to two stimulable phosphor sheets 4A and 4B.

As illustrated in FIG. 1, the first stimulable phosphor sheet 4A and the second stimulable phosphor sheet 4B are superposed one upon the other, and a radiation source 3 is activated to produce the radiation 2. The radiation 2, which has been produced by the radiation source 3, passes through the object 1. The radiation 2, which has passed through the object 1, impinges upon the first stimulable phosphor sheet 4A and the second stimulable phosphor sheet 4B. In this manner, radiation images of the object 1 are stored on the first stimulable phosphor sheet 4A and the second stimulable phosphor sheet 4B.

Figure 2:
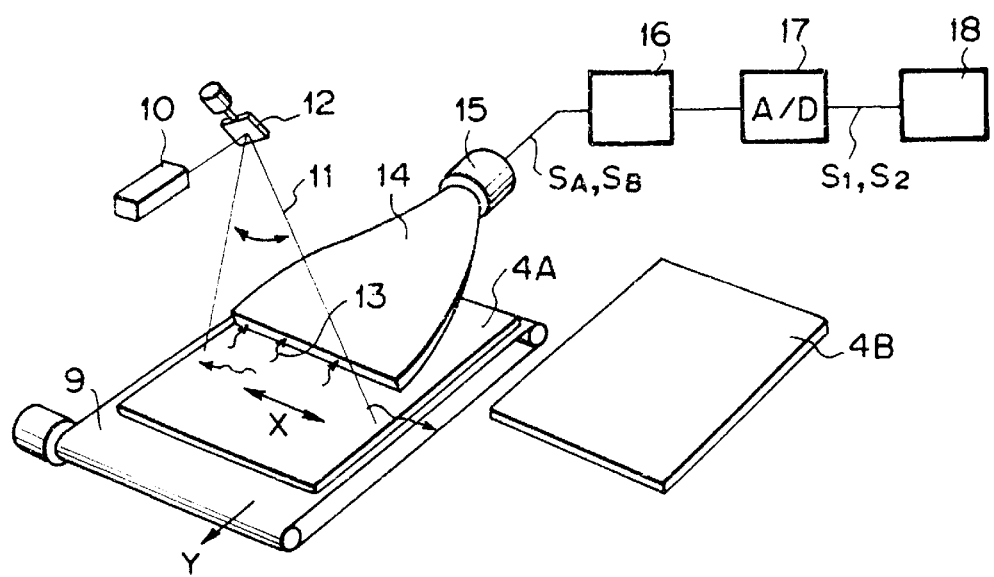
FIG. 2 is a perspective view showing an apparatus for reading out a radiation image from a stimulable phosphor sheet, on which the radiation image has been stored.

Thereafter, the radiation images are read out from the first stimulable phosphor sheet 4A and the second stimulable phosphor sheet 4B by using an image read-out means shown in FIG. 2, and image signals representing the radiation images are thereby obtained. Specifically, the first stimulable phosphor sheet 4A is moved by a sub-scanning means 9 in the sub-scanning direction indicated by the arrow Y. The sub-scanning means 9 may be constituted of an endless belt, or the like. At the same time, a laser beam 11, which serves as stimulating rays, is produced by a laser beam source 10. The laser beam 11 is deflected by a scanning mirror 12 and caused to scan the stimulable phosphor sheet 4A in the main scanning directions indicated by the double-headed arrow X. When the stimulable phosphor sheet 4A is exposed to the laser beam 11, it emits light 13 in proportion to the amount of energy stored thereon during its exposure to the radiation 2. The emitted light 13 enters a light guide member 14, which is made from a transparent acrylic plate, from its one edge face. The emitted light 13 is guided through repeated total reflection inside of the light guide member 14 and detected by a photomultiplier 15. The photomultiplier 15 generates an output signal SA corresponding to the amount of the emitted light 13, i.e. representing the radiation image stored on the stimulable phosphor sheet 4A.

The output signal SA is logarithmically amplified by a logarithmic amplifier 16 and is then converted by an analog-to-digital converter 17 into a digital image signal S1. The digital image signal S1 is stored on a storage medium 18, such as a magnetic disk. Thereafter, the radiation image stored on the second stimulable phosphor sheet 4B is read out in the same manner as that described above, and an output signal SB representing the radiation image is thereby obtained. The output signal SB is logarithmically amplified by the logarithmic amplifier 16 and is then converted by the analog-to-digital converter 17 into a digital image signal S2. The digital image signal S2 is stored on the storage medium 18.

Figure 3:
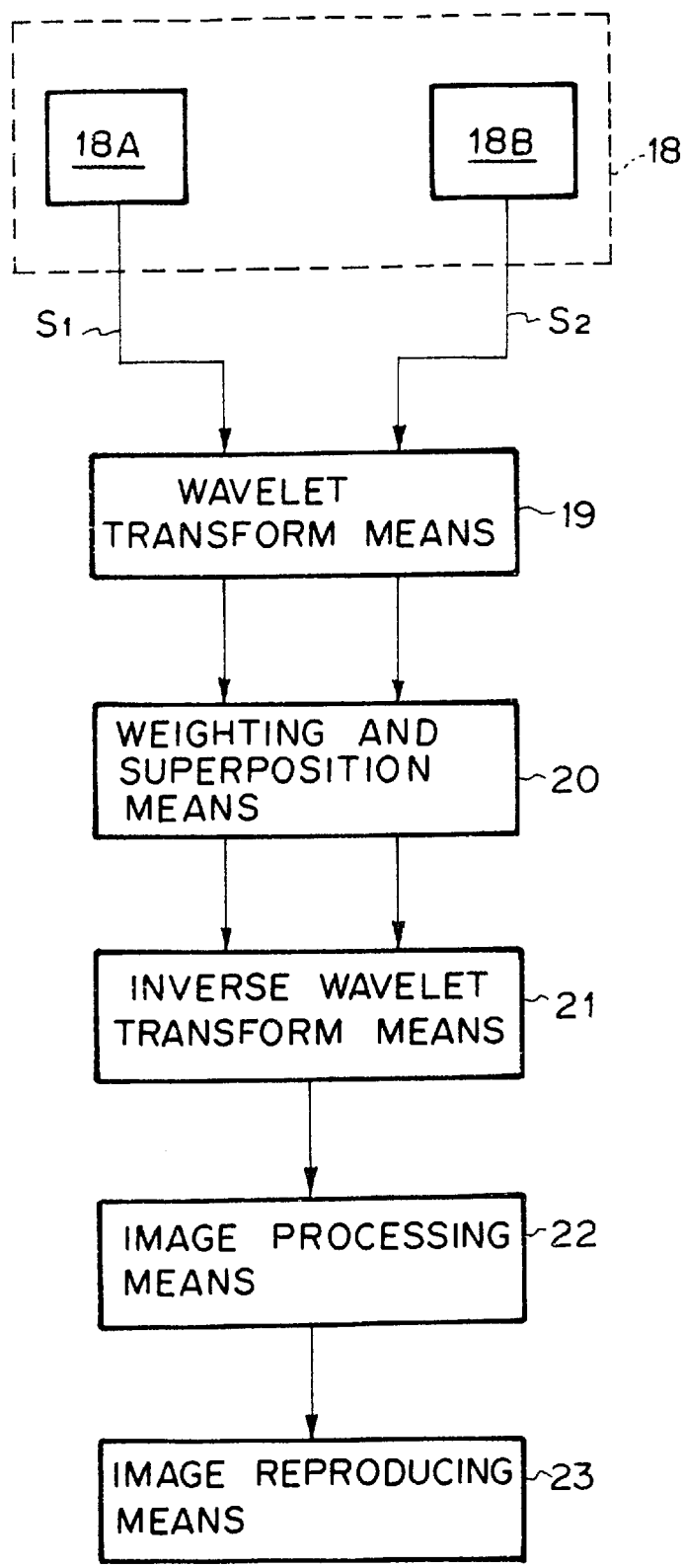
FIG. 3 is a block diagram showing an apparatus for carrying out a first embodiment of the superposition processing method for a radiation image in accordance with the present invention.

Thereafter, a superposition processing is carried out on the image signals S1 and S2. FIG. 3 is a block diagram showing an apparatus for carrying out a first embodiment of the superposition processing method for a radiation image in accordance with the present invention. First, the image signals S1 and S2 are read from an image file 18A and an image file 18B in the storage medium 18 and fed into a wavelet transform means 19. The wavelet transform means 19 carries out a wavelet transform of each of the two image signals S1 and S2 and decomposes each of the two image signals S1 and S2 into a plurality of wavelet transform factor signals, each of which is of one of a plurality of different frequency bands. How the wavelet transform is carried out will be described hereinbelow.

Figure 4:
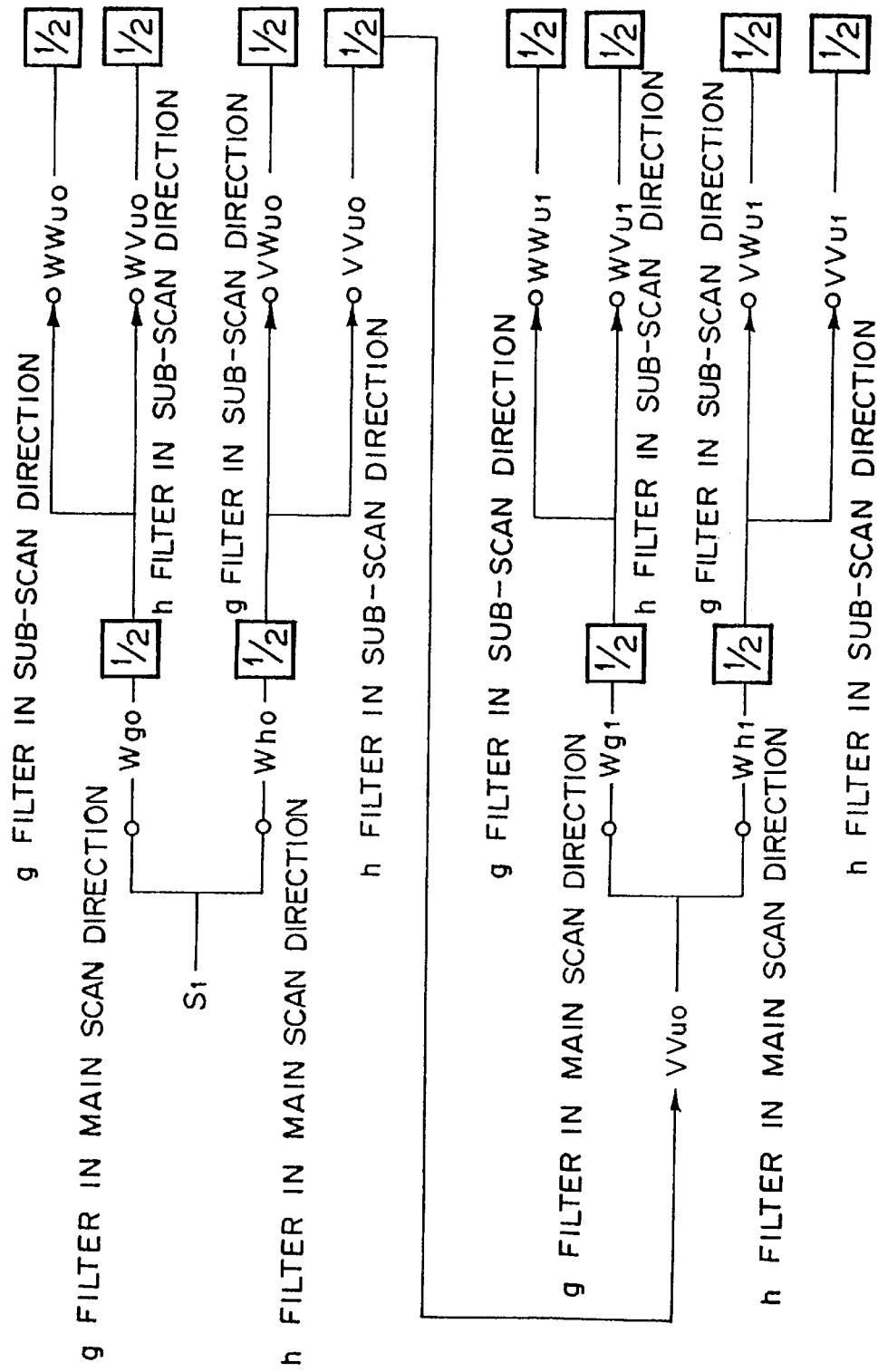
FIG. 4 is a flow chart showing how a wavelet transform is carried out.

FIG. 4 is a flow chart showing how the wavelet transform is carried out on each of the image signals S1 and S2. As an aid in facilitating the explanation, how the wavelet transform of the image signal S1 is carried out will be described hereinbelow.

In this embodiment, an orthogonal wavelet transform, in which the respective wavelet transform factors are orthogonal, is carried out. The orthogonal wavelet transform is described in the aforesaid literature of Marc Antonini, et al.

As illustrated in FIG. 4, filtering processing is carried out with a function g and a function h, which are obtained from the basic wavelet function, on the image signal components of the image signal Si representing picture elements in the radiation image, which are located along the main scanning direction. Specifically, the filtering processing on the image signal components of the image signal S1 representing each row of the picture elements, which are arrayed along the main scanning direction, is carried out with the function g and the function h each time the position of the filtering processing is shifted by a single picture element in the sub-scanning direction. In this manner, wavelet transform factor signals Wg0 and Wh0 with respect to the main scanning direction of the image signal S1 are obtained.

The function g and the function h can be uniquely obtained from the basic wavelet function. For example, the function h has the characteristics shown in Table 1 below. In Table 1, a function h' is the one which is used when an inverse wavelet transform is carried out on an image signal having been subjected to the wavelet transform. As will be understood from Formula (4), the function g can be obtained from the function h', and a function g' to be used during the inverse wavelet transform can be obtained from the function h.

TABLE 1

| n | 0 | ±1 | ±2 | ±3 | ±4 |
|---|---|---|---|---|---|
| $2^{-1/2}h$ | 0.602949 | 0.266864 | −0.078223 | −0.016864 | 0.026749 |
| $2^{-1/2}h'$ | 0.557543 | 0.295636 | −0.028772 | −0.045636 | 0 |

$$g' = (-1)^n h$$

$$g = (-1)^n h' \tag{4}$$

The wavelet transform factor signals Wg0 and Wh0 are obtained in the manner described above. Thereafter, for each of the wavelet transform factor signals Wg0 and Wh0, the signal components representing the picture elements located along the main scanning direction are thinned out alternately. In this manner, the number of the picture elements located along the main scanning direction is reduced to ½. Filtering processing is then carried out with the function g and the function h on the signal components of the thinned-out wavelet transform factor signals Wg0 and Wh0, which signal components represent picture elements located along the sub-scanning direction. From the filtering processing, wavelet transform factor signals $WW_{U0}$, $WV_{U0}$, $VW_{U0}$, and $VV_{U0}$ are obtained.

Thereafter, for each of the wavelet transform factor signals $WW_{U0}$, $WV_{U0}$, $VW_{U0}$, and $VV_{U0}$, the signal components representing the picture elements located along the sub-scanning direction are thinned out alternately. In this manner, the number of the picture elements located along the sub-scanning direction is reduced to ½. As a result, the number of the picture elements represented by each of the thinned wavelet transform factor signals $WW_{U0}$, $WV_{U0}$, $VW_{U0}$, and $VV_{U0}$ becomes equal to ¼ of the number of the picture elements represented by the image signal S1. Filtering processing is then carried out with the function g and the function h on the signal components of the wavelet transform factor signal $VV_{U0}$, which represent picture elements located along the main scanning direction.

Specifically, the filtering processing on the image signal components of the wavelet transform factor signal $VV_{U0}$ representing each row of the picture elements, which are arrayed along the main scanning direction, is carried out with the function g and the function h each time the position of the filtering processing is shifted by a single picture element in the sub-scanning direction. In this manner, wavelet transform factor signals Wg1 and Wh1 with respect to the main scanning direction of the wavelet transform factor signal $VV_{U0}$ are obtained.

The number of the picture elements represented by the wavelet transform factor signal $VV_{U0}$ is equal to ½ of the number of the picture elements, which are represented by the original image signal, both in the main scanning direction and in the sub-scanning direction, or ¼ of the picture elements of S1. Therefore, the resolution of the image represented by the wavelet transform factor signal $VV_{U0}$ is equal to ½ of the resolution of the image represented by the original image signal. Accordingly, as a result of the filtering processing carried out with the function g and the function h on the wavelet transform factor signal $VV_{U0}$, the wavelet transform factor signals Wg1 and Wh1 representing the frequency components, which are lower than the frequency components represented by the wavelet transform factor signal $VV_{U0}$ and which are among the frequency components of the original image signal, are obtained.

The wavelet transform factor signals Wg1 and Wh1 are obtained in the manner described above. Thereafter, for each of the wavelet transform factor signals Wg1 and Wh1, the signal components representing the picture elements located along the main scanning direction are thinned out alternately. In this manner, the number of the picture elements located along the main scanning direction is reduced even further by ½. Filtering processing is then carried out with the function g and the function h on the signal components of the thinned-out wavelet transform factor signals Wg1 and Wh1, which signal components represent picture elements located along the sub-scanning direction. From the filtering processing, wavelet transform factor signals $WW_{U1}$, $WV_{U1}$, $VW_{U1}$, and $VV_{U1}$ are obtained.

Thereafter, for each of the wavelet transform factor signals $WW_{U1}$, $WV_{U1}$, $VW_{U1}$, and $VV_{U1}$, the signal components representing the picture elements located along the sub-scanning direction are thinned out alternately. In this manner, the number of the picture elements located along the sub-scanning direction is reduced by ½. As a result, the number of the picture elements represented by each of the thinned wavelet transform factor signals $WW_{U1}$, $WV_{U1}$, $VW_{U1}$ and $VV_{U1}$ becomes equal to ¹⁄₁₆ of the number of the picture elements represented by the image signal S1.

Thereafter, in the same manner as that described above, filtering processing is carried out with the function g and the function h on the signal components of the thinned-out wavelet transform factor signal $VV_{U1}$, which represent picture elements located along the main scanning direction. Then, for each of the wavelet transform factor signals, which have thus been obtained, the signal components representing the picture elements located along the main scanning direction are thinned out alternately. Filtering processing is then carried out with the function g and the function h on the signal components of the thinned-out wavelet transform factor signals, which signal components represent picture elements located along the sub-scanning direction. From the filtering processing, wavelet transform factor signals $WW_{U2}$, $WV_{U2}$, $VW_{U2}$, and $VV_{U2}$ are obtained.

The wavelet transform described above is iterated N number of times, and wavelet transform factor signals $WW_{U0}$ through $WW_{UN}$, $WV_{U0}$ through $WV_{UN}$, $VW_{U0}$ through $VW_{UN}$, and $VV_{UN}$ are thereby obtained. The number of the picture elements represented by each of the wavelet transform factor signals $WW_{UN}$, $WV_{UN}$, $VW_{UN}$, and $VV_{UN}$, which are obtained from the N'th wavelet transform, is equal to $(½)^N$ of the number of the picture elements, which are represented by the original image signal, both in the main scanning direction and in the sub-scanning direction. Therefore, as the value of N becomes larger, each wavelet transform factor signal is of a lower frequency band and represents lower frequency components among the frequency components of the original image signal.

Accordingly, a wavelet transform factor signal $WW_{Ui}$ (wherein i=0 to N, this also applies to the descriptions below) represents a change in the frequency of the image signal S1 both in the main scanning direction and in the sub-scanning direction. As the value of i becomes larger, the wavelet transform factor signal $WW_{Ui}$ becomes a lower frequency signal. A wavelet transform factor signal $WV_{Ui}$ represents a change in the frequency of the image signal S1 in the main scanning direction. As the value of i becomes larger, the wavelet transform factor signal $WV_{Ui}$ becomes a lower frequency signal. A wavelet transform factor signal $VW_{Ui}$ represents a change in the frequency of the image signal S1 in the sub-scanning direction. As the value of i becomes larger, the wavelet transform factor signal $VW_{Ui}$ becomes a lower frequency signal.

Figure 5:
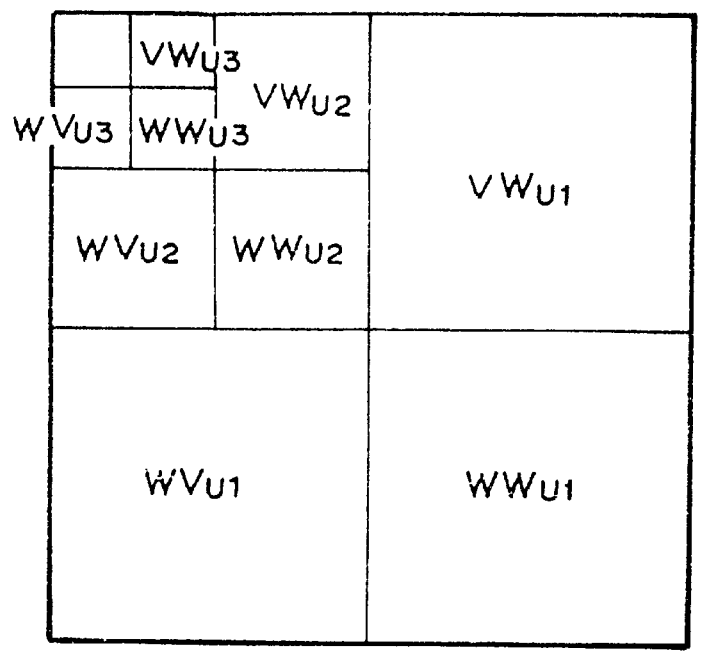
FIG. 5 is an explanatory view showing images represented by wavelet transform factor signals.

FIG. 5 shows images represented by the wavelet transform factor signals for the respective frequency bands. As an aid in facilitating the explanation, only the images represented by the wavelet transform factor signals obtained from the first, second, and third wavelet transforms are shown in FIG. 5. In FIG. 5, the wavelet transform factor signal $WW_{U3}$ represents an image, which is obtained by reducing the original image to $(½)^3$ in each of the main scanning direction and the sub-scanning direction.

The wavelet transforms are carried out on the image signal S2 in the same manner as that described above. From the wavelet transforms, wavelet transform factor signals $WW_{LO}$ through $WW_{LN}$, $WV_{LO}$ through $WV_{LN}$, $VW_{LO}$ through $VW_{LN}$, and $VV_{LN}$ are thereby obtained for the respective frequency bands.

The wavelet transform factor signals, which have thus been obtained by carrying out the wavelet transforms on the image signals S1 and S2, are fed into a weighting and superposition means 20. In the weighting and superposition means 20, a weighting process is carried out such that the value of the weight factor with respect to the frequency band, which has a low signal-to-noise ratio, may be rendered smaller than the value of the weight factor with respect to the frequency band, which has a high signal-to-noise ratio. How the value of the weight factor is determined will be described below.

Figure 6A:
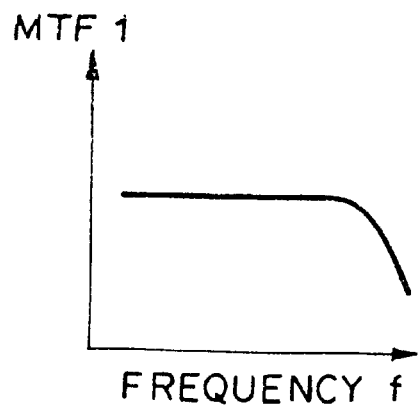
FIGS. 6A and 6B are graphs showing modulation transfer functions (MTF's) of image signals.
Figure 6B:
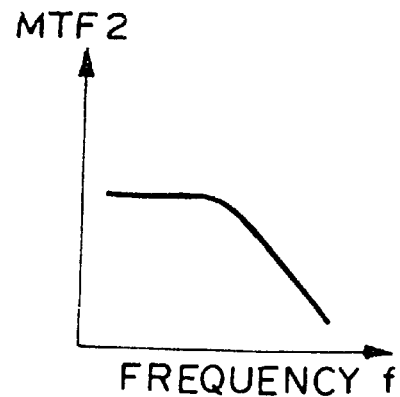

The image signals S1 and S2, which have been obtained from the two stimulable phosphor sheets 4A and 4B, respectively have the modulation transfer functions (MTF's, i.e.

frequency dependency characteristics) shown in FIGS. 6A and 6B. The MTF can be obtained by recording a contrast transfer function chart (CTF chart) and represents the level of the response of the image signal with respect to each frequency band. Specifically, as illustrated in FIG. 6A, the MTF1 of the image signal S1, which has been obtained from the stimulable phosphor sheet 4A located at the position closer to the radiation source during the image recording operation, takes a large value up to the high frequency band. Thus, the image signal S1 carries the information up to the high frequency band. On the other hand, as illustrated in FIG. 6B, the MTF2 of the image signal S2, which has been obtained from the stimulable phosphor sheet 4B located at the position remote from the radiation source during the image recording operation, takes a smaller value on the side of the high frequency band than the MTF1 of the image signal S1. Thus, in the image signal S2, the amount of information in the high frequency band is small. This indicates that the information in the high frequency band of the image signal S2 contains noise, due to scattered radiation during the image recording operation, or the like, and that the fine information on the high frequency band side has been rendered unsharp due to the location of the stimulable phosphor sheet 4B remote from the radiation source. Therefore, the wavelet transform factor signals, which are of a single frequency band, are weighted with the weight factors, such that the values of the weight factors may be varied in accordance with the MTF. The weighted wavelet transform factor signals, which are of a single frequency band, are then added to one another. How the values of the weight factors for the wavelet transform factor signals are determined will be described hereinbelow.

Figure 7A:
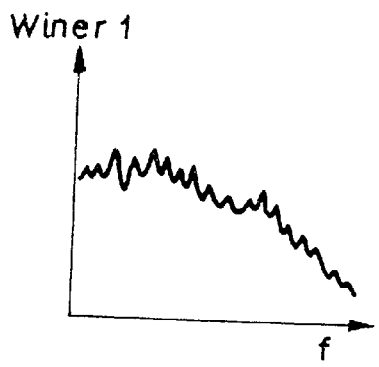
FIGS. 7A and 7B are graphs showing Winer spectra of image signals.
Figure 7B:
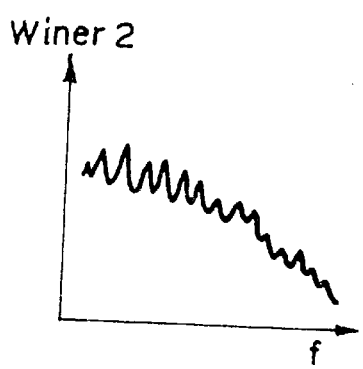

The frequency characteristics MTF1 and MTF2 of the image signals shown in FIGS. 6A and 6B are calculated. Also, as illustrated in FIGS. 7A and 7B, frequency characteristics Winer 1 and Winer 2 of noise of the image signals are calculated. Each of the Winer 1 and the Winer 2 represents the amount of dispersion of the noise image signal, which has been obtained by recording an image of only the noise, i.e. by carrying out the image recording operation without the object lying, with respect to each frequency. Specifically, as for the Winer 1, the image of only the noise is recorded, and a noise image signal Image (X1) is obtained from the upper stimulable phosphor sheet 4A. The calculation with Formula (5) is carried out on the Image (X1)

$$RMS^2 = \int \{image\,(X)\}^2 dx - \overline{image\,(X)}^2 \text{ (mean)} \tag{5}$$

and the value of $RMS^2$ is thus obtained. The value of $RMS^2$ is plotted for each frequency. In this manner, the Winer 1 shown in FIG. 7A is obtained. In the same manner, the Winer 2 shown in FIG. 7B is obtained.

A Detective Quantum Efficency (DQE) index is defined by Formula (6).

$$DQE\,(MTF)^2/Winer \tag{6}$$

Formula (6) indicates that a higher DQE value represents better image quality. The DQE is calculated for each frequency.

Thereafter, the image signals, Image 1 (X) and Image 2 (X), for each frequency band, which are obtained when the MTF1 and MTF2 are obtained, are added to each other, and an addition image signal add(t) is thereby obtained. The calculation is carried out with Formula (7).

$$add(t) = t \times \text{Image } 1(X) + (1-t) \times \text{Image } 2(X) \tag{7}$$

Figure 8A:
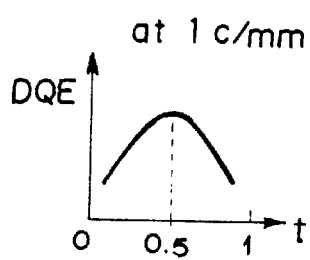
FIGS. 8A, 8B, and 8C are graphs showing DQE's for different frequency bands.
Figure 8B:
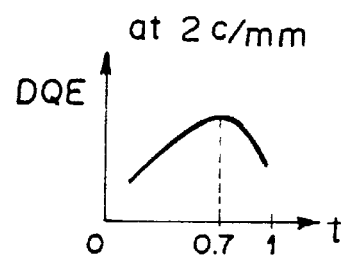
Figure 8C:
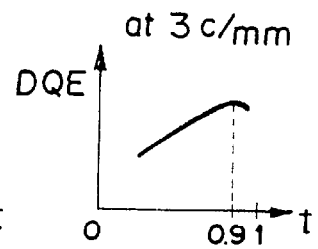

The value of t is changed between 0 and 1, and a plurality of addition image signals add(t) are thereby obtained. The DQE is calculated for each of the addition image signals add(t) and plotted on the graph, in which the value of t is plotted on the horizontal axis, and the DQE is plotted on the vertical axis. FIGS. 8A, 8B, and 8C are graphs showing the relationship between t and DQE having been obtained for each of the plurality of frequency bands. As illustrated in FIG. 8A, when the frequency band is 1 cycle/mm (indicated as 1 c/mm in FIG. 8A), the DQE takes the largest value at t=0.5. Also, as illustrated in FIG. 8B, when the frequency band is 2 cycles/mm, the DQE takes the largest value at t=0.7. Further, as illustrated in FIG. 8C, when the frequency band is 3 cycles/mm, the DQE takes the largest value at t=0.9.

Figure 9:
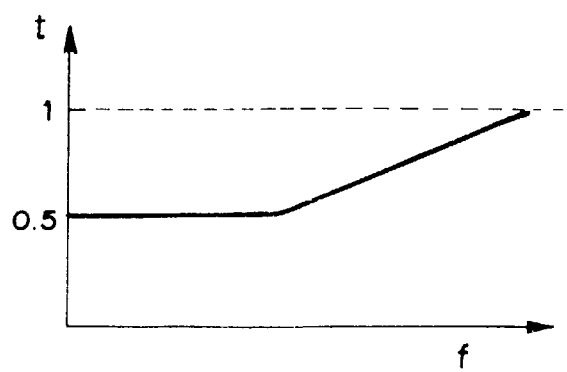
FIG. 9 is a graph showing a weight table.

When the value of t, which is associated with the largest value of DQE with respect to each of the frequency bands, is plotted, the weight table shown in FIG. 9 can be obtained. The wavelet transform factor signals, which are of a single frequency band, are weighted in accordance with the weight table shown in FIG. 9, and the weighted wavelet transform factor signals, which are of a single frequency band, are then added to one another.

Specifically, the weighted additions of the wavelet transform factor signals, which are of a single frequency band, are carried out with Formula (8)

$$WW_i = t \cdot WW_{Ui} + (1-t)\,WW_{Li}$$

$$WV_i = t \cdot WV_{Ui} + (1-t)\,WV_{Li}$$

$$VW_i = t \cdot VW_{Ui} + (1-t)\,VW_{Li}$$

$$VV_i = t \cdot VV_{Ui} + (1-t)\,VV_{Li} \tag{8}$$

For example, the wavelet transform factor signal $WW_{L1}$ contains more noise and a smaller amount of information than the wavelet transform factor signal $WW_{U1}$. Therefore, when an addition wavelet transform factor signal $WW_1$ for the high frequency band is to be obtained, the value of t is set to be large. Specifically, the addition wavelet transform factor signal $WW_1$ is calculated with Formula (9).

$$WW_1 = 0.8 \times WW_{U1} + 0.2 \times WW_{L1} \tag{9}$$

When addition wavelet transform factor signals $WV_1$ and $VW_1$ are to be obtained, the weighting may be carried out in the same manner as that for the addition wavelet transform factor signal $WW_1$.

Also, the differences in the amount of noise and the amount of information between the wavelet transform factor signals $WW_{L2}$ and $WW_{U2}$ are not so large as the differences between the wavelet transform factor signals $WW_{L1}$ and $WW_{U1}$. Therefore, in cases where an addition wavelet transform factor signal $WW_2$ for a frequency band lower than the frequency band of the addition wavelet transform factor signal $WW_1$ is to be obtained, the value of t is set to be approximately 0.6. The addition wavelet transform factor signal $WW_2$ is thus calculated with Formula (10).

$$WW_2 = 0.6 \times WW_{U2} + 0.4 \times WW_{L2} \tag{10}$$

When addition wavelet transform factor signals $WV_2$ and $VW_2$ are to be obtained, the weighting may be carried out in the same manner as that for the addition wavelet transform factor signal $WW_2$.

Further, the wavelet transform factor signals $WW_{L3}$ and $WW_{U3}$ represent approximately the same amounts of information. Therefore, in cases where an addition wavelet transform factor signal $WW_3$ for a frequency band lower than the frequency band of the addition wavelet transform factor signal $WW_2$ is to be obtained, the value of t is set to be 0.5. The addition wavelet transform factor signal $WW_3$ is thus calculated with Formula (11).

$$WW_3 = 0.5 \times WW_{U3} + 0.5 \times WW_{L3} \tag{11}$$

When addition wavelet transform factor signals $WV_3$ and $VW_3$ are to be obtained, the weighting may be carried out in the same manner as that for the addition wavelet transform factor signal $WW_3$.

Furthermore, the wavelet transform factor signals $WW_{L4}$ and $WW_{U4}$, the wavelet transform factor signals $WW_{L5}$ and $WW_{U5}$, ..., the wavelet transform factor signals $WW_{LN}$ and $WW_{UN}$ respectively represent approximately the same amounts of information. Therefore, in cases where addition wavelet transform factor signals $WW_4$, $WW_5$, ... $WW_N$ for frequency bands lower than the frequency band of the addition wavelet transform factor signal $WW_3$ are to be obtained, the value of t is set to be 0.5.

The values of the weight factors are determined in the manner described above. Therefore, regardless of the characteristics of the MTF and the Wiener of the original image, appropriate values of the weight factors can be determined for each frequency.

In the manner described above, the addition wavelet transform factor signals $WW_1$ through $WW_N$, $WV_1$ through $WV_N$, $VW_1$ through $VW_N$, and $VV_1$ through $VV_N$ are obtained in the weighting and superposition means 20. Thereafter, in an inverse wavelet transform means 21, an inverse wavelet transform is carried out on each of the addition wavelet transform factor signals. How the inverse wavelet transform is carried out will be described hereinbelow.

Figure 10:
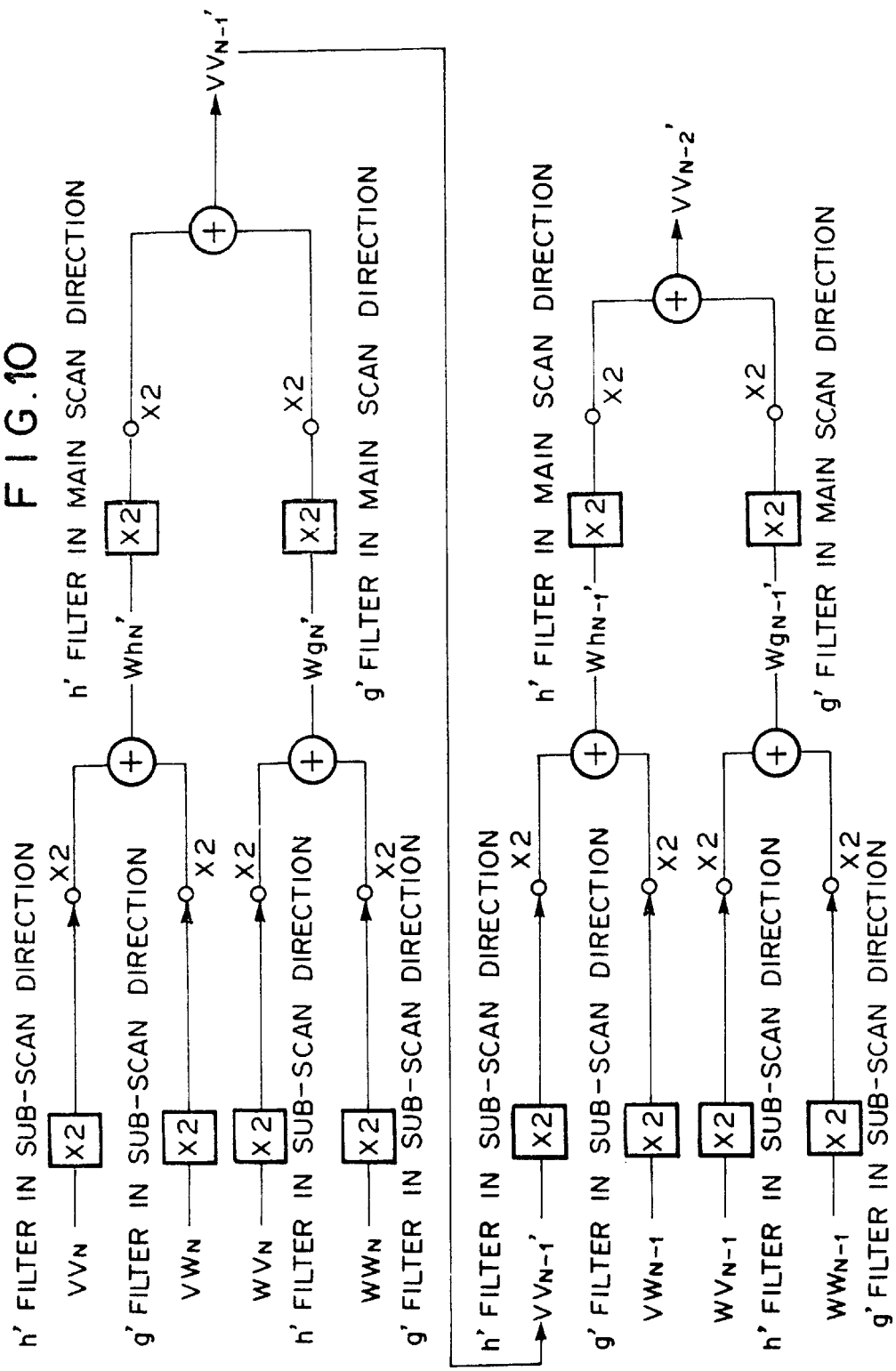
FIG. 10 is a flow chart showing how an inverse wavelet transform is carried out.

FIG. 10 is a flow chart showing how an inverse wavelet transform is carried out.

As illustrated in FIG. 10, each of the addition wavelet transform factor signals $VV_N$, $VW_N$, $WV_N$, and $WW_N$ is subjected to the processing for leaving a space, which has a length equal to the length of a single picture element, between adjacent picture elements located along the sub-scanning direction. (In FIG. 10, this processing is expressed as ×2.) Filtering processing is then carried out with a function h', which is different from the aforesaid function h, on the signal components of the addition wavelet transform factor signal $VV_N$ provided with the spaces, which signal components represent picture elements located along the sub-scanning direction. Also, filtering processing is carried out with a function g', which is different from the aforesaid function g, on the signal components of the addition wavelet transform factor signal $VW_N$ provided with the spaces, which signal components represent picture elements located along the sub-scanning direction.

Specifically, the filtering processing on the image signal components of the addition wavelet transform factor signal $VV_N$ representing each column of the picture elements, which are arrayed along the sub-scanning direction, is carried out with the function h' each time the position of the filtering processing is shifted by a single picture element in the main scanning direction. Also, the filtering processing on the image signal components of the addition wavelet transform factor signal $VW_N$ representing each column of the picture elements, which are arrayed along the sub-scanning direction, is carried out with the function g' each time the position of the filtering processing is shifted by a single picture element in the main scanning direction. In this manner, inverse wavelet transform factor signals are obtained from the addition wavelet transform factor signals $VV_N$ and $VW_N$. The inverse wavelet transform factor signals are then doubled and added to each other. In this manner, an inverse wavelet transform factor signal WhN' is obtained.

As described above, the function for the wavelet transform and the function for the inverse wavelet transform are different from each other. Specifically, it is difficult to design functions, which become identical in the wavelet transform and the inverse wavelet transform, i.e. which are the orthogonal functions. Therefore, it is necessary to relieve the conditions of orthogonality, continuity, shortness of function, or symmetry. Accordingly, in this embodiment, the conditions of orthogonality are relieved, and the functions satisfying the other conditions are thereby selected.

As described above, in this embodiment, the functions h and g for the wavelet transform and the functions h' and g' for the inverse wavelet transform are biorthogonal different functions. Therefore, the addition signal of the image signals S1 and S2 can be perfectly restored by subjecting the addition wavelet transform factor signals $VV_i$, $VW_i$, $WV_i$, and $WW_i$ to the inverse wavelet transform with the functions h' and g'.

Also, filtering processing is carried out with the function h' on the signal components of the addition wavelet transform factor signal $WV_N$, which represent picture elements located along the sub-scanning direction. Also, filtering processing is carried out with the function g' on the signal components of the addition wavelet transform factor signal $WW_N$, which represent picture elements located along the sub-scanning direction. In this manner, inverse wavelet transform factor signals are obtained from the addition wavelet transform factor signals $WV_N$ and $WW_N$. The inverse wavelet transform factor signals are then doubled and added to each other. In this manner, an inverse wavelet transform factor signal WgN' is obtained.

Thereafter, each of the inverse wavelet transform factor signals WhN' and WgN' is subjected to the processing for leaving a space, which has a length equal to the length of a single picture element, between adjacent picture elements located along the main scanning direction. Filtering processing is then carried out with the function h' on the signal components of the inverse wavelet transform factor signal WhN', which represent picture elements located along the main scanning direction. Also, filtering processing is carried out with the function g' on the signal components of the inverse wavelet transform factor signal WgN', which represent picture elements located along the main scanning direction. In this manner, inverse wavelet transform factor signals are obtained from the inverse wavelet transform factor signals WhN' and WgN'. The inverse wavelet transform factor signals, which have thus been obtained, are then doubled and added to each other. In this manner, an addition inverse wavelet transform factor signal $VV_{N-1}'$ is obtained.

Thereafter, each of the addition inverse wavelet transform factor signal $VV_{N-1}'$ and the addition wavelet transform factor signals $VW_{N-1}$, $WV_{N-1}$, and $WW_{N-1}$ is subjected to the processing for leaving a space, which has a length equal to the length of a single picture element, between adjacent picture elements located along the sub-scanning direction. Filtering processing is then carried out with the function h' on the signal components of the addition inverse wavelet transform factor signal $VV_{N-1}'$, which represent picture elements located along the sub-scanning direction. Also, filtering processing is carried out with the function g' on the signal components of the addition wavelet transform factor signal $VW_{N-1}$, which represent picture elements located along the sub-scanning direction.

Specifically, the filtering processing on the image signal components of the addition inverse wavelet transform factor signal $VV_{N-1}'$ representing each column of the picture elements, which are arrayed along the sub-scanning direction, is carried out with the function h' each time the position of the filtering processing is shifted by a single picture element in the main scanning direction. Also, the filtering processing on the image signal components of the addition wavelet transform factor signal $VW_{N-1}$ representing each column of the picture elements, which are arrayed along the sub-scanning direction, is carried out with the function g' each time the position of the filtering processing is shifted by a single picture element in the main scanning direction. In this manner, inverse wavelet transform factor signals are obtained from the addition inverse wavelet transform factor signal $VV_{N-1}'$ and the addition wavelet transform factor signal $VW_{N-1}$. The inverse wavelet transform factor signals, which have been obtained in this manner, are then doubled and added to each other. In this manner, an inverse wavelet transform factor signal WhN−1' is obtained.

Also, filtering processing is carried out with the function h' on the signal components of the addition wavelet transform factor signal $WV_{N-1}$, which represent picture elements located along the sub-scanning direction. Also, filtering processing is carried out with the function g' on the signal components of the addition wavelet transform factor signal $WW_{N-1}$, which represent picture elements located along the sub-scanning direction. In this manner, inverse wavelet transform factor signals are obtained from the addition wavelet transform factor signals $WV_{N-1}$ and $WW_{N-1}$. The inverse wavelet transform factor signals, which have been obtained in this manner, are then doubled and added to each other. In this manner, an inverse wavelet transform factor signal WgN−1' is obtained.

Thereafter, each of the inverse wavelet transform factor signals WhN−1' and WgN−1' is subjected to the processing for leaving a space, which has a length equal to the length of a single picture element, between adjacent picture elements located along the main scanning direction. Filtering processing is then carried out with the function h' on the signal components of the inverse wavelet transform factor signal WhN−1', which represent picture elements located along the main scanning direction. Also, filtering processing is carried out with the function g' on the signal components of the inverse wavelet transform factor signal WgN−1', which represent picture elements located along the main scanning direction. In this manner, inverse wavelet transform factor signals are obtained from the inverse wavelet transform factor signals WhN−1' and WgN−1'. The inverse wavelet transform factor signals, which have been obtained in this manner, are then doubled and added to each other. In this manner, an addition inverse wavelet transform factor signal $VV_{N-2}'$ is obtained.

Thereafter, addition inverse wavelet transform factor signals $VV_i'$ (wherein i=−1 to N) are sequentially created, and an addition inverse wavelet transform factor signal $VV_{-1}'$ is finally obtained. The finally obtained addition inverse wavelet transform factor signal VV_1' serves as an addition image signal Sadd of the image signals S1 and S2.

The addition inverse wavelet transform factor signal $VV_{-1}'$, which has thus been obtained, is subjected to predetermined image processing in an image processing means 22, fed into an image reproducing means 23, and used for the reproduction of a visible radiation image.

The image reproducing means may be a display device, such as a cathode ray tube (CRT) display device, or a recording apparatus for recording an image on photosensitive film by scanning the photosensitive film with a light beam.

In the manner described above, the wavelet transform is carried out on each of the two image signals S1 and S2 and each of the two image signals S1 and S2 is thereby decomposed into a plurality of the wavelet transform factor signals, each of which is of one of a plurality of different frequency bands. The wavelet transform factor signals, which are of a single frequency band, are weighted with the weight factors, such that the values of the weight factors may be varied for the wavelet transform factor signals of the different frequency bands. As for the wavelet transform factor signals for the high frequency band, the value of the weight factor with respect to the image signal, which has been obtained from the stimulable phosphor sheet located at the position closer to the radiation source, is set to be larger than the value of the weight factor with respect to the image signal, which has been obtained from the stimulable phosphor sheet located at the position remote from the radiation source. In this manner, it is possible to obtain an addition wavelet transform factor signal, in which the noise components contained in the image signal obtained from the stimulable phosphor sheet located at the position remote from the radiation source have been reduced. Each of the addition wavelet transform factor signals, which have thus been obtained, is subjected to the inverse wavelet transform, and an addition signal is thereby obtained. From the addition signal thus obtained, an image having good image quality and containing little noise component can be reproduced.

In the embodiment described above, the functions having the characteristics shown in Table 1 are employed as the functions h and h' for the wavelet transform. Alternatively, the functions having the characteristics shown in Table 2 or Table 3 may be employed as the functions h and h' for the wavelet transform.

TABLE 2

| n | 0 | ±1 | ±2 | ±3 | ±4 |
|---|---|---|---|---|---|
| $2^{-1/2}$ h | 0.6 | 0.25 | −0.05 | 0 | 0 |
| $2^{-1/2}$ h' | 17/28 | 73/280 | −3/56 | −3/280 | 0 |

TABLE 3

| n | 0 | ±1 | ±2 | ±3 | ±4 |
|---|---|---|---|---|---|
| $2^{-1/2}$ h | 45/64 | 19/64 | −1/8 | −3/64 | 3/128 |
| $2^{-1/2}$ h' | 1/2 | 1/4 | 0 | 0 | 0 |

Also, any of other functions, which can carry out the wavelet transform, may be employed. For example, functions, which are not biorthogonal nor symmetric, but which are orthogonal, may be employed.

The wavelet transform may be carried out by using the functions, each of which is symmetric with respect to the axis of n=0 as shown in Table 1, 2, or 3, or functions, each of which is asymmetric with respect to the axis of n=0. In cases where the wavelet transform has been carried out by using the functions, each of which is asymmetric with respect to the axis of n=0, the inverse wavelet transform is carried out by using the functions, which are obtained by inverting the functions used for the wavelet transform with respect to the axis of n=0. Specifically, the functions g' and h' for carrying out the inverse wavelet transform with respect to the functions g and h, each of which is asymmetric with respect to the axis of n=0, are expressed as $$g[n]=g'[-n]$$

$$h[n]=h'[-n] \qquad (12)$$

wherein [−n] represents the inversion with respect to the axis.

In the embodiment described above, each of the two image signals S1 and S2 is decomposed by the wavelet transform into a plurality of the wavelet transform factor signals, each of which is of one of a plurality of different frequency bands. Alternatively, each of the two image signals S1 and S2 may be decomposed by a sub-band transform into a plurality of the transform factor signals, each of which is of one of a plurality of different frequency bands. With the wavelet transform, the filtering processing of the image signal is carried out with a single kind of the function, and the plurality of the transform factor signals, each of which is of one of a plurality of different frequency bands, are thereby obtained successively. On the other hand, with the sub-band transform, the filtering processing of the image signal is carried out with a plurality of functions having different periods, and the plurality of the transform factor signals, each of which is of one of a plurality of different frequency bands, are thereby obtained with a single, simultaneous process.

Figure 11:
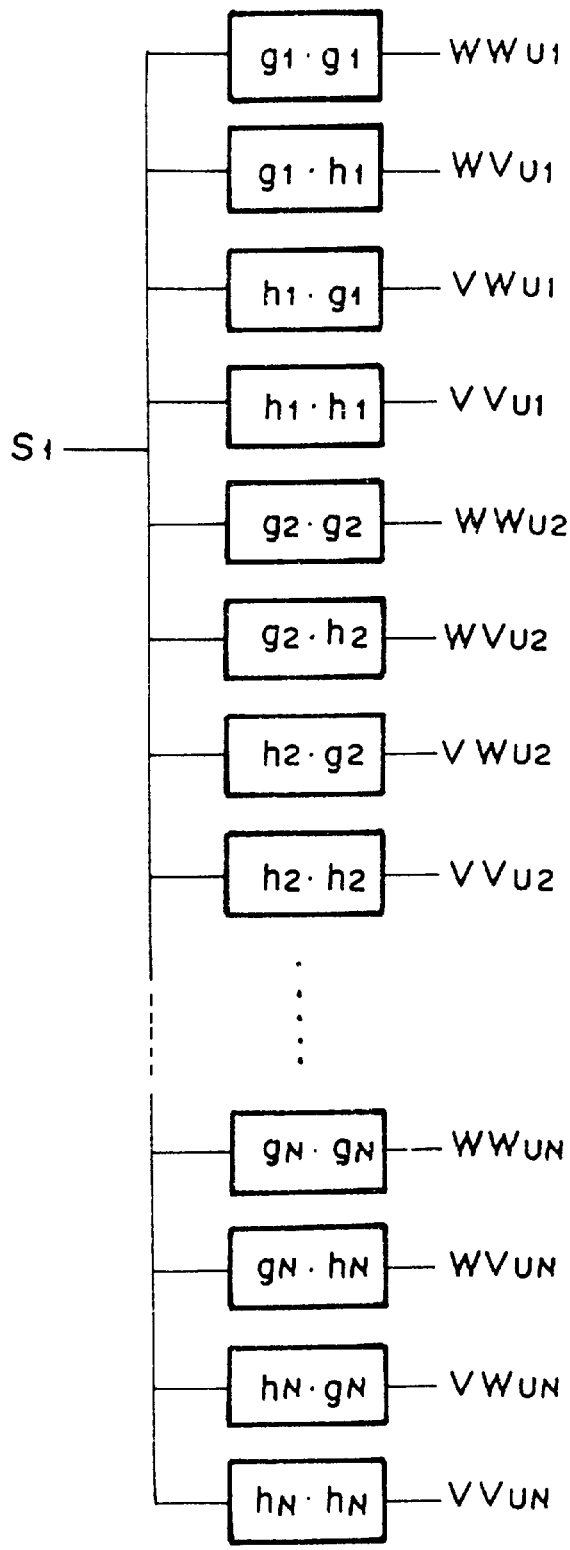
FIG. 11 is a flow chart showing how a sub-band transform is carried out.

For example, in the embodiment described above, the filtering processing of the image signal is carried out with the function g and the function h, and the image signals for the plurality of the frequency bands are thereby obtained. On the other hand, with the sub-band transform, as illustrated in FIG. 11, the filtering processing of the image signal S1 is carried out with a plurality of functions g1, h1, g2, h2, . . . , gN, hN such that the periods of the function g and the function h become two times, four times, . . . , $2^n$ times. In this manner, transform factor signals $WW_{U1}$ through $WW_{UN}$, $WV_{U1}$ through $WV_{UN}$, $VW_{U1}$ through $VW_{UN}$, and $VV_{U1}$ through $VV_{UN}$ are obtained for the plurality of frequency bands. Also, in the same manner, from the image signal S2 transform factor signals $WW_{L1}$ through $WW_{LN}$, $WV_{L1}$ through $WV_{LN}$, $VW_{L1}$ through $VW_{LN}$, and $VV_{L1}$ through $VV_{LN}$ are obtained for the plurality of frequency bands.

Thereafter, in the same manner as that in the aforesaid wavelet transform, the transform factor signals, which are of a single frequency band, are weighted with the weight factors, such that the values of the weight factors may be varied for the transform factor signals of the different frequency bands. The weighted transform factor signals, which are of a single frequency band, are then added to one another, and an addition transform factor signal is thereby obtained for each of the different frequency bands. An inverse sub-band transform is then carried out on the addition transform factor signal. In this manner, as in the wavelet transform, an addition signal Sadd can be obtained from the weighted addition.

Figure 12:
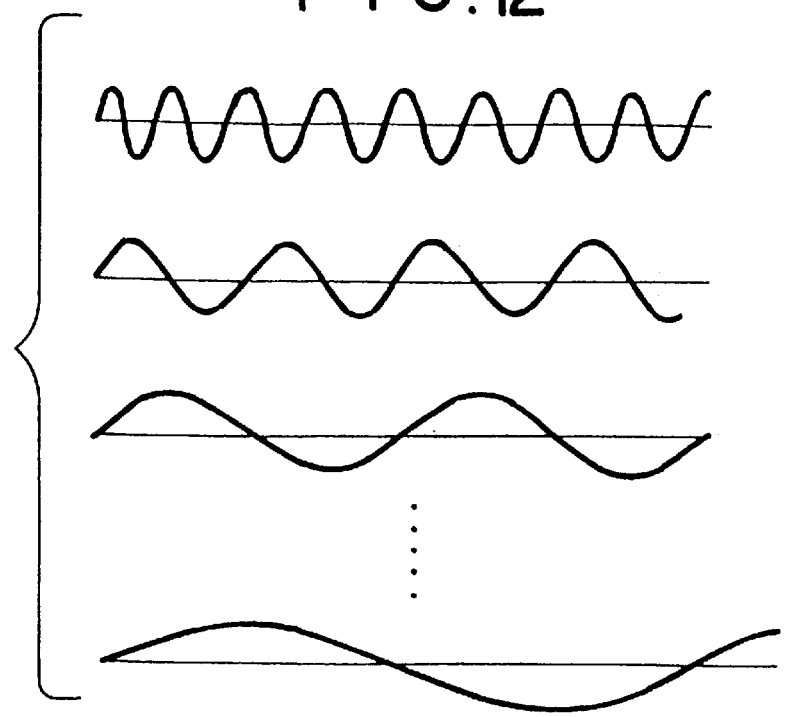
FIG. 12 is an explanatory view showing filters for carrying out a Fourier transform.

In the embodiment described above, with the wavelet transform or the sub-band transform, the image signal is transformed into a plurality of image signals, each of which is of one of a plurality of different frequency bands. As another alternative, the image signal may be transformed into a plurality of image signals, each of which is of one of a plurality of different frequency bands, by carrying out a Fourier transform. However, for example, as illustrated in FIG. 12, long filters for different frequency bands must be employed in the Fourier transform. Therefore, even if a fast Fourier transform process is employed, the apparatus for carrying out the superposition processing method for a radiation image in accordance with the present invention will become comparatively complicated. On the other hand, in cases where the wavelet transform or the sub-band transform, wherein the image signal can be decomposed with a short filter, is employed, the apparatus for carrying out the superposition processing method for a radiation image in accordance with the present invention can be kept simple.

The frequency dependency characteristics of the image will also vary for different doses of radiation delivered to the stimulable phosphor sheet. Therefore, the middle dose of radiation may be detected from the image read-out apparatus during the image read-out operation. Reference may be made to addition ratio tables for different doses of radiation, and the addition ratio between the image signals may be determined for each of different frequency bands.

Figure 13:
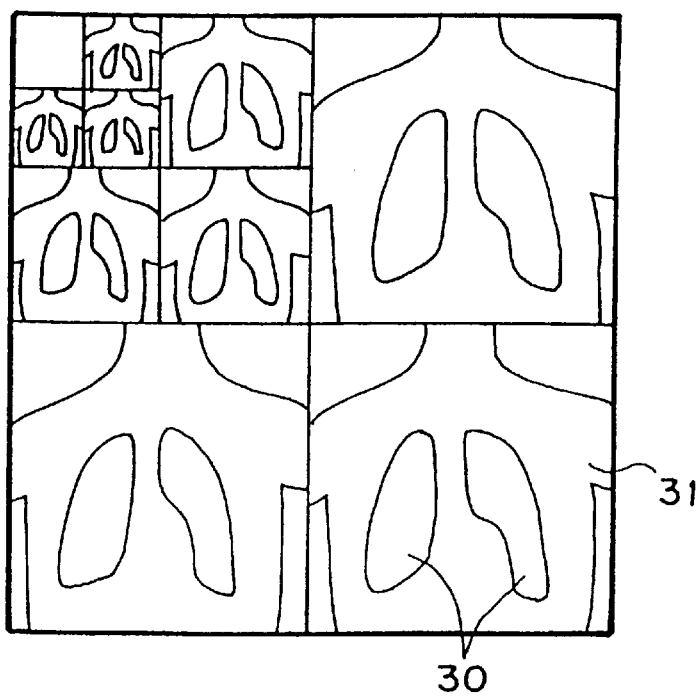
FIG. 13 is an explanatory view showing images, which are represented by transform factor signals obtained from a wavelet transform or a sub-band transform.

The transform factor signals, which have been obtained from the wavelet transform or the sub-band transform described above, constitute the image signals contracted from the original image signal. For example, as illustrated in FIG. 13, in cases where the image signal represents an image of the chest of a human body, the transform factor signals obtained from the wavelet transform or the sub-band transform of the image signal represent the images contracted from the original image. In such a chest image, the portions, which are to be used and therefore are required to have an appropriate image density in the reproduced image, are the lung field patterns. (In FIG. 13, lung field patterns 30, 30 are shown in the image represented by the transform factor signal $WW_{U1}$.) To the portions of the stimulable phosphor sheet, at which the lung field patterns 30, 30 are formed, a large dose of radiation reached during the operation for recording the radiation image.

As described above, the frequency dependency characteristics of the image vary for different doses of radiation delivered to the stimulable phosphor sheet. Therefore, the dose of radiation, which reached to each of portions of the radiation image during the operation for recording the radiation image, can be detected by carrying out, for example, an analysis of the probability density function of each of the transform factor signals, which have been obtained from the wavelet transform or the sub-band transform. Thereafter, the value of the weight factor with respect to the signal components of each transform factor signal representing a portion of the radiation image, to which a large dose of radiation reached during the operation for recording the radiation image, can be rendered larger than the value of the weight factor with respect to the signal components of each transform factor signal representing a portion of the radiation image, to which a small dose of radiation reached during the operation for recording the radiation image. In this manner, an image can be obtained which has good image quality and can serve as an effective tool in, particularly, the efficient and accurate diagnosis of an illness.

Specifically, the dose of radiation is calculated for each of the signal components of each transform factor signal. As for the signal components of each transform factor signal representing the picture elements in the lung field patterns, to which a large dose of radiation reached, the value of the weight factor is set to be large. For example, as for the image represented by the transform factor signal $WW_{U1}$ in FIG. 13, the superposition ratio of the signal components of the transform factor signal $WW_{U1}$, which represent the lung field patterns 30, 30, to the signal components of the transform factor signal $WW_{L1}$, which represent the lung field patterns 30, 30, is set to be 2:1. Also, the superposition ratio of the signal components of the transform factor signal $WW_{U1}$, which represent a portion 31 other than the lung field patterns 30, 30, to the signal components of the transform factor signal $WW_{L1}$, which represent the portion 31, is set to be 1:1. In this manner, the value of the weight factor with respect to the lung field patterns 30, 30, which are to be used and therefore are required to have an appropriate image density in the reproduced image, and to which a large dose of radiation reached during the operation for recording the radiation image, may be weighted even further, and the addition of the transform factor signals may thereby be carried out.

In the manner described above, the value of the weight factor during the addition may also be changed in accordance with the portions of the image. In such cases, an addition signal can be obtained such that the value of the weight factor may be varied for different doses of radiation, which reached to portions of the radiation image during the operation for recording the radiation image. Therefore, an image can be obtained which has better image quality and can serve as a more effective tool in, particularly, the efficient and accurate diagnosis of an illness.

Figure 14:
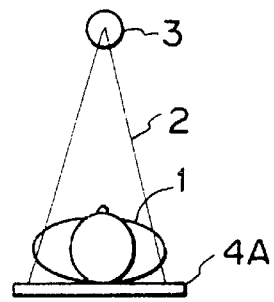
FIG. 14 is a schematic view showing how a radiation image is recorded on a single stimulable phosphor sheet.
Figure 15:
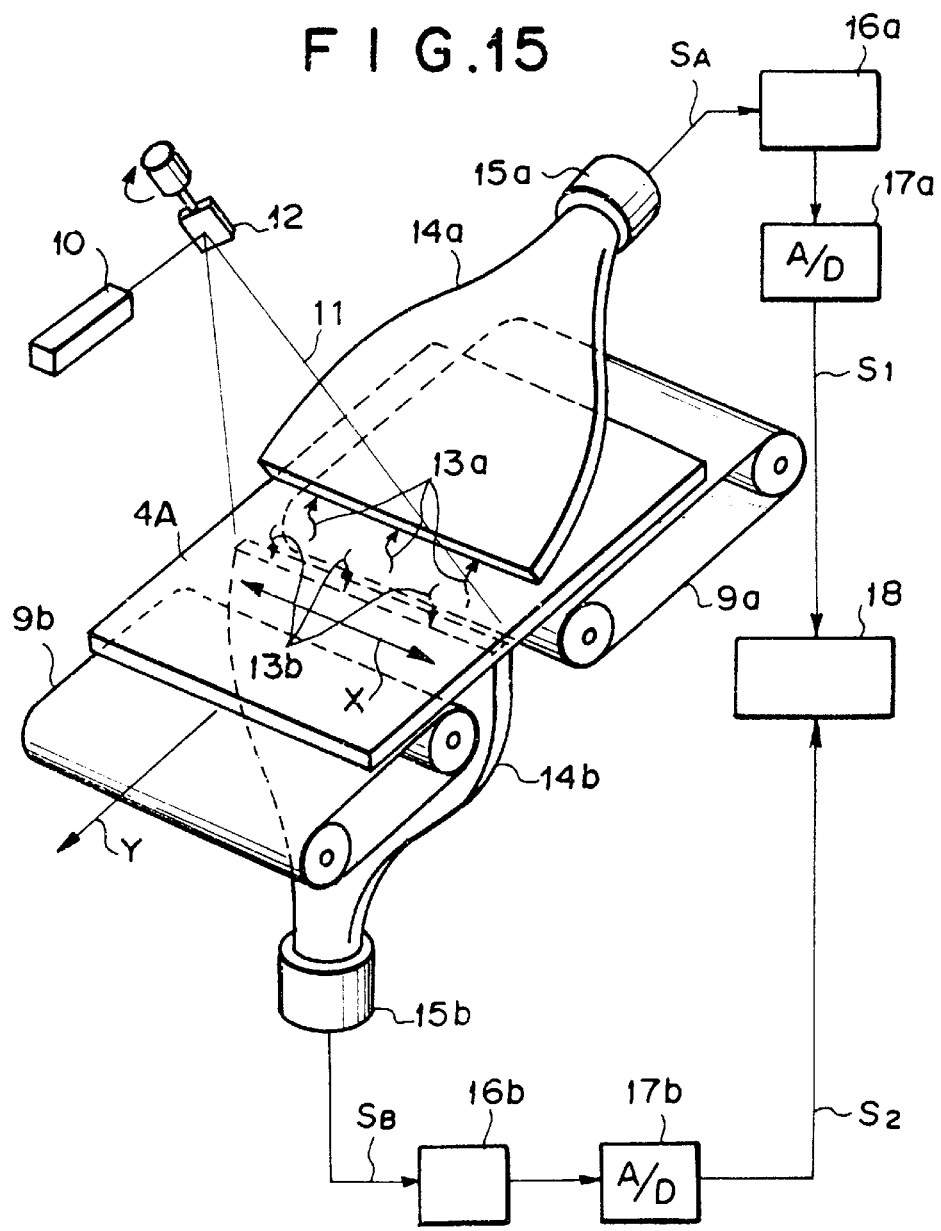
FIG. 15 is a perspective view showing an apparatus for detecting light emitted by two surfaces of a stimulable phosphor sheet.

In the embodiment described above, as illustrated in FIG. 1, the radiation images are recorded on the two stimulable phosphor sheets 4A and 4B. The image signals obtained from the two stimulable phosphor sheets 4A and 4B are then added to each other. Alternatively, as illustrated in FIG. 14, the radiation image of the object 1 may be recorded on the single stimulable phosphor sheet 4A. As illustrated in FIG. 15, two image signals to be added to each other may be obtained by detecting light emitted by the two surfaces of the stimulable phosphor sheet 4A. How the operation for detecting the light emitted by the two surfaces of the stimulable phosphor sheet 4A is carried out will be described hereinbelow.

With reference to FIG. 15, the stimulable phosphor sheet 4A is placed on endless belts 9a and 9b. The endless belts 9a and 9b are rotated by motors (not shown). A laser beam source 10 and a scanning mirror 12 are located above the stimulable phosphor sheet 4A. The laser beam source 10 produces a laser beam 11 serving as stimulating rays, which cause the stimulable phosphor sheet 4A to emit light in proportion to the amount of energy stored thereon during its exposure to the radiation. The scanning mirror 12 reflects and deflects the laser beam 11, which has been produced by the laser beam source 10, such that the laser beam 11 may scan the stimulable phosphor sheet 4A in main scanning directions. A light guide member 14a is located above and close to the position on the stimulable phosphor sheet 4A, which is being scanned with the laser beam 11. The light guide member 14a collects light, which is emitted by the stimulable phosphor sheet 4A when it is scanned with the laser beam 11, from above the stimulable phosphor sheet 4A. Also, a light guide member 14b is located below the position on the stimulable phosphor sheet 4A, which is being scanned with the laser beam 11. The light guide member 14b is located perpendicularly to the stimulable phosphor sheet 4A and collects the light, which is emitted by the stimulable phosphor sheet 4A when it is scanned with the laser beam 11, from below the stimulable phosphor sheet 4A. The light guide members 14a and 14b are located such that they may respectively be in close contact with photomultipliers 15a and 15b, which photoelectrically detects the light emitted by the stimulable phosphor sheet 4A. The photomultipliers 15a and 15b are respectively connected to logarithmic amplifiers 16a and 16b. The logarithmic amplifiers 16a and 16b are respectively connected to analog-to-digital converters 17a and 17b. The analog-to-digital converters 17a and 17b are connected to a memory 18.

The stimulable phosphor sheet 4A, on which the radiation image has been stored, is set at a predetermined position on the endless belts 9a and 9b. The stimulable phosphor sheet 4A, which has been set at the predetermined position, is conveyed by the endless belts 9a and 9b in a sub-scanning direction indicated by the arrow Y. Also, the laser beam 11 is produced by the laser beam source 10. The laser beam 11, which has been produced by the laser beam source 10, is reflected and deflected by the scanning mirror 12. The laser beam 11, which has thus been reflected and deflected by the scanning mirror 12, impinges upon the stimulable phosphor sheet 4A and scans it in the main scanning directions indicated by the double headed arrow X. The main scanning directions are approximately normal to the sub-scanning direction indicated by the arrow Y. When the stimulable phosphor sheet 4A is exposed to the laser beam 11, the exposed portion of the stimulable phosphor sheet 4A emits light in proportion to the amount of energy stored thereon during its exposure to the radiation. The light, which is emitted upwardly by the stimulable phosphor sheet 4A, is represented by reference numeral 13a. The light, which is emitted downwardly by the stimulable phosphor sheet 4A, is represented by reference numeral 13b. The emitted light 13a is guided by the light guide member 14a and photoelectrically detected by the photomultiplier 15a. The emitted light 13a, which has entered from the input end face of the light guide member 14a into the light guide member 14a, is guided through repeated total reflection inside of the light guide member 14a, emanates from the output end face of the light guide member 14a, and is received by the photomultiplier 15a. The amount of the emitted light 13a representing the radiation image is converted by the photomultiplier 15a into an electric signal. In the same manner as that described above, the emitted light 13b is guided by the light guide member 14b and is photoelectrically detected by the photomultiplier 15b.

The photomultiplier 15a generates an analog output signal SA. The analog output signal SA is logarithmically amplified by the logarithmic amplifier 16a and converted into a digital image signal S1 by the analog-to-digital converter 17a. The digital image signal S1 is then fed into the memory 18. Also, the photomultiplier 15b generates an analog output signal SB. The analog output signal SB is logarithmically amplified by the logarithmic amplifier 16b and converted into a digital image signal S2 by the analog-to-digital converter 17b. The digital image signal S2 is then fed into the memory 18. Each of the two image signals S1 and S2 is subjected to the wavelet transform or the sub-band transform and is thereby decomposed into a plurality of the transform factor signals, each of which is of one of a plurality of different frequency bands. Thereafter, in the same manner as that in the aforesaid embodiment, the transform factor signals, which are of a single frequency band, are weighted with the weight factors and added to each other. As for the transform factor signals for the high frequency band, the value of the weight factor with respect to the image signal S1, which has been obtained from the front surface side of the stimulable phosphor sheet 4A (i.e. the side of the stimulable phosphor sheet 4A, which was closer to the radiation source during the operation for recording the radiation image), is set to be larger than the value of the weight factor with respect to the image signal S2 which has been obtained from the back surface side of the stimulable phosphor sheet 4A (i.e. the side of the stimulable phosphor sheet 4A, which was remote from the radiation source during the operation for recording the radiation image). The addition transform factor signal, which has thus been obtained, is then subjected to the inverse wavelet transform, the inverse sub-band transform, or the inverse Fourier transform. As in the aforesaid embodiment, an image having good image quality and containing little noise component can be reproduced from the addition signal, which has thus been obtained.

In the operation for detecting the light emitted by the two surfaces of the stimulable phosphor sheet, the stimulable phosphor sheet 4A is scanned with the laser beam 11, which has been produced by the single laser beam source 10. Alternatively, as illustrated in FIG. 16, a laser beam source 10a and a scanning mirror 12a may be located on the front surface side of the stimulable phosphor sheet 4A. Also, a laser beam source lob and a scanning mirror 12b may be located on the back surface side of the stimulable phosphor sheet 4A. The two surfaces of the stimulable phosphor sheet 4A may be scanned respectively with laser beams 11a and 11b, which have been produced by the laser beam sources 10a and 10b. The light emitted by the two surfaces of the stimulable phosphor sheet 4A may thus be detected, and two image signals may thereby be obtained.

In the same manner as that in the aforesaid embodiment, in cases where the image signals S1 and S2 which have been obtained from the operation for detecting the light emitted by the two surfaces of the stimulable phosphor sheet, are subjected to the wavelet transform or the sub-band transform, the value of the weight factor during the addition may be changed in accordance with the portions of the image. In such cases, an addition signal can be obtained such that the value of the weight factor may be varied for different doses of radiation, which reached to different portions of the radiation image during the operation for recording the radiation image. Therefore, an image can be obtained which has better image quality and can serve as a more effective tool in, particularly, the efficient and accurate diagnosis of an illness.

In the embodiment described above, the processing for rendering the value of the weight factor with respect to the frequency components, which have a low signal-to-noise ratio, smaller than the value of the weight factor with respect to the frequency components, which have a high signal-to-noise ratio, in accordance with the frequency characteristics of each of the image signals S1 and S2 is carried out with the wavelet transform or the Fourier transform on the image signals S1 and S2 having been digitized by the analog-to-digital converter 17 or the analog-to-digital converters 17a and 17b. Alternatively, the processing described above may be carried out on the analog output signals SA and SB, which have been obtained from the stimulable phosphor sheets 4A and 4B in the radiation image read-out apparatus shown in FIG. 2, or which have been obtained from the stimulable phosphor sheet 4A in the radiation image read-out apparatus shown in FIG. 15 or FIG. 16.

How the processing described above is carried out on the analog output signals SA and SB will be described hereinbelow.

FIG. 17 is a block diagram showing how the processing is carried out on the analog output signals SA and SB. As described above, the analog output signals SA and SB are obtained from the stimulable phosphor sheets 4A and 4B in the radiation image read-out apparatus shown in FIG. 2, or are obtained from the stimulable phosphor sheet 4A in the radiation image read-out apparatus shown in FIG. 15 or FIG. 16. As illustrated in FIG. 17, the analog output signals SA and SB are respectively fed into logarithmic amplifiers 16a and 16b. The analog output signals SA and SB, which have been logarithmically amplified by the logarithmic amplifiers 16a and 16b, are respectively fed into frequency processing circuits 40a and 40b. In the frequency processing circuits 40a and 40b, the processing described below is carried out.

Figure 18:
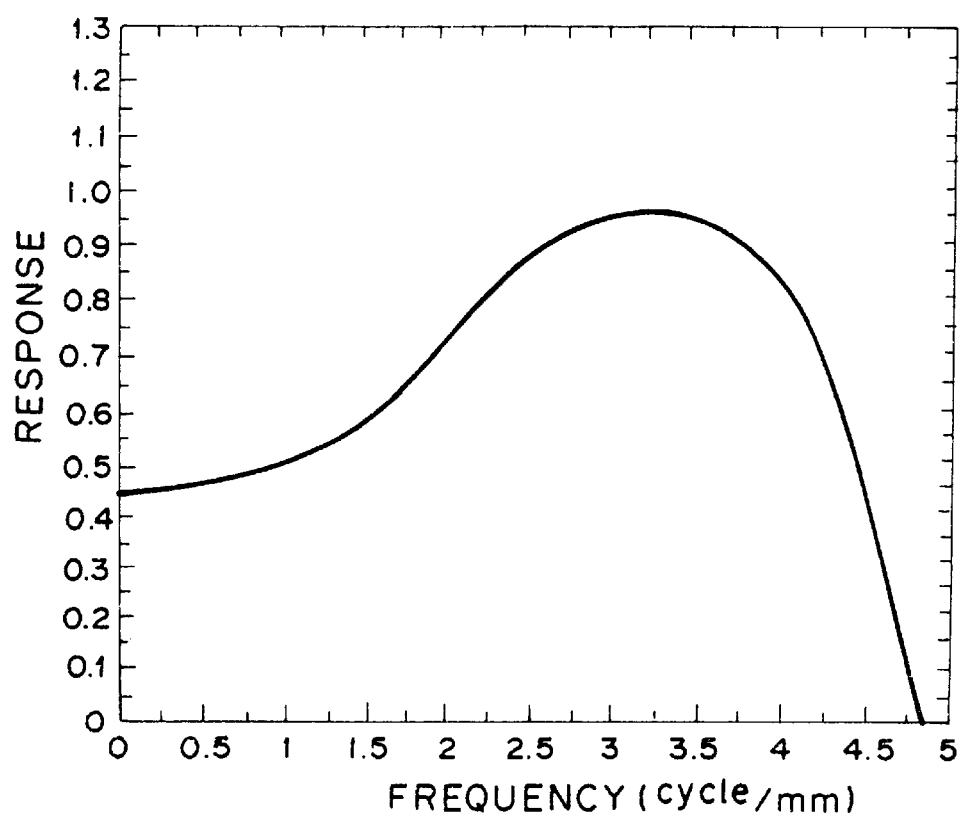
FIG. 18 is a graph showing a filter for carrying out frequency processing on an output signal SA.
Figure 19:
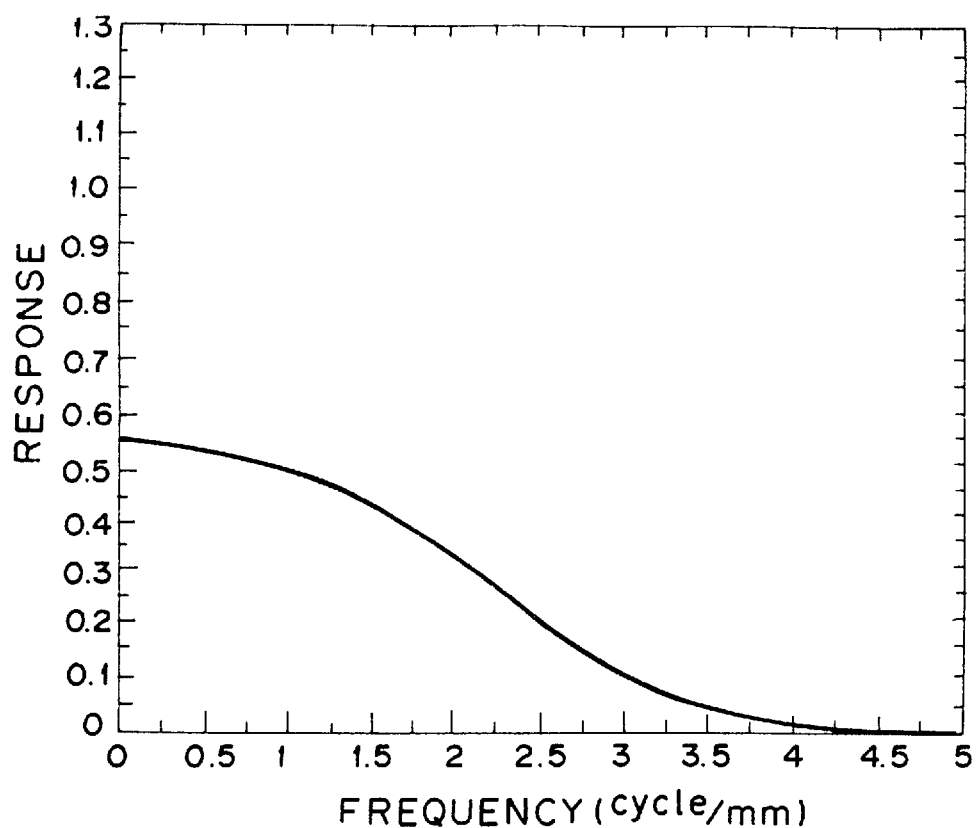
FIG. 19 is a graph showing a filter for carrying out frequency processing on an output signal SB.

As described above, in cases where the image signals are obtained with the aforesaid operation for detecting light emitted by two surfaces of a stimulable phosphor sheet, the high frequency components of the image signal, which has been obtained from the back surface side of the stimulable phosphor sheet (i.e. the side of the stimulable phosphor sheet, which was remote from the radiation source during the operation for recording the radiation image), contain a large amount of noise components due to scattered radiation, or the like. Also, in cases where the image signals are obtained by recording the radiation images respectively on a plurality of stimulable phosphor sheets placed one upon another, the high frequency components of the image signal having been obtained from a stimulable phosphor sheet, which was remote from the radiation source during the operation for recording the radiation images, contain a large amount of noise components due to scattered radiation, or the like. Therefore, the value of the weight factor with respect to the high frequency components of the image signal, which has been obtained from the side of the stimulable phosphor sheet remote from the radiation source or which has been obtained from the stimulable phosphor sheet remote from the radiation source, is rendered smaller than the value of the weight factor with respect to the high frequency components of the image signal, which has been obtained from the side of the stimulable phosphor sheet close to the radiation source or which has been obtained from the stimulable phosphor sheet close to the radiation source. In this manner, a superposition image containing little noise component can be obtained. Therefore, in the frequency processing circuit 40a, the filtering processing for emphasizing the high frequency components of the output signal SA is carried out with a filter, which is shown in FIG. 18. Also, in the frequency processing circuit 40b, the filtering processing for reducing the high frequency components of the output signal SB is carried out with a filter, which is shown in FIG. 19. Because the output signals SA and SB are the analog signals, the filtering processing described above is carried out only on the signal components of each of the output signals SA and SB with respect to the main scanning direction.

The output signals SA and SB, which have been subjected to the frequency processing in the frequency processing circuits 40a and 40b, are respectively fed into aliasing eliminating filters 41a and 41b. In the aliasing eliminating filters 41a and 41b, errors due to aliasing are removed from the output signals SA and SB. Thereafter, the output signals SA and SB are fed into analog-to-digital converters 17a and 17b and converted into digital image signals S1 and S2. The digital image signals S1 and S2 which have thus been obtained, are added to each other. Also, in the same manner as that in the aforesaid embodiment, predetermined image processing is carried on the addition signal Sadd in the image processing means. The addition signal Sadd, which has been obtained from the image processing, is then used for reproducing a visible image in the image reproducing means.

The filters shown in FIGS. 18 and 19 are set such that the DQE of the addition signal Sadd resulting from the addition of the digital image signals S1 and S2 may become largest. Specifically, the filters shown in FIGS. 18 and 19 are set such that the addition ratio at 1 cycle/mm may be SA:SB= 0.5:0.5, the addition ratio at 2 cycles/mm may be SA:SB= 0.7:0.3, and the addition ratio at 3 cycles/mm may be SA:SB=0.9:0.1. This means that the response of the means, such as the frequency processing circuit 40b and the aliasing eliminating filter 41b, for carrying out the filtering processing on the output signal SB, with respect to the high frequency components of the output signal SB at approximately 3 cycles/mm may be approximately 20% of the response with respect to the low frequency components of the output signal SB at 1 cycle/mm. Therefore, it is sufficient for the means, such as the frequency processing circuit 40b and the aliasing eliminating filter 41b, for carrying out the filtering processing on the output signal SB, to be constituted of circuits having a narrower processing range than in the means, which are ordinarily employed in apparatuses for carrying out the image read-out operations.

In the manner described above, the processing for rendering the value of the weight factor with respect to the frequency components, which have a low signal-to-noise ratio, smaller than the value of the weight factor with respect to the frequency components, which have a high signal-to-noise ratio, in accordance with the frequency characteristics of each of the output signals SA and SB is carried out on the analog output signals SA and SB. As a result, as in the cases wherein the processing described above is carried out on the digital image signals S1 and S2 the addition signal having a high signal-to-noise ratio over the entire frequency bands can be obtained. Therefore, a superposition image having good image quality can be reproduced from the addition signal. Also, the high frequency components of the output signal SB are reduced sufficiently, and therefore the cut-off frequency of the aliasing eliminating filter 41b can be set to be low. As a result, the aliasing can be reduced sufficiently during the analog-to-digital conversion carried out in the analog-to-digital converter 17b. Further, the parts constituting the logarithmic amplifier 16b and the aliasing eliminating filter 41b for the output signal SB are not required to carry out quick processing. Therefore, these parts may be constituted of cheap parts, such as operational amplifiers and transistors, which cannot achieve quick processing. Accordingly, the cost of the apparatus can be kept low.

In the aforesaid operation for carrying out the processing on the analog output signals SA and SB, the frequency processing is carried out by the frequency processing circuits 40a and 40b. Alternatively, the effects of the frequency processing circuits 40a and 40b for emphasizing the high frequency components of the output signal SA and reducing the high frequency components of the output signal SB may be achieved by changing the frequency characteristics of the logarithmic amplifiers 16a and 16b and the aliasing eliminating filters 41a and 41b.

Furthermore, in the aforesaid operation for carrying out the processing on the analog output signals SA and SB, the processing is carried out on both of the analog output signals SA and SB. Alternatively, frequency processing may be carried out on either one of the analog output signals SA and SB. The processed analog output signal and the unprocessed analog output signal may be converted into digital image signals, and the digital image signals may then be added to each other.

In the embodiment described above, when the two image signals are to be superposed one upon the other, each of the image signals are decomposed into a plurality of the transform factor signals, each of which is of one of a plurality of different frequency bands. The transform factor signals are then weighted. Alternatively, the weighting may be carried out in the manner described above when energy subtraction processing is carried out on two image signals. How the image signals to be subjected to the energy subtraction processing are weighted will be described hereinbelow.

Figure 20:
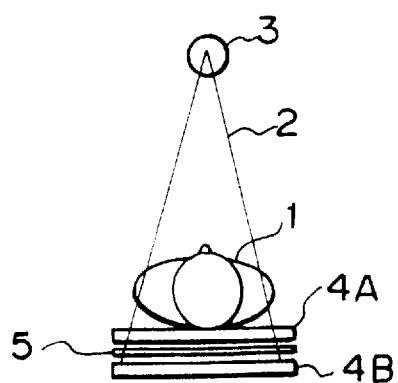
FIG. 20 is a schematic view showing how radiation images, which are to be subjected to energy subtraction processing, are recorded on stimulable phosphor sheets.
Figure 22:
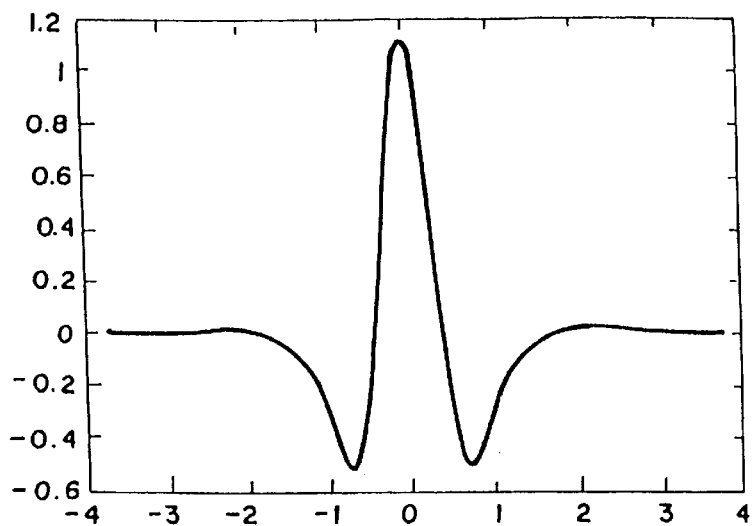
FIG. 22 is a graph showing a basic wavelet function employed in a wavelet transform.
Figure 23:
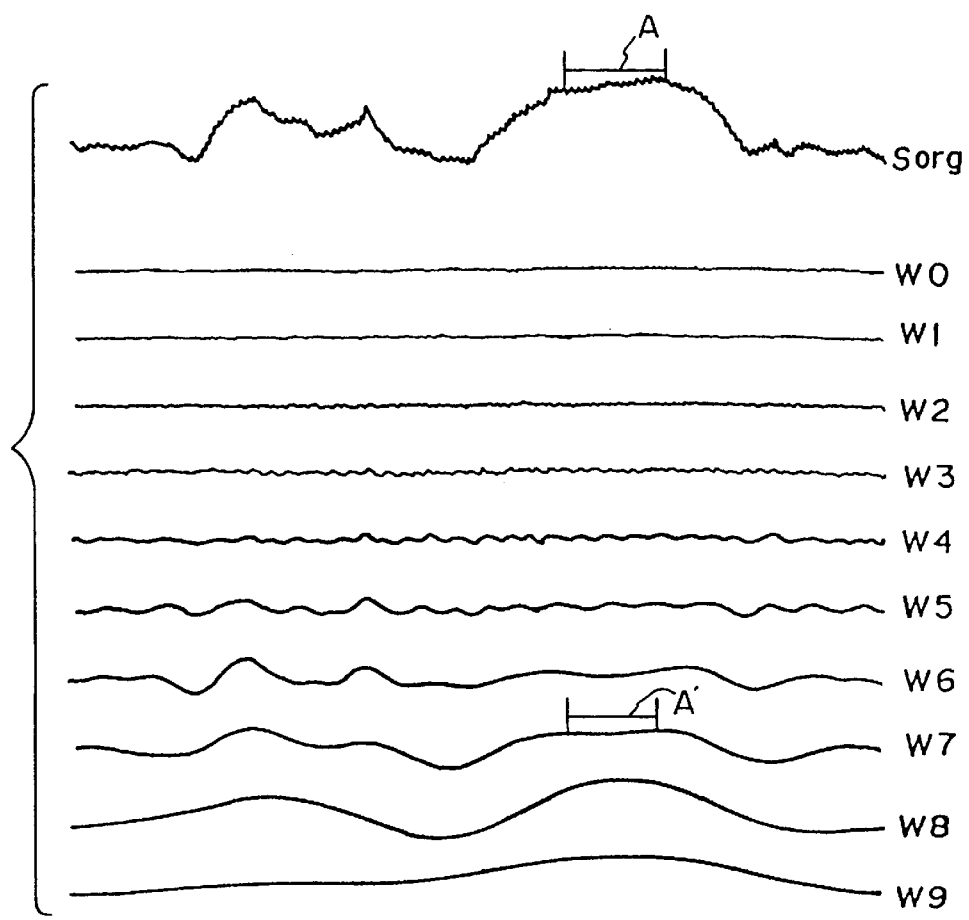
FIG. 23 is a diagram showing signals, which are obtained by carrying out a wavelet transform on an original signal Sorg and then carrying out an inverse wavelet transform for each of frequency bands.
Figure 24:
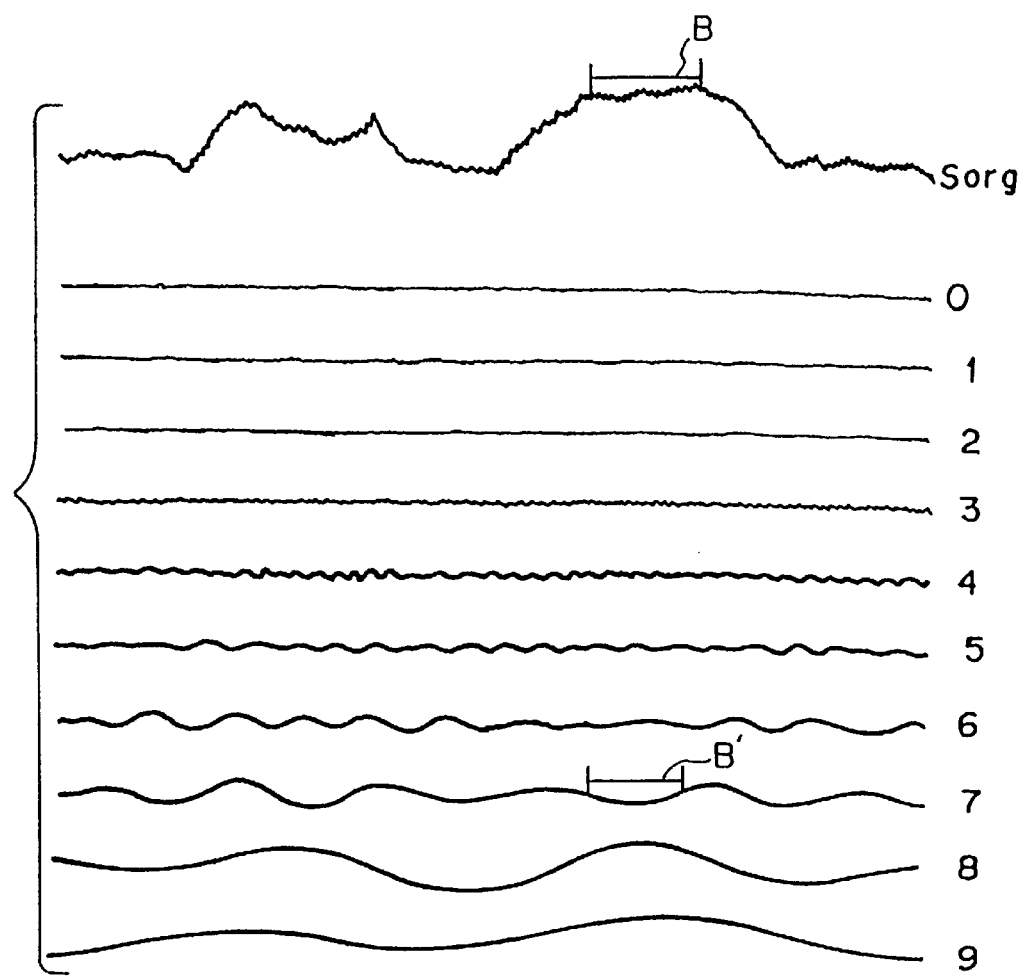
FIG. 24 is a diagram showing signals, which are obtained by carrying out a Fourier transform on the original signal Sorg and then carrying out an inverse Fourier transform for each of the frequency bands.

FIG. 20 shows an image recording apparatus for carrying out the so-called "one-shot energy subtraction processing", in which radiation 2 having passed through a single object 1 is delivered to a first stimulable phosphor sheet 4A, the energy distribution of the radiation 2 after having passed through the first stimulable phosphor sheet 4A is changed, and the radiation 2 now having the different energy distribution is delivered to a second stimulable phosphor sheet 4B. Specifically, the first stimulable phosphor sheet 4A is located at the position close to a radiation source 3, and the second stimulable phosphor sheet 4B is located at the position slightly spaced from the first stimulable phosphor sheet 4A. A radiation energy converting filter 5, which may be constituted of a copper plate, is located between the two stimulable phosphor sheets 4A and 4B. In this state, the radiation source 3 is driven. In this manner, on the first stimulable phosphor sheet 4A, a radiation image of the object 1 is recorded with the radiation 2 containing soft radiation. Also, on the second stimulable phosphor sheet 4B, a radiation image of the object 1 is recorded with the radiation 2 free from soft radiation.

In the manner described above, the two radiation images, in which different images of a specific structure of the object 1 are embedded, are stored on the two stimulable phosphor sheets 4A and 4B.

Thereafter, the radiation images are respectively read out from the two stimulable phosphor sheets 4A and 4B by using the radiation image read-out apparatus shown in FIG. 2. Two digital image signals S1 and S2 representing the radiation images are thereby obtained. The obtained image signals S1 and S2 are stored in the storage medium 18.

Subtraction processing is then carried out on the digital image signals S1 and S2 which have been obtained in the manner described above. FIG. 21 is a block diagram showing an apparatus for carrying out a first embodiment of the energy subtraction processing method in accordance with the present invention. First, the image signals S1 and S2 are read from an image file 18A and an image file 18B in the storage medium 18 and fed into a wavelet transform means 30. The wavelet transform means 30 carries out a wavelet transform of each of the two image signals S1 and S2. In the same manner as that in the aforesaid embodiment of the superposition processing method for a radiation image in accordance with the present invention, each of the two image signals S1 and S2 is thus decomposed into a plurality of wavelet transform factor signals, each of which is of one of a plurality of different frequency bands. In this manner, wavelet transform factor signals $WW_{U0}$ through $WW_{UN}$, $WV_{U0}$ through $WV_{UN}$, $VW_{U0}$ through $VW_{UN}$, and $VV_{UN}$ are obtained from the image signal S1. Also, wavelet transform factor signals $WW_{L0}$ through $WW_{LN}$, $WV_{L0}$ through $WV_{LN}$, $VW_{L0}$ through $VW_{LN}$, and $VV_{LN}$ are obtained from the image signal S2.

The wavelet transform factor signals, which have thus been obtained, are fed into a weighting and subtraction means 31. In the weighting and subtraction means 31, subtraction processing is carried out such that the value of the weight factor with respect to the frequency band, which contains much noise components, may be rendered smaller than the value of the weight factor with respect to the frequency band, which contains less noise components. The information in the high frequency band of the image signal S2 contains noise, due to scattered radiation during the image recording operation, or the like. Also, the information on the high frequency band side of the image signal S2 has been rendered unsharp due to the location of the stimulable phosphor sheet 4B remote from the radiation source.

Therefore, the two image signals S1 and S2 have the frequency characteristics shown in FIGS. 6A and 6B. Accordingly, when the subtraction processing is carried out on the two image signals S1 and S2 the values of the weight factors are determined in accordance with the weight table shown in FIG. 9. The wavelet transform factor signals, which are of a single frequency band, are weighted in accordance with the weight table shown in FIG. 9, and the weighted wavelet transform factor signals, which are of a single frequency band, are then subtracted from one another.

Specifically, the weighted subtractions of the wavelet transform factor signals, which are of a single frequency band, are carried out with Formula (13)

$$WW_i = t \cdot WW_{Ui} - (1-t)\ WW_{Li}$$
$$WV_i = t \cdot WV_{Ui} - (1-t)\ WV_{Li}$$
$$VW_i = t \cdot VW_{Ui} - (1-t)\ VW_{Li}$$
$$VV_i = t \cdot VV_{Ui} - (1-t)\ VV_{Li} \qquad (13)$$

In the manner described above, subtraction wavelet transform factor signals $WW_1$ through $WW_N$, $WV_1$ through $WV_N$, $VW_1$ through $VW_N$ and $VV_1$ through $VV_N$ are obtained in the weighting and subtraction means 31. Thereafter, as in the aforesaid embodiment of the superposition processing method for a radiation image in accordance with the present invention, in an inverse wavelet transform means 32, an inverse wavelet transform is carried out on each of the subtraction wavelet transform factor signals. A subtraction signal, which has been obtained from the inverse wavelet transform, is subjected to predetermined image processing in an image processing means 33, fed into an image reproducing means 34, and used for the reproduction of a visible radiation image.

In the manner described above, the wavelet transform is carried out on each of the two image signals S1 and S2 and each of the two image signals S1 and S2 is thereby decomposed into a plurality of the wavelet transform factor signals, each of which is of one of a plurality of different frequency bands. The wavelet transform factor signals, which are of a single frequency band, are weighted with the weight factors, such that the values of the weight factors may be varied for the wavelet transform factor signals of the different frequency bands. As for the wavelet transform factor signals for the high frequency band, the value of the weight factor with respect to the image signal, which has been obtained from the stimulable phosphor sheet located at the position closer to the radiation source, is set to be larger than the value of the weight factor with respect to the image signal, which has been obtained from the stimulable phosphor sheet located at the position remote from the radiation source. In this manner, a subtraction signal containing little noise can be obtained. From the subtraction signal thus obtained, an image having good image quality and containing little noise component can be reproduced.

In the aforesaid embodiment of the energy subtraction processing method in accordance with the present invention, the so-called "one-shot energy subtraction processing" is carried out, in which the two radiation images are recorded on the stimulable phosphor sheets with a single, simultaneous exposure to the radiation, and the two image signals S1 and S2 are obtained from the stimulable phosphor sheets. Alternatively, two image signals may be obtained with the so-called "two-shot energy subtraction processing," in which two stimulable phosphor sheets are exposed one after another to two kinds of radiation having different energy distributions. In cases where the subtraction processing is carried out on the two image signals obtained with the two-shot energy subtraction processing, each of the two image signals obtained may be decomposed into a plurality of the transform factor signals, each of which is of one of a plurality of different frequency bands. The transform factor signals, which are of a single frequency band, may be weighted and subtracted from each other. In such cases, the values of the weight factors may be determined in accordance with, for example, the MTF's which are obtained from the energy distributions of the two kinds of the radiation employed when the radiation images were recorded on the two stimulable phosphor sheets.

In the aforesaid embodiment of the energy subtraction processing method in accordance with the present invention, each of the two image signals is decomposed by the wavelet transform into a plurality of the wavelet transform factor signals, each of which is of one of a plurality of different frequency bands. Alternatively, each of the two image signals may be decomposed by the sub-band transform or the Fourier transform into a plurality of the transform factor signals, each of which is of one of a plurality of different frequency bands. However, for example, as illustrated in FIG. 12, long filters for different frequency bands must be employed in the Fourier transform. On the other hand, in cases where the wavelet transform or the sub-band transform, wherein the image signal can be decomposed with a short filter, is employed, the apparatus for carrying out the energy subtraction processing method in accordance with the present invention can be kept simple.

The transform factor signals, which have been obtained from the wavelet transform or the sub-band transform described above, constitute the image signals contracted from the original image signal. For example, as illustrated in FIG. 13, in cases where the image signal represents an image of the chest of a human body, the transform factor signals obtained from the wavelet transform or the sub-band transform of the image signal represent the images contracted from the original image. Therefore, as in the aforesaid embodiment of the superposition processing method for a radiation image in accordance with the present invention, the value of the weight factor during the subtraction processing may also be changed in accordance with the portions of the image. In such cases, a subtraction signal can be obtained such that the value of the weight factor may be varied for different doses of radiation, which reached to portions of the radiation image during the operation for recording the radiation image. Therefore, an image can be obtained which has better image quality and can serve as a more effective tool in, particularly, the efficient and accurate diagnosis of an illness.

In the aforesaid embodiment of the energy subtraction processing method in accordance with the present invention, as illustrated in FIG. 17, the analog output signals SA and SB may be subjected to the frequency processing with the filters shown in FIGS. 18 and 19 and may then be converted into digital image signals S1 and S2. The subtraction processing may then be carried out on the digital image signals S1 and S2.

Also, in the aforesaid operation for carrying out the processing on the analog output signals SA and SB, the processing is carried out on both of the analog output signals SA and SB. Alternatively, frequency processing may be carried out on either one of the analog output signals SA and SB. The processed analog output signal and the unprocessed analog output signal may be converted into digital image signals, and the digital image signals may then be subtracted from each other.

A second embodiment of the superposition processing method for a radiation image in accordance with the present invention and a second embodiment of the energy subtraction processing method in accordance with the present invention will be described hereinbelow.

Figure 25:
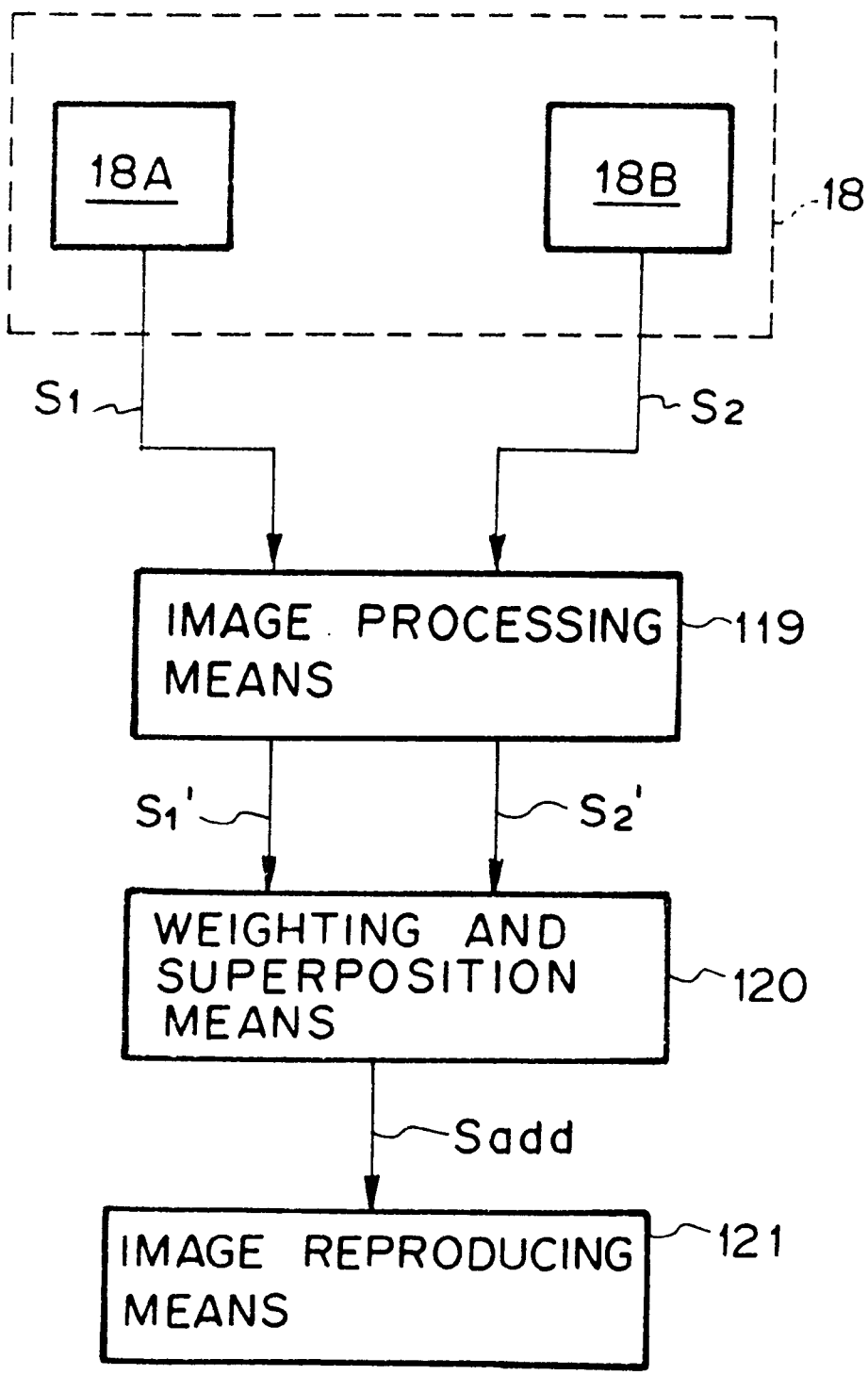
FIG. 25 is a block diagram showing an apparatus for carrying out a second embodiment of the superposition processing method for a radiation image in accordance with the present invention.

Image signals S1 and S2 are obtained in the same manner as that described above with reference to FIGS. 1 and 2. Thereafter, a superposition processing is carried out on the image signals S1 and S2. FIG. 25 is a block diagram showing an apparatus for carrying out the second embodiment of the superposition processing method for a radiation image in accordance with the present invention. First, the image signals S1 and S2 are read from an image file 18A and an image file 18B in the storage medium 18 and fed into an image processing means 119. The image processing described below is carried out on the two image signals S1 and S2 which have been fed into the image processing means 119. The image signals, which have been obtained from the image processing, are fed into a weighting and superposition means 120 and subjected to a weighted addition. An addition signal, which has been obtained from the weighting and superposition means 120, is fed into an image reproducing means 121, such as a CRT display device, and is used for reproducing a visible image.

How the image processing is carried out in the image processing means 119 will be described hereinbelow.

As described above with reference to FIGS. 6A through 9, the optimum addition ratio, which gives the largest DQE serving as an index of an image, varies for different frequencies. Also, as described above, the image signal S1 carries the information up to the high frequency band. However, in the image signal S2 noise components are predominant in the information of the high frequency band. Therefore, as for the image signal S1, the response with respect to the high frequency band is emphasized. As for the image signal S2 the response with respect to the high frequency band is reduced. The image signals S1 and S2 are then added to each other. In this manner, an addition signal can be obtained which represents a radiation image having good image quality.

How the image signals S1 and S2 are processed will be described hereinbelow.

First, an unsharp mask signal Sus1 for the image signal S1 is calculated. How the unsharp mask signal Sus1 is calculated will be described hereinbelow.

Figure 26:
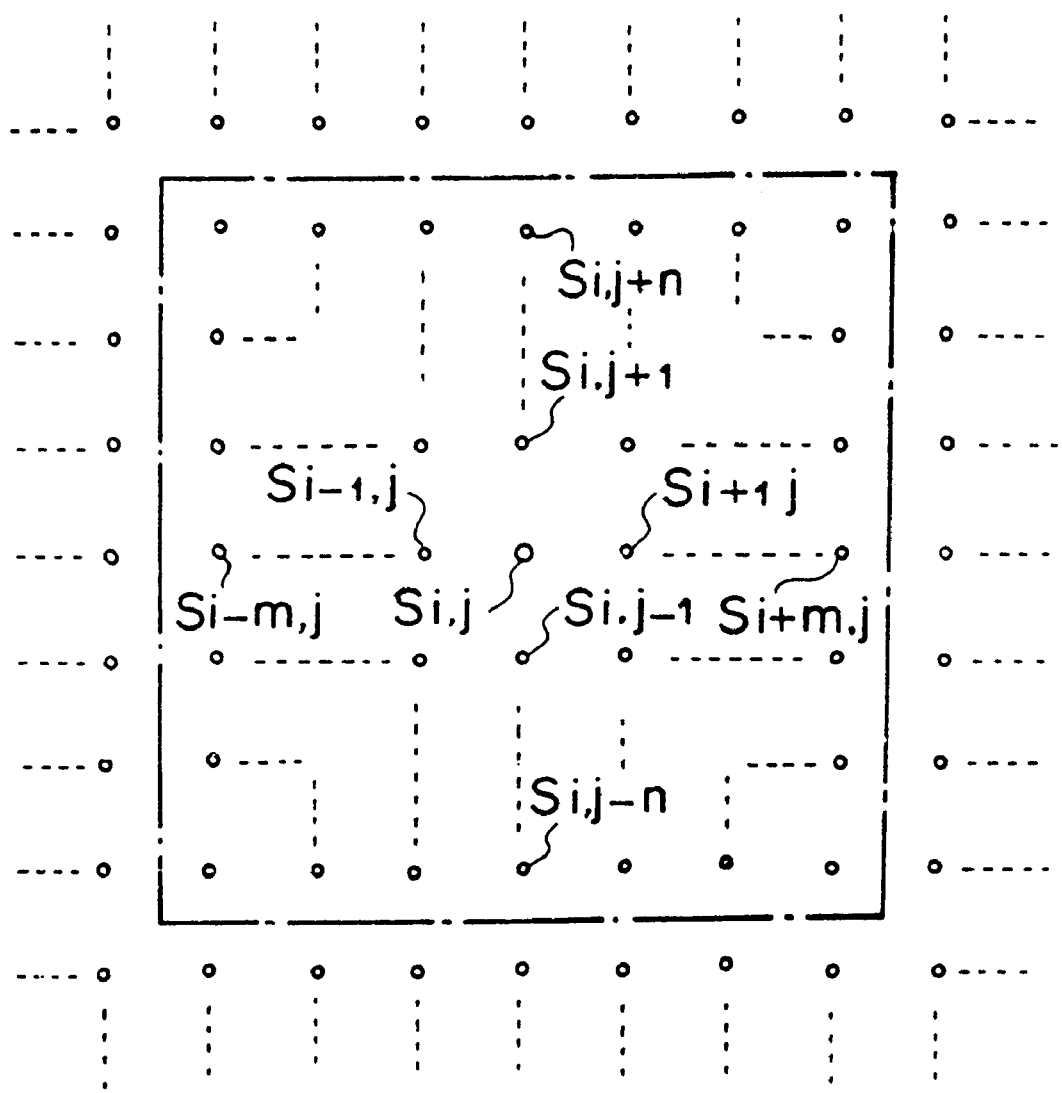
FIG. 26 is an explanatory view showing how an unsharp mask signal is generated.

FIG. 26 is an explanatory view showing picture elements in an image and image signal components of the image signal S1, which represent the picture elements. In FIG. 26, dots represent the picture elements, and the symbols, such as Si,j, represent the image signal components of the image signal S1, which represent the corresponding picture elements.

The value of an unsharp mask signal $S_{us}^{ij}$ for the picture element, which is located in the middle of the region surrounded by the chained line, is calculated with the formula $$Sus_1^{IJ} = \frac{\sum_{k=-m}^{m} \sum_{l=-n}^{n} S_{1+k, J+1}}{M \cdot N} \quad (14)$$

By carrying out the calculation for every picture element, the unsharp mask signal Sus1 for the whole image is generated. The values of M and N are determined arbitrarily in accordance with the intervals, with which the image signal S1 is sampled, the characteristics of the radiation image, the type of the desired image processing, or the like.

After the unsharp mask signal Sus1 is obtained, the process shown below is carried out on the unsharp mask signal Sus1.

$$S1' = S1 + \beta(S1 - Sus1) \quad (15)$$

where $\beta$ represents the degree of emphasis.

Specifically, the process represented by Formula (15) is carried out on the image signal S1 by taking the value of $\beta$ as the value for emphasizing the high frequency band of the image signal S1. In this manner, the high frequency band of the image signal S1 is emphasized.

On the other hand, as for the image signal S2 an unsharp mask signal Sus2 for the image signal S2 is calculated with Formula (14). The unsharp mask signal Sus2 is taken as a signal S2', which is to be added to the image signal S1. Specifically, as for the image signal S2 the image is made unsharp by carrying out the unsharp mask processing with Formula (14). In this manner, the response with respect to the high frequency band of the image signal S2 is reduced.

The image signals S1 and S2 are processed in the manner described above, and image signals S1' and S2' are thereby obtained. The image signals S1' and S2' are weighted with predetermined values of the weight factors and are thereafter added to each other. Specifically, an addition signal Sadd is obtained with the formula $$Sadd = t \cdot S1' + (1-t) \cdot S2' \quad (16)$$

The addition signal Sadd obtained in this manner is fed into an image reproducing means 121 and used for reproducing a visible image.

The image reproducing means may be a display device, such as a cathode ray tube (CRT) display device, or a recording apparatus for recording an image on photosensitive film by scanning the photosensitive film with a light beam.

In the manner described above, the frequency emphasis processing is carried out on the image signal S1, and the image signal S1' is thereby obtained. Also, the unsharp mask processing is carried out on the image signal S2 and the image signal S2' is thereby obtained. Thereafter, the image signals S1' and S2' are added to each other. This operation is substantially equivalent to the operation, in which the addition is carried out such that the addition ratio may be different between the low frequency band and the high frequency band of the image signals. In this manner, the addition signal can be obtained such that the noise components obtained from the stimulable phosphor sheet, which was located at the position remote from the radiation source, may be reduced, and such that the information of the high frequency band obtained from the stimulable phosphor sheet, which was located at the position close to the radiation source, may be emphasized. Therefore, from the addition signal thus obtained, an image having good image quality and containing little noise component can be reproduced. Also, the amount of calculation is not so large as in the wavelet transform or the Fourier transform. Therefore, the apparatus for carrying out the second embodiment of the superposition processing method for a radiation image in accordance with the present invention can be kept simple. Further, the operation can be carried out quickly.

In the aforesaid second embodiment of the superposition processing method for a radiation image in accordance with the present invention, the image processing is carried out on both of the image signals S1 and S2. Alternatively, the image processing described above may be carried out on either one of the image signals S1 and S2. However, in cases where the image processing is carried out on both of the image signals S1 and S2 an addition signal representing an image having better image quality can be obtained.

Also, in the aforesaid second embodiment of the superposition processing method for a radiation image in accordance with the present invention, the unsharp mask signal is calculated with Formula (14) by using the mean value of the values of the image signal components representing the picture elements located within the mask having a predetermined range. Alternatively, a weighted mean value of the values of the image signal components representing the picture elements located within the mask may be employed such that the frequency characteristics of the image signal can be controlled. As another alternative, any of values, which are representative of the values of the image signal components representing the picture elements located within the mask, such as the median in the mask, may be employed.

Further, in the aforesaid second embodiment of the superposition processing method for a radiation image in accordance with the present invention, as the image processing of the image signals S1 and S2 the frequency emphasis processing utilizing the unsharp mask signal and the unsharp mask processing are carried out. Alternatively, other types of frequency processing may be carried out. How the frequency processing is carried out on the image signals S1 and S2 in a modification of the second embodiment of the superposition processing method for a radiation image in accordance with the present invention will be described hereinbelow.

If the one-dimensional filter is expressed as A(i), and a two-dimensional filter is expressed as Aij, the following formula can obtain with respect to the image.

$$Aij = A(i) \times A(j) / \Sigma A(n) \quad (18)$$

Specifically, the convolution of the image signal is carried out with the one-dimensional filter A(i) with respect to the X direction, and thereafter the convolution is carried out with respect to the Y direction. Thereafter, the value obtained from the convolution is divided by the total sum of the one-dimensional filter. In this manner, the two-dimensional filter can be obtained. The values of the two-dimensional filter are shown below (at this time, the total sum is 59/122).

TABLE 4

| 4/7198 | 2/7198 | 34/7198 | −62/7198 | −34/7198 | 2/7198 | 4/7198 |
|---|---|---|---|---|---|---|
| 2/7198 | 1/7198 | −17/7198 | −31/7198 | −17/7198 | 1/7198 | 2/7198 |
| −34/7198 | −17/7198 | 289/7198 | 527/7198 | 289/7198 | −17/7198 | −34/7198 |
| −62/7198 | −31/7198 | 527/7198 | 961/7198 | 527/7198 | −31/7198 | −62/7198 |
| −34/7198 | −17/7198 | 289/7198 | 527/7198 | 289/7198 | −17/7198 | −34/7198 |
| 2/7198 | 1/7198 | −17/7198 | −31/7198 | −17/7198 | 1/7198 | 2/7198 |
| 4/7198 | 2/7198 | −34/7198 | −62/7198 | −34/7198 | 2/7198 | 4/7198 |

If the image processing carried out on the image signal S1 is expressed as F1(S1), and the image processing carried out on the image signal S2 is expressed as F2(S2), the addition signal Sadd in the aforesaid second embodiment of the superposition processing method for a radiation image in accordance with the present invention can be expressed as $$Sadd = t \cdot F1(S1) + (1-t) \cdot F2(S2) \quad (17)$$

Specifically, F1(S1) represents the frequency emphasis processing of the image signal S1, and F2(S2) represents the unsharp mask processing of the image signal S2. In lieu of the processing F1(S1) and the processing F2(S2), the convolution of each of the image signals S1 and S2 may be carried out with masks having predetermined frequency characteristics. In this manner, signal-to-noise ratio of the addition signal can be kept high.

Figure 27:
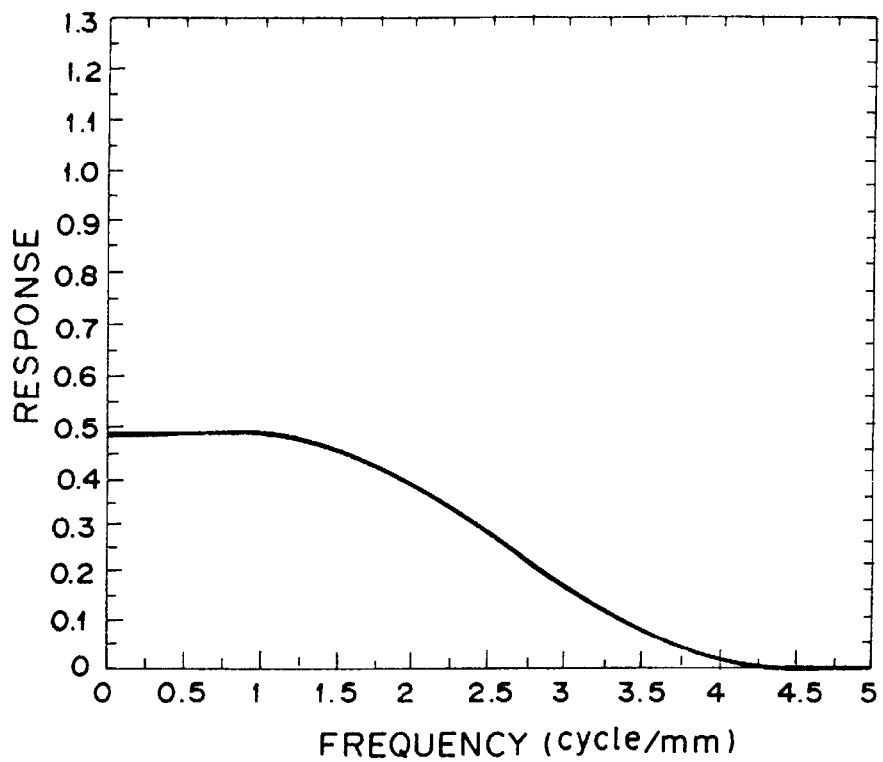
FIG. 27 is a graph showing frequency characteristics of a filter used for an image signal S2.

Specifically, the convolution of the image signal S2 is carried out with a filter F2 having the characteristics shown in FIG. 27. Also, the convolution of the image signal S1 is carried out with a filter F1 having the characteristics shown in FIG. 28. In this manner, the response with respect to the high frequency band of the image signal S2 can be restricted, and the response with respect to the high frequency band of the image signal S1 can be emphasized. Therefore, an addition signal representing an image having good image quality can be obtained.

The filter F2 having the characteristics shown in FIG. 27 is a one-dimensional filter and has the coefficients

−2/122 −1/122 17/122 31/122 17/122 −1/122 −2/122

Also, as shown in Formula (17), in the aforesaid second embodiment of the superposition processing method for a radiation image in accordance with the present invention, the image signals obtained from the processing are respectively multiplied by t and 1−t such that the energy of the signal values of the addition signal may become identical with the energy of the original image signals S1 and S2. In this modification of the second embodiment of the superposition processing method for a radiation image in accordance with the present invention, the values of the filters F1 and F2 are set appropriately such that the image signals obtained from the processing are may not be multiplied by t and 1−t as shown in Formula (17). Specifically, in this modification, the filters F1 and F2 are set such that F1+F2=1. The values of the filter F2 are set as described above. How the values of the filter F1 are set such that F1+F2=1 will be described hereinbelow.

First, the median (31/122) of the filter F2 is altered to a value of (1−median), and the signs of the other filter elements are reversed. In this manner, the filter F1 having the values shown below can be obtained.

2/122 1/122 −17/122 91/122 −17/122 1/122 2/122

Figure 28:
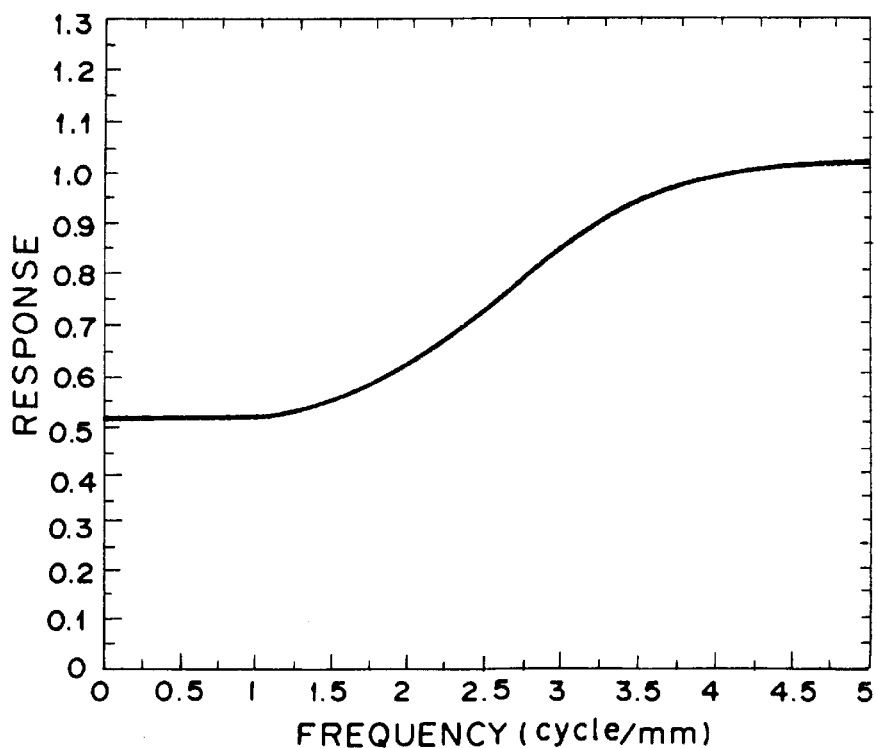
FIG. 28 is a graph showing frequency characteristics of a filter used for an image signal S1.

The filter F1 has the characteristics shown in FIG. 28.

Also, as for the two-dimensional filter, in the same manner as that described above, the median of the filter is altered to a value of (1−median), and the signs of the other filter elements are reversed. In this manner, a two-dimensional filter F1 having the values shown below can be obtained.

TABLE 5

| −4/7198 | −2/7198 | 34/7198 | 62/7198 | 34/7198 | −2/7198 | −4/7198 |
|---|---|---|---|---|---|---|
| −2/7198 | −1/7198 | 17/7198 | 31/7198 | 17/7198 | −1/7198 | −2/7198 |
| 34/7198 | 17/7198 | −289/7198 | −527/7198 | −289/7198 | 17/7198 | 34/7198 |
| 62/7198 | 31/7198 | −527/7198 | 6237/7198 | −527/7198 | 31/7198 | 62/7198 |

TABLE 5-continued

| | | | | | | |
|---|---|---|---|---|---|---|
| 34/7198 | 17/7198 | −289/7198 | −527/7198 | −289/7198 | 17/7198 | 34/7198 |
| −2/7198 | −1/7198 | 17/7198 | 31/7198 | 17/7198 | −1/7198 | −2/7198 |
| −4/7198 | −2/7198 | 34/7198 | 62/7198 | 34/7198 | −2/7198 | −4/7198 |

After the filters F1 and F2 have been obtained in the manner described above, the convolution of the image signal S1 with the filter F1 and the convolution of the image signal S2 with the filter F2 are carried out. Thereafter, the addition is carried out. In this manner, as in the aforesaid second embodiment of the superposition processing method for a radiation image in accordance with the present invention, an image signal can be obtained in which the response with respect to the high frequency band of the image signal S1 has been emphasized. The processing described above can be represented by Formula (19).

$$Sadd = F_1 * S_1 + F_2 * S_2 \quad (19)$$

where F1*S1 represents the convolution of S1 with F1.

The convolution of the image signal S1 with the filter F1 and the convolution of the image signal S2 with the filter F2 are thus carried out, and the obtained values are then added to each other. In this manner, the addition with respect to each of different frequencies can be carried out such that

| | |
|---|---|
| as for 0 cycle | S1:S2 = 0.516:0.484 |
| as for 1 cycle | S1:S2 = 0.515:0.485 |
| as for 2 cycles | S1:S2 = 0.620:0.380 |
| as for 3 cycles | S1:S2 = 0.845:0.155 |
| as for 4 cycles | S1:S2 = 0.987:0.013 |

In cases where the frequency characteristics of each of the image signals S1 and S2 vary for the X direction and the Y direction, a different filter may be employed for each direction. In such cases, if the different filter is expressed as B(j), the two-dimensional filter can be represented by Formula (20).

$$Aij = A(i) \times B(j) / \Sigma A(n) \quad (20)$$

However, in such cases, it is necessary that $\Sigma A(n) = \Sigma B(n)$.

For reasons of the apparatus, for example, in cases where the capacity of the memory in the apparatus is small, it may be desired to carry out the convolution of the image signal S1 and the convolution of the image signal S2 with a single filter. In such cases, the addition may be carried out with the formulas shown below.

$$Sadd = (S_1 - F_2 * S_1) + (F_2 * S_2) \quad (21)$$

(Because F1+F2=1, $$\begin{aligned} Sadd &= F_1 * S_1 + F_2 * S_2 \\ &= (1 - F_2) * S_1 + F_2 * S_2 \\ &= (S_1 - F_2 * S_1) + (F_2 * S_2)) \end{aligned} \quad (22)$$

or $Sadd = F_1 * S_1 + S_2 - F_1 * S_2$

In this manner, it is sufficient for only a single kind of filter to be stored in the memory. In such cases, the same results as those with Formula (19) can be obtained.

Further, in such cases, Formulas (21) and (22) can be rewritten as $$Sadd = S_1 + F_2 * (S_2 - S_1) \quad (21')$$

$$Sadd = S_2 + F_1 * (S_1 - S_2) \quad (22')$$

Specifically, the same results as those with Formula (19) can be obtained by calculating the difference between the image signals S1 and S2 and carrying out the convolution of the difference value with the filter F1 or the filter F2. In such cases, as in the operations with Formulas (21) and (22), it is sufficient for only a single kind of filter to be stored in the memory. Furthermore, it is sufficient for the convolution of the difference value between the image signals S1 and S2 to be carried out only one time with the filter F1 or the filter F2. Therefore, the apparatus can be kept simple, its cost can be kept low, and the operation can be carried out quickly.

In the aforesaid modification of the second embodiment of the superposition processing method for a radiation image in accordance with the present invention, in order for the image signals S1 and S2 to be added to each other in a desired addition ratio, it is necessary for the value of the filter coefficient to be determined such that the frequency characteristics of the filter F2 may become the desired characteristics. How the filter F2 is determined will be described hereinbelow.

As a first technique for determining the filter F2, the Fourier transform is carried out on an arbitrary value of the filter coefficient, and the frequency characteristics are investigated. The value of the filter coefficient is then altered, the Fourier transform is carried out on the new value of the filter coefficient, and the frequency characteristics are investigated. The value of the filter coefficient is thus finely adjusted, trial and error are repeated, and the filter is thereby determined such that it may have the desired frequency characteristics.

As a second technique for determining the filter F2, equations are created from sets of desired frequencies and the responses by taking the filter coefficient as an undetermined value, and simultaneous linear equations are thereby obtained. The simultaneous linear equations $$R(f_0) = \sum_{n=-\infty}^{\infty} a(n) \cdot \exp(-j \cdot 2\pi \cdot f_0 \cdot n \cdot T)$$

can be obtained, where $f_0$ represents the frequency, $R(f_0)$ represents the desired response, a(n) represents the filter coefficient, and T represents the sampling interval. The approximate solution of the filter coefficient a(n) satisfying the simultaneous linear equations is determined with the method of least squares.

In the aforesaid second embodiment of the superposition processing method for a radiation image in accordance with the present invention, as illustrated in FIG. 1, the radiation images are recorded on the two stimulable phosphor sheets 4A and 4B. The image signals obtained from the two stimulable phosphor sheets 4A and 4B are then added to each other. Alternatively, as illustrated in FIG. 14, the radiation image of the object 1 may be recorded on the single stimulable phosphor sheet 4A. As illustrated in FIG. 15, two image signals to be added to each other may be obtained by detecting light emitted by the two surfaces of the stimulable phosphor sheet 4A.

The two image signals S1 and S2 which have been obtained from the analog-to-digital converters 17a and 17b in the same manner as that described above with reference to FIG. 15, are added to each other in the same manner as that in the aforesaid second embodiment of the superposition processing method for a radiation image in accordance with the present invention. In this manner, as in the aforesaid second embodiment of the superposition processing method for a radiation image in accordance with the present invention, an image having good image quality and containing little noise component can be reproduced from the addition signal, which has thus been obtained.

As another alternative, as illustrated in FIG. 16, the two surfaces of the stimulable phosphor sheet 4A may be scanned respectively with laser beams 11a and 11b, which have been produced by the laser beam sources 10a and 10b. The light emitted by the two surfaces of the stimulable phosphor sheet 4A may thus be detected, and two image signals may thereby be obtained.

In cases where the operation for quickly reading out a radiation image is carried out in the aforesaid second embodiment of the superposition processing method for a radiation image in accordance with the present invention, the stimulating rays are moved very quickly on the stimulable phosphor sheet. Therefore, with certain kinds of stimulable phosphors constituting the stimulable phosphor sheets, the problems often occur in that the stimulable phosphor sheet cannot emit light immediately after being exposed to the stimulating rays, and a time lag occurs between when the stimulable phosphor sheet is exposed to the stimulating rays and when the stimulable phosphor sheet emits light. At an image contour portion, or the like, the amount of the light emitted by the stimulable phosphor sheet changes sharply. Therefore, the values of the image signal, which correspond to an image contour portion, or the like, should change sharply in the main scanning direction. However, if the time lag occurs between when the stimulable phosphor sheet is exposed to the stimulating rays and when the stimulable phosphor sheet emits light, the values of the obtained image signal, which correspond to an image contour portion, or the like, will not change sharply in the main scanning direction. As a result, the visible image reproduced from the image signal becomes unsharp in the main scanning direction, and the sharpness of the reproduced image cannot be kept high.

Even in such cases, with the modification of the aforesaid second embodiment of the superposition processing method for a radiation image in accordance with the present invention, the sharpness of the reproduced image can be prevented from becoming low by changing the kinds of the filters. How the sharpness of the reproduced image is prevented from becoming low will be described hereinbelow.

In cases where the radiation is delivered simultaneously to the two stimulable phosphor sheets 4A and 4B placed one upon the other as shown in FIG. 1, the radiation images being thereby stored respectively on the stimulable phosphor sheets 4A and 4B, and the two image signals S1 and S2 are obtained respectively from the stimulable phosphor sheets 4A and 4B by using the radiation image read-out apparatus shown in FIG. 2, the image signal S1 carries the information up to the high frequency band. However, in the image signal S2 noise components are predominant in the information of the high frequency band.

Also, in cases where each of the stimulable phosphor sheets 4A and 4B is quickly (e.g., at a read-out clock of at least 1.2 $\mu$s) scanned with the stimulating rays during the image read-out operation, the change in the values of each of the image signals S1 and S2 will become unsharp in the main scanning direction (i.e., in the X direction). As a result, the visible image reproduced from the image signal becomes unsharp with respect to the main scanning direction. The problems with regard to the reproduced image becoming unsharp with respect to the main scanning direction occur particularly markedly with respect to the image signal S1.

Therefore, in order to prevent the reproduced image from becoming unsharp with respect to the main scanning direction, the convolution of the image signal S1 with respect to the main scanning direction and the convolution of the image signal S1 with respect to the sub-scanning direction are carried out with different filters such that the high frequency components of the image signal S1 carrying the information of the high frequency components can be emphasized even further with respect to the main scanning direction. In the image signal S2 in which noise components are predominant in the information of the high frequency band, the change in the values of the image signal S2 is more unsharp in both of the main scanning direction and the sub-scanning direction than in the image signal S1. Therefore, the convolution of the image signal S2 with respect to the main scanning direction and the convolution of the image signal S2 with respect to the sub-scanning direction are carried out with filters such that the response with respect to the high frequency components can be restricted.

Figure 29:
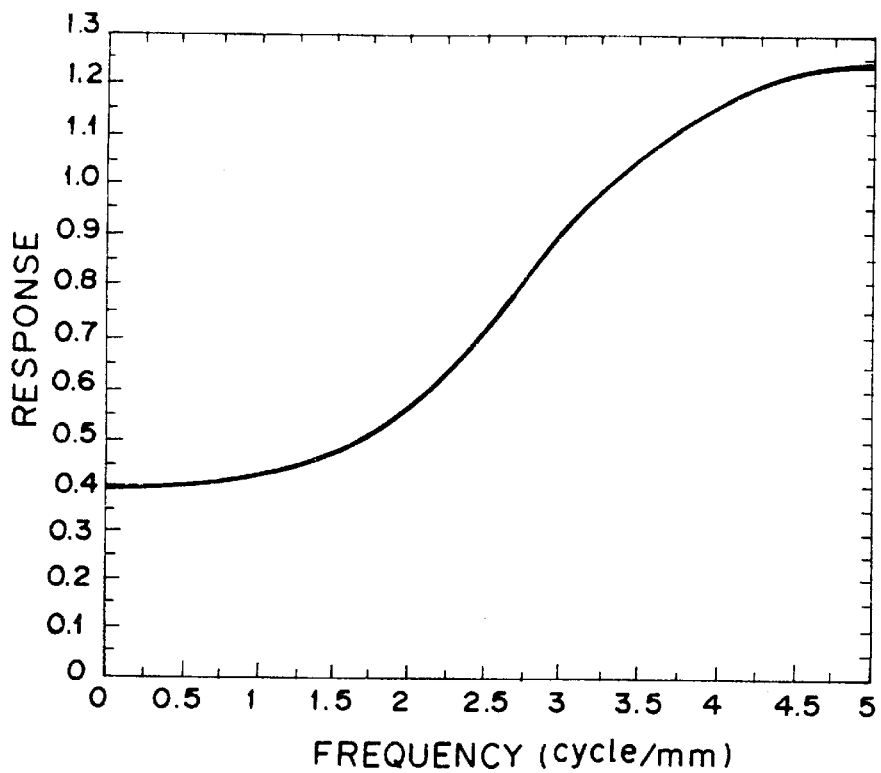
FIG. 29 is a graph showing frequency characteristics of a filter F3 used for an image signal S1.
Figure 30:
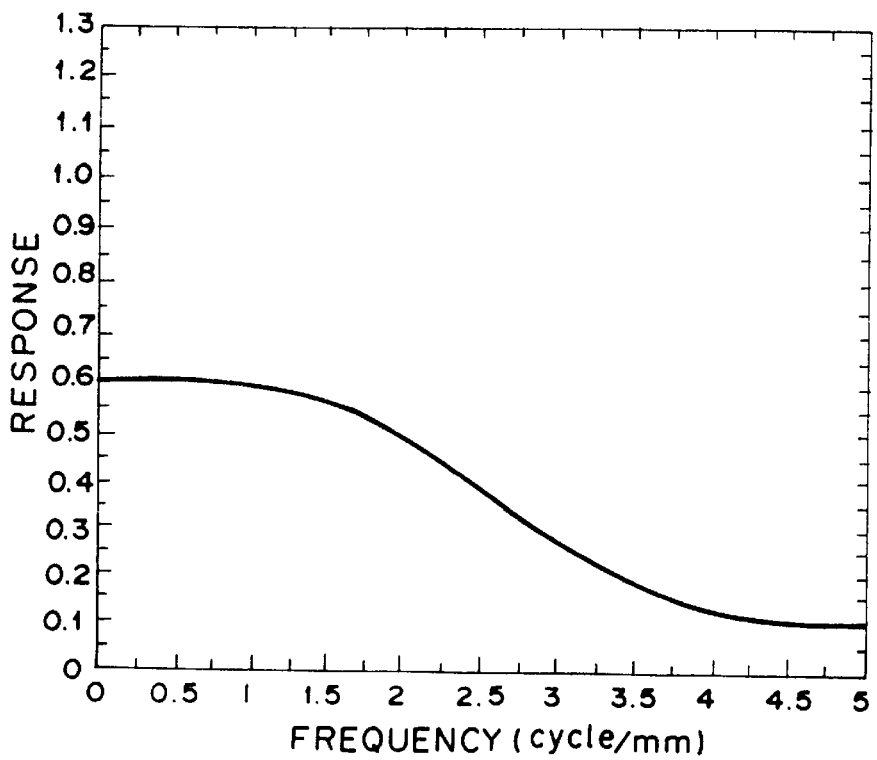
FIG. 30 is a graph showing frequency characteristics of a filter F4 used for an image signal S2.
Figure 31:
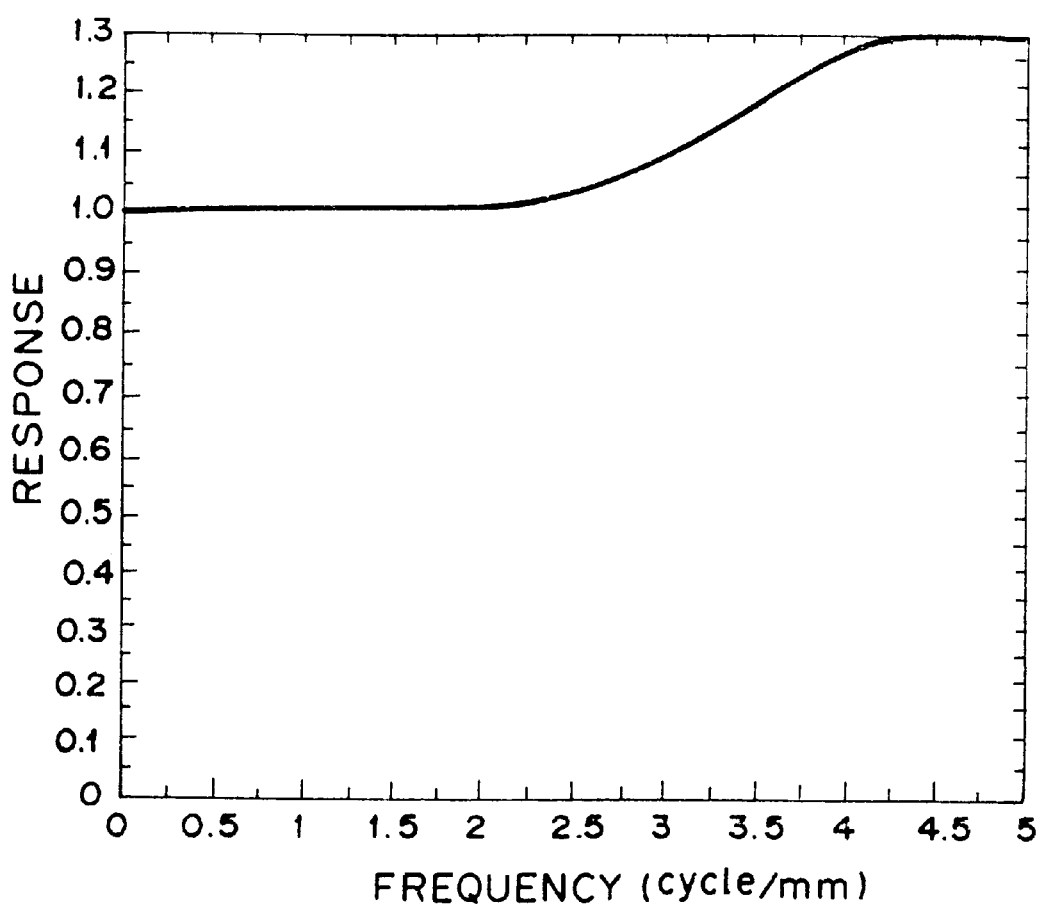
FIG. 31 is a graph showing frequency characteristics of the sum of the filters F3 and F4.

Specifically, the convolution of the image signal S1 with respect to the main scanning direction is carried out with a filter F3 shown in FIG. 29. The convolution of the image signal S2 with respect to the main scanning direction is carried out with a filter F4 shown in FIG. 30. Also, the convolution of the image signal S1 with respect to the sub-scanning direction is carried out with the filter F1 shown in FIG. 28, and the convolution of the image signal S2 with respect to the sub-scanning direction is carried out with the filter F2 shown in FIG. 27. As illustrated in FIG. 31, as for the high frequency band, the sum of the filters F3 and F4 shown in FIGS. 29 and 30 are F3+F4>1. Therefore, in cases where the convolution of the image signal S1 with respect to the main scanning direction is carried out with the filter F3 shown in FIG. 29, the convolution of the image signal S2 with respect to the main scanning direction is carried out with the filter F4 shown in FIG. 30, and the image signals S1 and S2 obtained from the processing are then added to each other, the high frequency band is emphasized markedly in the resulting addition signal with respect to the main scanning direction. Accordingly, even if the image signals S1 and S2 are unsharp in the main scanning direction, the high frequency components of the addition signal can be emphasized, and the sharpness with respect to the main scanning direction can be kept high. In this manner, the reproduced image can be prevented from becoming unsharp with respect to the main scanning direction, and the reproduced image having a high sharpness can be obtained.

In cases where the main scanning is carried out quickly during the operation for detecting light emitted by the two surfaces of the stimulable phosphor sheet, as in the superposition processing, the sharpness of the image signal in the main scanning direction becomes low. Therefore, as for the image signals S1 and S2 obtained from the two surfaces of the stimulable phosphor sheet, the convolution is carried out with the filters F3 and F4. In this manner, as in the superposition processing, the reproduced image can be prevented from becoming unsharp with respect to the main scanning direction, and the reproduced image having a high sharpness can be obtained.

In the aforesaid second embodiment of the superposition processing method for a radiation image in accordance with the present invention, the two image signals are superposed one upon the other. The processing described above can also be carried out when energy subtraction processing is carried out on two image signals. How the image processing is carried out on the image signals to be subjected to the energy subtraction processing will be described hereinbelow.

In the image recording apparatus for carrying out the one-shot energy subtraction processing, which is shown in FIG. 20, in the same manner as that described above, the two radiation images, in which different images of a specific structure of the object 1 are embedded, are stored on the two stimulable phosphor sheets 4A and 4B.

Thereafter, the radiation images are respectively read out from the two stimulable phosphor sheets 4A and 4B by using the radiation image read-out apparatus shown in FIG. 2. Two digital image signals S1 and S2 representing the radiation images are thereby obtained. The obtained image signals S1 and S2 are stored in the storage medium 18.

Figure 32:
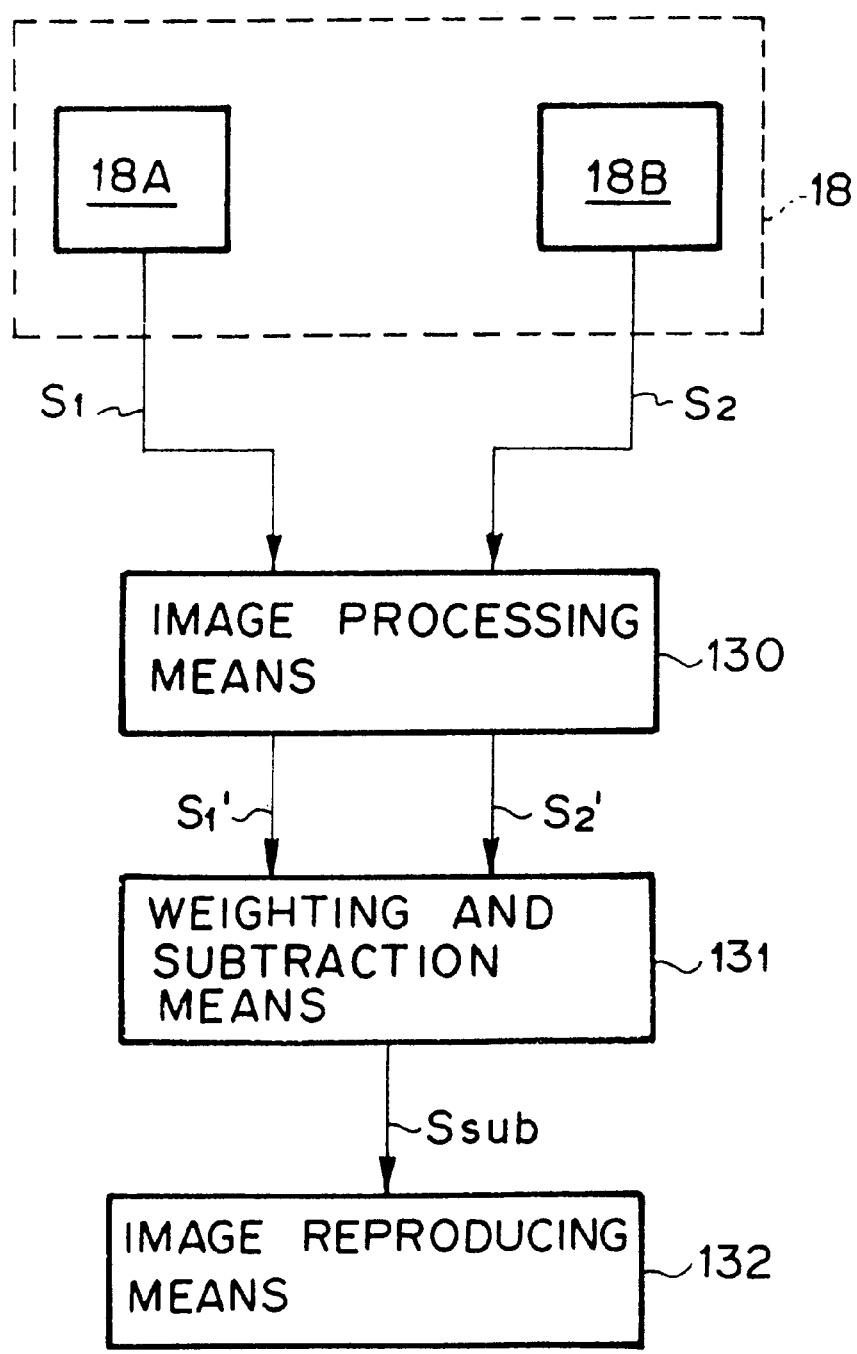
FIG. 32 is a block diagram showing an apparatus for carrying out a second embodiment of the energy subtraction processing method in accordance with the present invention.

Subtraction processing is then carried out on the digital image signals S1 and S2 which have been obtained in the manner described above. FIG. 32 is a block diagram showing an apparatus for carrying out a second embodiment of the energy subtraction processing method in accordance with the present invention. First, the image signals S1 and S2 are read from an image file 18A and an image file 18B in the storage medium 18 and fed into an image processing means 130. In the same manner as that in the aforesaid second embodiment of the superposition processing method for a radiation image in accordance with the present invention, the two image signals S1 and S2 are subjected to the processing, such as the unsharp mask processing, the frequency emphasis processing, and the convolution with the mask, in the image processing means 130. Processed image signals S1' and S2' are thereby obtained.

The image signals S1' and S2' thus obtained are fed into a weighting and subtraction means 131. In the weighting and subtraction means 131, subtraction processing is carried out on the image signals S1' and S2'.

Specifically, the weighted subtractions are carried out with Formula (24)

$$S_{sub} = t1 \cdot S1' - t2 \cdot S2' \qquad (24)$$

where t1 and t2 represent the weight factors.

In the manner described above, the subtraction signal Ssub is obtained from the weighting and subtraction means 131. The subtraction signal Ssub is fed into an image reproducing means 132 and used for reproducing a visible image.

In the aforesaid second embodiment of the energy subtraction processing method in accordance with the present invention, the one-shot energy subtraction processing is carried out. The aforesaid second embodiment of the energy subtraction processing method in accordance with the present invention is also applicable to the two-shot energy subtraction processing.

In the manner described above, the frequency emphasis processing, the unsharp mask processing, and the convolution with the filter are carried out on the two image signals S1 and S2. Thereafter, the subtraction processing is carried out. This operation is substantially equivalent to the operation, in which the subtraction is carried out such that the subtraction ratio may be different between the low frequency band and the high frequency band of the image signals. In this manner, the subtraction signal can be obtained such that the noise components obtained from the stimulable phosphor sheet, which was located at the position remote from the radiation source, may be reduced, and such that the information of the high frequency band obtained from the stimulable phosphor sheet, which was located at the position close to the radiation source, may be emphasized. Therefore, from the subtraction signal thus obtained, an image having good image quality and containing little noise component can be reproduced. Also, the amount of calculation is not so large as in the wavelet transform or the Fourier transform. Therefore, the apparatus for carrying out the second embodiment of the energy subtraction processing method in accordance with the present invention can be kept simple. Further, the operation can be carried out quickly.

A third embodiment of the superposition processing method for a radiation image in accordance with the present invention and a third embodiment of the energy subtraction processing method in accordance with the present invention will be described hereinbelow.

Figure 33:
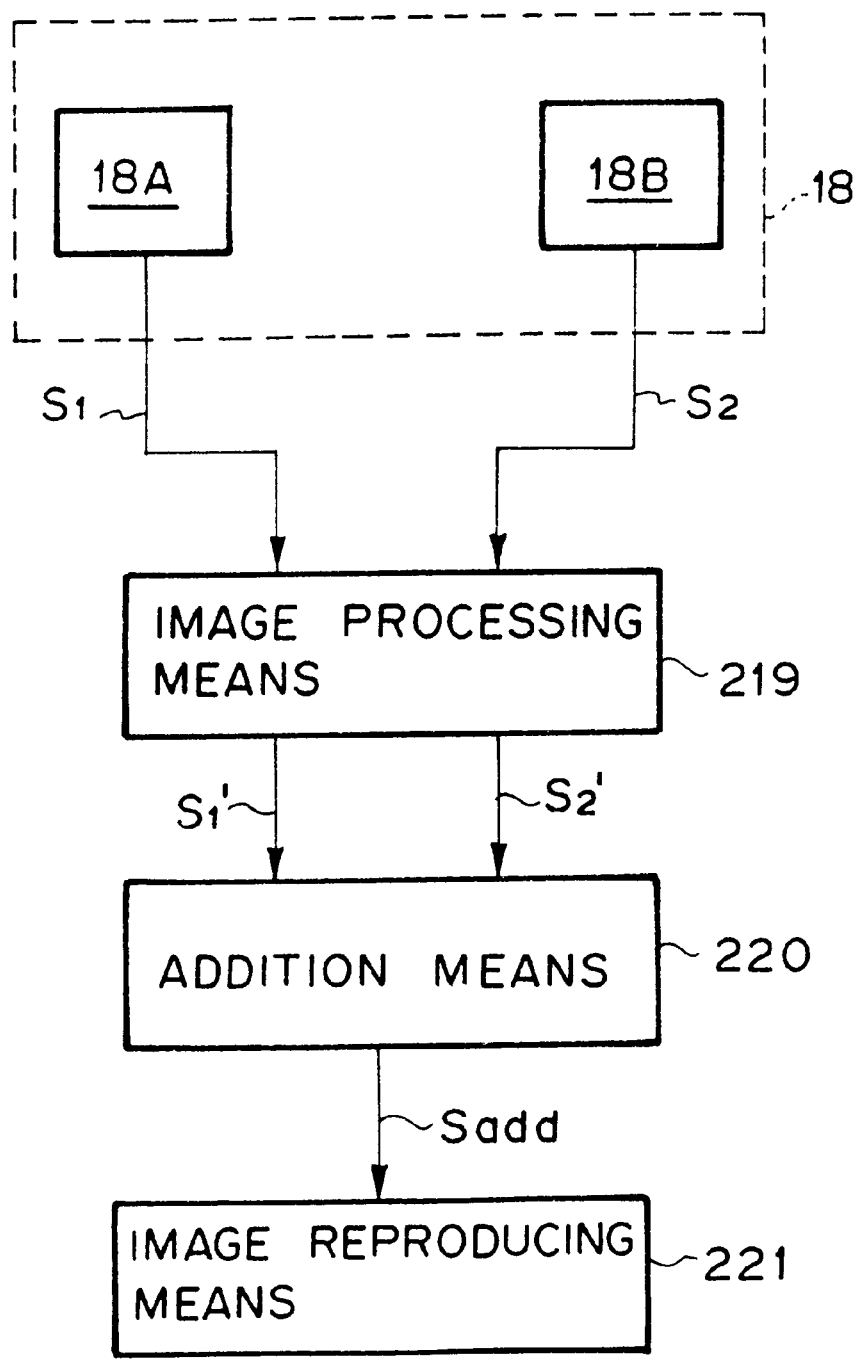
FIG. 33 is a block diagram showing an apparatus for carrying out a third embodiment of the superposition processing method for a radiation image in accordance with the present invention.

Image signals S1 and S2 are obtained in the same manner as that described above with reference to FIGS. 1 and 2. Thereafter, a superposition processing is carried out on the image signals S1 and S2. FIG. 33 is a block diagram showing an apparatus for carrying out the third embodiment of the superposition processing method for a radiation image in accordance with the present invention. First, the image signals S1 and S2 are read from an image file 18A and an image file 18B in the storage medium 18 and fed into an image processing means 219. The image processing with a filter described below is carried out on the two image signals S1 and S2 which have been fed into the image processing means 219. The image signals, which have been obtained from the image processing, are fed into an addition means 220 and subjected to an addition. An addition signal, which has been obtained from the addition means 220, is fed into an image reproducing means 221, such as a CRT display device, and is used for reproducing a visible image.

How the image processing is carried out in the image processing means 219 will be described hereinbelow.

As described above with reference to FIGS. 6A through 9, the optimum addition ratio, which gives the largest DQE serving as an index of an image, varies for different frequencies. Also, as described above, the image signal S1 carries the information up to the high frequency band. However, in the image signal S2 noise components are predominant in the information of the high frequency band. Further, it is often desired that desired frequency components of the addition signal can be emphasized. Therefore, the convolution of the image signal S1 and the convolution of the image signal S2 are carried out with filters, which are capable of emphasizing the response with respect to the high frequency band of the image signal S1, capable of reducing the response with respect to the high frequency band of the image signal S2 and capable of emphasizing the desired frequency components of the addition signal. Thereafter, the resulting image signals S1 and S2 are added to each other. In this manner, an addition signal can be obtained which represents a radiation image having good image quality.

How the image signals S1 and S2 are processed will be described hereinbelow.

As a filter for reducing the high frequency components of the image signal S2 the following filter F2 may be employed.

$$\begin{matrix} 4 & 8 & 4 \\ 8 & 16 & 8 \\ 4 & 8 & 4 \end{matrix} \Big/ 104 \qquad (25)$$

Figure 34:
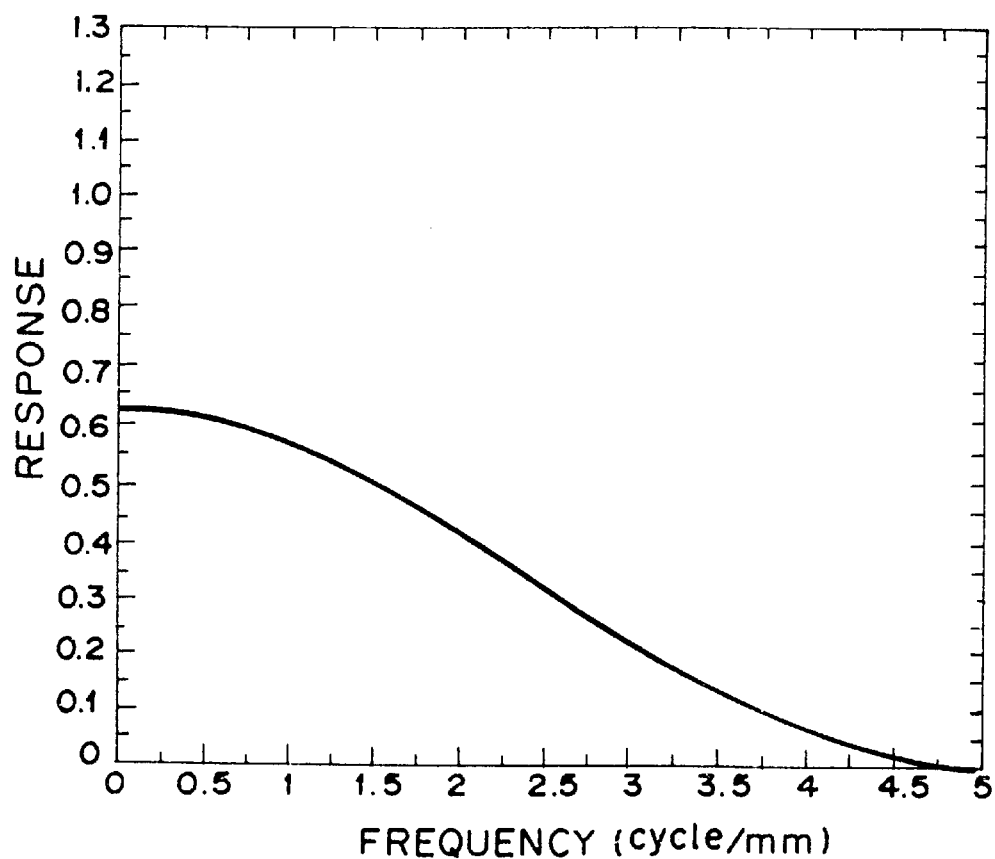
FIG. 34 is a graph showing frequency characteristics of a filter F2 used for the convolution of an image signal S2.

The filter F2 has the frequency characteristics shown in FIG. 34.

Also, it may be considered to set a filter F1 so as to satisfy the condition of F1+F2=1, and the energy of the signal values of the addition signal may thereby be rendered identical with the energy of the original image signals S1 and S2. Specifically, in such cases, the median (16/104) of the filter F2 is altered to a value of (1−median), and the signs of the other filter elements are reversed. In this manner, the filter F1 having the values shown below may be obtained.

$$\begin{matrix} -4 & -8 & -4 \\ -8 & 88 & -8 \\ -4 & -8 & -4 \end{matrix} \Big/ 104 \qquad (26)$$

The filter F1 has the frequency characteristics obtained by subtracting the characteristics shown in FIG. 34 from a value of 1.

In cases where the convolution of the image signal S1 with the filter F1 and the convolution of the image signal S2 with the filter F2 may then be carried out, and an addition signal may be obtained. Also, the frequency characteristics of the addition signal, for example, at frequencies in the vicinity of 2 cycles/mm, may then be emphasized. In such cases, it is necessary for the convolution of the addition signal to be carried out with a filter F3 having the frequency characteristics shown in FIG. 35. In such cases, the amount of calculation becomes large, and a long time is required to obtain the addition signal. The values of the filter F3 are shown below.

$$\begin{matrix} 1 & -1 & -8 & -1 & 1 \\ -1 & 1 & 8 & 1 & -1 \\ -8 & 8 & 64 & 8 & -8 \\ -1 & 1 & 8 & 1 & -1 \\ 1 & -1 & -8 & -1 & 1 \end{matrix} \Big/ 64 \qquad (27)$$

Figure 35:
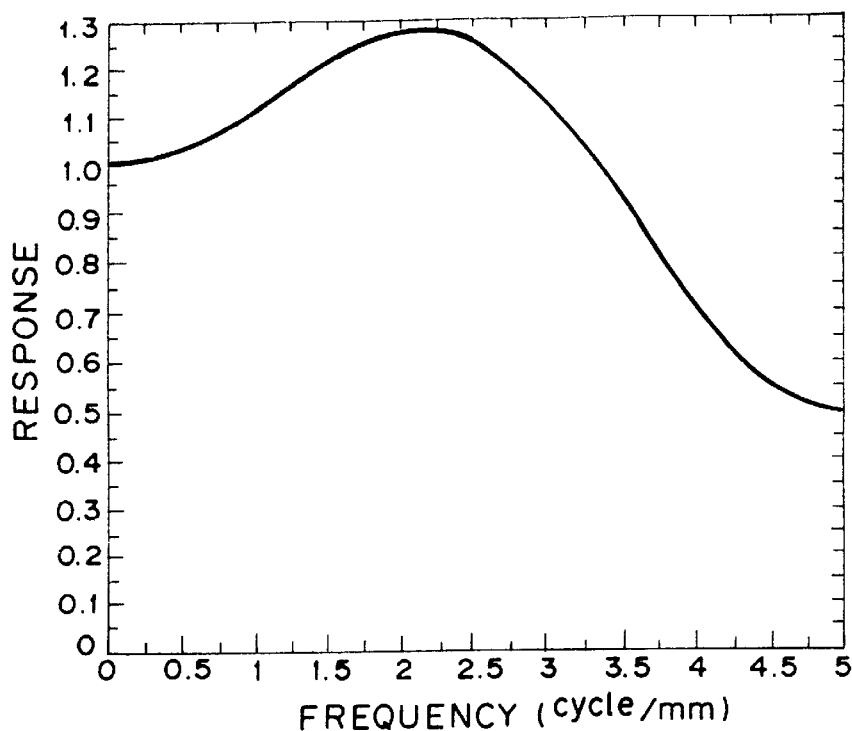
FIG. 35 is a graph showing frequency characteristics of a filter F3 used for the convolution of an addition signal.

Therefore, in the third embodiment of the superposition processing method for a radiation image in accordance with the present invention, the values of the filters F1 and F2 are altered such that the addition signal, which is obtained by adding the images signals resulting from the convolution of the image signal S1 with the filter F1 and the convolution of the image signal S2 with the filter F2, may have the characteristics shown in FIG. 35, i.e. such that F1+F2 may have the frequency characteristics of the filter F3.

Specifically, the convolution of the filter F1 with the filter F3 and the convolution of the filter F2 with the filter F3 are carried out with Formulas (28) and (29).

$$F_1'=F_1*F_3 \qquad (28)$$

$$F_2'=F_2*F_3 \qquad (29)$$

where F1*F3 represents the convolution of the filter F1 with the filter F3. In this manner, new filters F1' and F2' are obtained. Thereafter, the convolution of the image signal S1 with the filter F1' and the convolution of the image signal S2 with the filter F2' are carried out.

Figure 36:
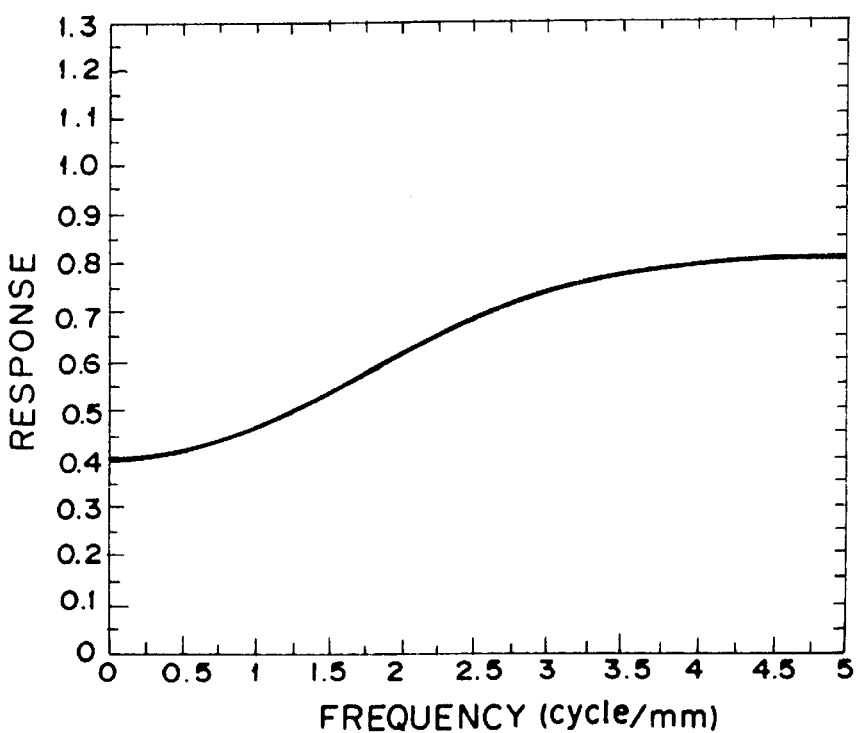
FIG. 36 is a graph showing frequency characteristics of a filter F1' used for the convolution of an image signal S1.

Specifically, the filter F1' has the values shown below and the frequency characteristics shown in FIG. 36.

$$\begin{matrix} -4 & -4 & 36 & 72 & 36 & -4 & -4 \\ -4 & 100 & -68 & -760 & -68 & 100 & -4 \\ 36 & -68 & -220 & 184 & -220 & -68 & 36 \\ 72 & -760 & 184 & 5360 & 184 & -760 & 72 \\ 36 & -68 & -220 & 184 & -220 & -68 & 36 \\ -4 & 100 & -68 & -760 & -68 & 100 & -4 \\ -4 & -4 & 36 & 72 & 36 & -4 & -4 \end{matrix} \Big/ 6656 \qquad (30)$$

Figure 37:
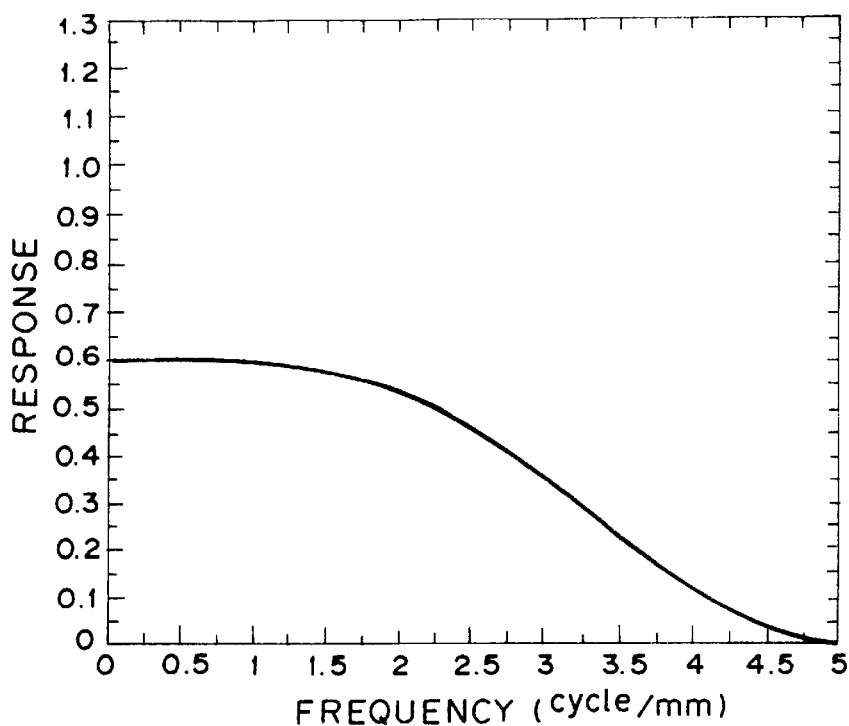
FIG. 37 is a graph showing frequency characteristics of a filter F2' used for the convolution of the image signal S2.

Also, the filter F2' has the values shown below and the frequency characteristics shown in FIG. 37.

$$\begin{matrix} 4 & 4 & -36 & -72 & -36 & 4 & 4 \\ 4 & 4 & -36 & -72 & -36 & 4 & 4 \\ -36 & -36 & 324 & 648 & 324 & -36 & -36 \\ -72 & -72 & 648 & 1296 & 648 & -72 & -72 \\ -36 & -36 & 324 & 648 & 324 & -36 & -36 \\ 4 & 4 & -36 & -72 & -36 & 4 & 4 \\ 4 & 4 & -36 & -72 & -36 & 4 & 4 \end{matrix} \Big/ 6656 \qquad (31)$$

The filters F1' and F2' are stored in the image processing means 219. The convolution of the image signal S1, which has been fed into the image processing means 219, is carried out with the filter F1'. Also, the convolution of the image signal S2 which has been fed into the image processing means 219, is carried out with the filter F2'. In this manner, processed image signals S1' and S2' are obtained. The processed image signals S1' and S2' are fed into an addition means 220 and added to each other.

The processing described above is represented by Formula (32).

$$Sadd=F_1'*S_1+F_2'*S_2 \qquad (32)$$

The addition signal Sadd obtained in this manner is fed into an image reproducing means 221 and used for reproducing a visible image.

The image reproducing means 221 may be a display device, such as a cathode ray tube (CRT) display device, or a recording apparatus for recording an image on photosensitive film by scanning the photosensitive film with a light beam.

Figure 38:
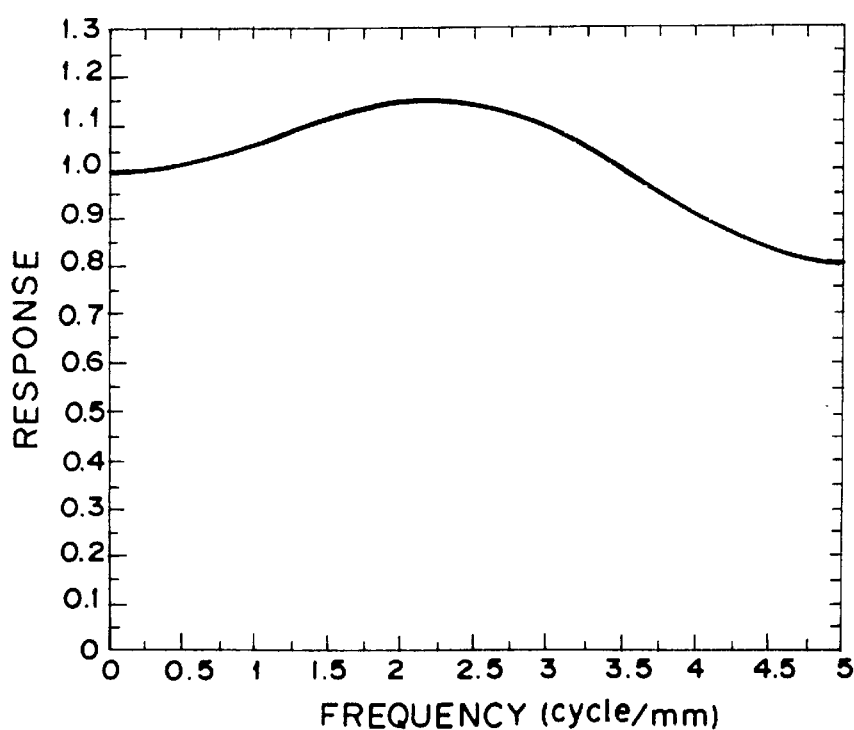
FIG. 38 is a graph showing frequency characteristics of the sum of the filters F1' and F2'.

As illustrated in FIG. 38, in the visible image reproduced from the addition signal Sadd in the image reproducing means 221, the frequency characteristics in the vicinity of 2 cycles/mm have been emphasized.

In the manner described above, the convolution of the image signal S1 is carried out with the filter F1' described above. Also, the convolution of the image signal S2 is carried out with the filter F2' described above. The image signals obtained from the convolution are then added to each other. In this manner, the addition signal can be obtained such that the noise components obtained from the stimulable phosphor sheet, which was located at the position remote from the radiation source, may be reduced, such that the information of the high frequency band obtained from the stimulable phosphor sheet, which was located at the position close to the radiation source, may be emphasized, and such that the addition signal may have the desired frequency characteristics. Therefore, from the addition signal thus obtained, an image having the desired frequency characteristics and good image quality and containing little noise component can be reproduced. Also, the amount of calculation is not so large as in the wavelet transform or the Fourier transform. Therefore, the apparatus for carrying out the third embodiment of the superposition processing method for a radiation image in accordance with the present invention can be kept simple. Further, the operation can be carried out quickly.

In the aforesaid third embodiment of the superposition processing method for a radiation image in accordance with the present invention, the image processing is carried out on both of the image signals S1 and S2. Alternatively, the image processing described above may be carried out on either one of the image signals S1 and S2. However, in cases where the image processing is carried out on both of the image signals S1 and S2 an addition signal representing an image having better image quality can be obtained.

Also, in the aforesaid third embodiment of the superposition processing method for a radiation image in accordance with the present invention, the image signals S1 and S2 are obtained by scanning the stimulable phosphor sheets 4A and 4B, on which the radiation images have been stored, in the main scanning direction and sub-scanning direction. Therefore, the frequency characteristics of each of the image signals S1 and S2 vary for the main scanning direction and the sub-scanning direction. Specifically, with respect to the sub-scanning direction, in each of the image signals S1 and S2 the response becomes high for the frequency band due to the rotation speed of the scanning mirror 12 shown in FIG. 2 and the speed, with which each of the stimulable phosphor sheets 4A and 4B is conveyed.

Therefore, with respect to the sub-scanning direction, the convolution of each of the image signals S1 and S2 is carried out with a filter capable of reducing the response for the aforesaid frequency band. Also, with respect to the main scanning direction, the convolution of each of the image signals S1 and S2 is carried out with a filter capable of emphasizing the response for the aforesaid frequency band. The resulting image signals are then added to each other. From the addition signal thus obtained, an image can be reproduced which has the well-balanced frequency characteristics with respect to the main scanning direction and the sub-scanning direction, and which has good image quality and can serve as an effective tool in, particularly, the efficient and accurate diagnosis of an illness.

In the aforesaid third embodiment of the superposition processing method for a radiation image in accordance with the present invention, in order for the image signals S1 and S2 to be added to each other in a desired addition ratio, it is necessary for the value of the filter coefficient to be determined such that the frequency characteristics of the filter F2 may become the desired characteristics. The filter F2 may be determined with one of the two techniques for determining the filter F2, which have been described above with reference to the aforesaid modification of the second embodiment of the superposition processing method for a radiation image in accordance with the present invention.

In the aforesaid third embodiment of the superposition processing method for a radiation image in accordance with the present invention, as illustrated in FIG. 1, the radiation images are recorded on the two stimulable phosphor sheets 4A and 4B. The image signals obtained from the two stimulable phosphor sheets 4A and 4B are then added to each other. Alternatively, as illustrated in FIG. 14, the radiation image of the object 1 may be recorded on the single stimulable phosphor sheet 4A. As illustrated in FIG. 15, two image signals to be added to each other may be obtained by detecting light emitted by the two surfaces of the stimulable phosphor sheet 4A.

The two image signals S1 and S2 which have been obtained from the analog-to-digital converters 17a and 17b in the same manner as that described above with reference to FIG. 15, are added to each other in the same manner as that in the aforesaid third embodiment of the superposition processing method for a radiation image in accordance with the present invention. In this manner, as in the aforesaid third embodiment of the superposition processing method for a radiation image in accordance with the present invention, an image having the desired frequency characteristics and good image quality and containing little noise component can be reproduced from the addition signal, which has thus been obtained.

As another alternative, as illustrated in FIG. 16, the two surfaces of the stimulable phosphor sheet 4A may be scanned respectively with laser beams 11a and 11b, which have been produced by the laser beam sources 10a and 10b. The light emitted by the two surfaces of the stimulable phosphor sheet 4A may thus be detected, and two image signals may thereby be obtained.

In the aforesaid third embodiment of the superposition processing method for a radiation image in accordance with the present invention, the two image signals are superposed one upon the other. The processing described above can also be carried out when energy subtraction processing is carried out on two image signals. How the image processing is carried out on the image signals to be subjected to the energy subtraction processing will be described hereinbelow.

In the image recording apparatus for carrying out the one-shot energy subtraction processing, which is shown in FIG. 20, in the same manner as that described above, the two radiation images, in which different images of a specific structure of the object 1 are embedded, are stored on the two stimulable phosphor sheets 4A and 4B.

Thereafter, the radiation images are respectively read out from the two stimulable phosphor sheets 4A and 4B by using the radiation image read-out apparatus shown in FIG. 2. Two digital image signals S1 and S2 representing the radiation images are thereby obtained. The obtained image signals S1 and S2 are stored in the storage medium 18.

Figure 39:
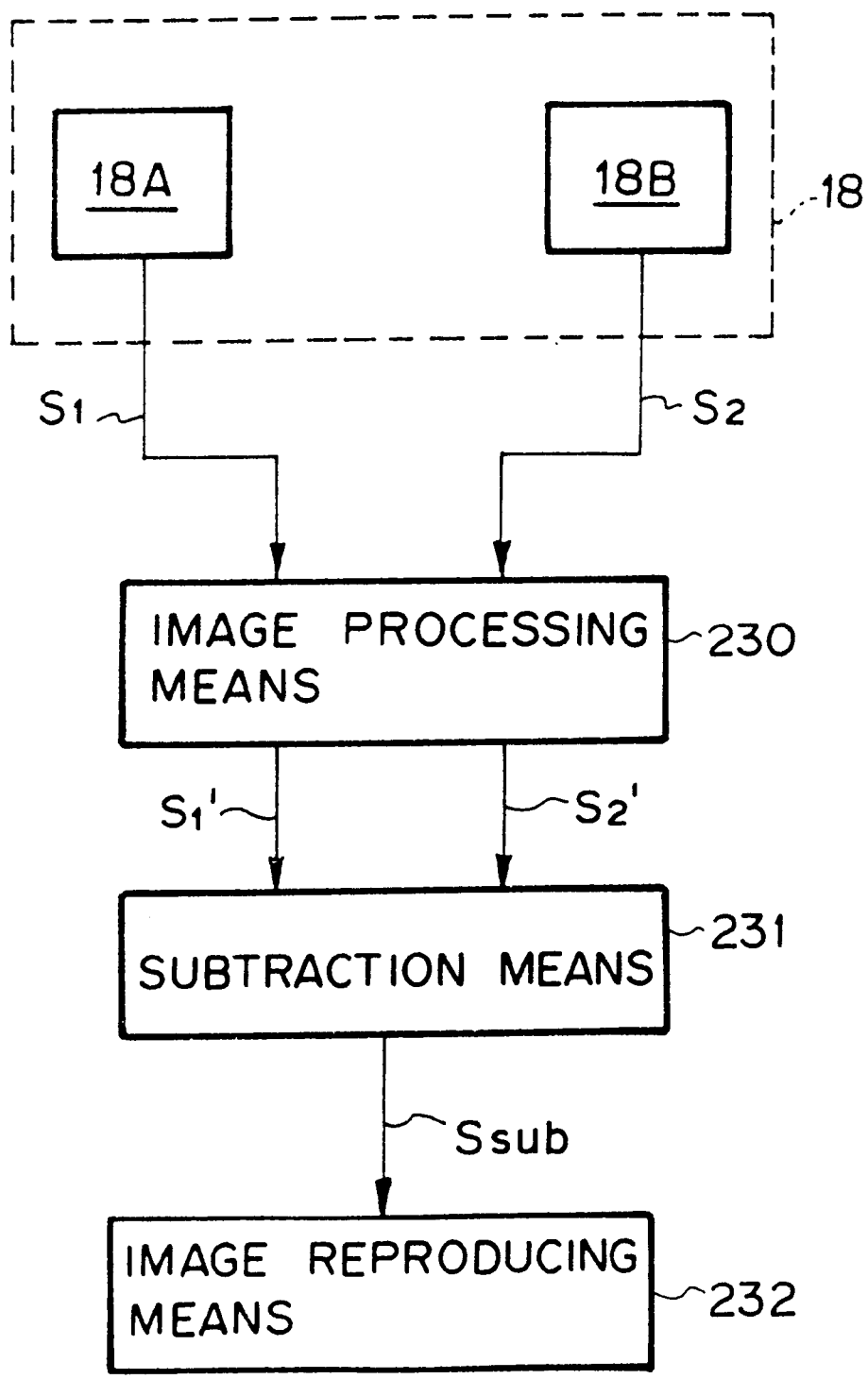
FIG. 39 is a block diagram showing an apparatus for carrying out a third embodiment of the energy subtraction processing method in accordance with the present invention.

Subtraction processing is then carried out on the digital image signals S1 and S2 which have been obtained in the manner described above. FIG. 39 is a block diagram showing an apparatus for carrying out a third embodiment of the energy subtraction processing method in accordance with the present invention. First, the image signals S1 and S2 are read from an image file 18A and an image file 18B in the storage medium 18 and fed into an image processing means 230. In the same manner as that in the aforesaid third embodiment of the superposition processing method for a radiation image in accordance with the present invention, the two image signals S1 and S2 are subjected to the processing, such as the convolution with the mask, in the image processing means 230. Processed image signals S1' and S2' are thereby obtained.

The image signals S1' and S2' thus obtained are fed into a subtraction means 231. In the subtraction means 231, subtraction processing is carried out on the image signals S1' and S2'.

Specifically, the subtractions are carried out with Formula (33)

$$S\text{sub} = t_1 \cdot F_1 * S_1' - t_2 \cdot F_2 * S_2' \tag{33}$$

where t1 and t2 represent the energy subtraction factors.

In the manner described above, the subtraction signal Ssub is obtained from the subtraction means 231. The subtraction signal Ssub is fed into an image reproducing means 232 and used for reproducing a visible image.

In the aforesaid third embodiment of the energy subtraction processing method in accordance with the present invention, the one-shot energy subtraction processing is carried out. The aforesaid third embodiment of the energy subtraction processing method in accordance with the present invention is also applicable to the two-shot energy subtraction processing.

In the manner described above, the convolution of the image signal S1 is carried out with the filter F1. Also, the convolution of the image signal S2 is carried out with the filter F2. The image signals obtained from the convolution are then subtracted from each other. In this manner, the subtraction signal can be obtained such that the noise components obtained from the stimulable phosphor sheet, which was located at the position remote from the radiation source, may be reduced, such that the information of the high frequency band obtained from the stimulable phosphor sheet, which was located at the position close to the radiation source, may be emphasized, and such that the subtraction signal may have the desired frequency characteristics. Therefore, from the subtraction signal thus obtained, an image having the desired frequency characteristics and good image quality and containing little noise component can be reproduced. Also, the amount of calculation is not so large as in the wavelet transform or the Fourier transform. Therefore, the apparatus for carrying out the third embodiment of the energy subtraction processing method in accordance with the present invention can be kept simple. Further, the operation can be carried out quickly.

A fourth embodiment of the superposition processing method for a radiation image in accordance with the present invention and a fourth embodiment of the energy subtraction processing method in accordance with the present invention will be described hereinbelow.

Image signals S1 and S2 are obtained in the same manner as that described above with reference to FIGS. 1 and 2.

At this time, as illustrated in FIG. 40, a radiation dose calculating means 319 calculates the dose of radiation delivered to the object 1 in accordance with the values of the output signals SA and SB and the read-out sensitivity and latitude in the photomultiplier 15. A signal SM representing the calculated dose of radiation is stored on the storage medium 18 together with the image signals S1 and S2.

Figure 41:
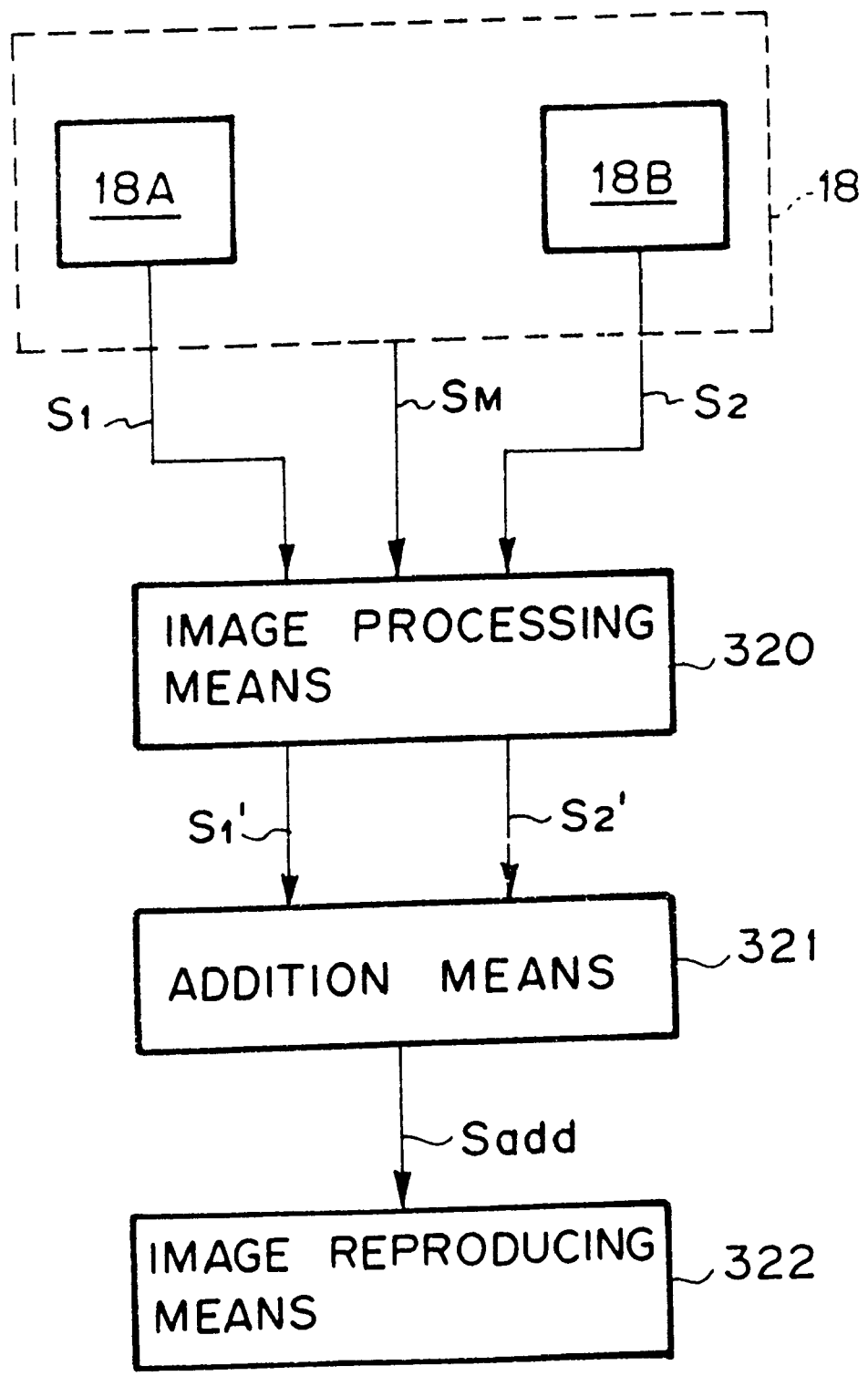
FIG. 41 is a block diagram showing an apparatus for carrying out a fourth embodiment of the superposition processing method for a radiation image in accordance with the present invention.

Thereafter, a superposition processing is carried out on the image signals S1 and S2. FIG. 41 is a block diagram showing an apparatus for carrying out the fourth embodiment of the superposition processing method for a radiation image in accordance with the present invention. First, the image signals S1 and S2 and the signal SM are read from an image file 18A and an image file 18B in the storage medium 18 and fed into an image processing means 320. The image processing with a filter described below is carried out on the two image signals S1 and S2 which have been fed into the image processing means 320. The image signals, which have been obtained from the image processing, are fed into an addition means 321 and subjected to an addition. An addition signal Sadd, which has been obtained from the addition means 321, is fed into an image reproducing means 322, such as a CRT display device, and is used for reproducing a visible image.

How the image processing is carried out in the image processing means 320 will be described hereinbelow.

As described above with reference to FIGS. 6A through 9, the optimum addition ratio, which gives the largest DQE serving as an index of an image, varies for different frequencies. Also, as described above, the image signal S1 carries the information up to the high frequency band. However, in the image signal S2 noise components are predominant in the information of the high frequency band. Further, the frequency band, in which the noise components are predominant in the image signal, varies for different doses of radiation delivered to the object 1. Therefore, the dose of radiation delivered to the object 1 is taken into consideration, and a mask filter is obtained which is capable of emphasizing the response with respect to the high frequency band of the image signal S1. Also, a mask filter is obtained which is capable of reducing the response with respect to the high frequency band of the image signal S2. The convolution of each of the image signals S1 and S2 is carried out with the corresponding mask filter. Thereafter, the resulting image signals S1 and S2 are added to each other. In this manner, an addition signal can be obtained which represents a radiation image having good image quality.

How the image signals S1 and S2 are processed will be described hereinbelow.

Figure 42:
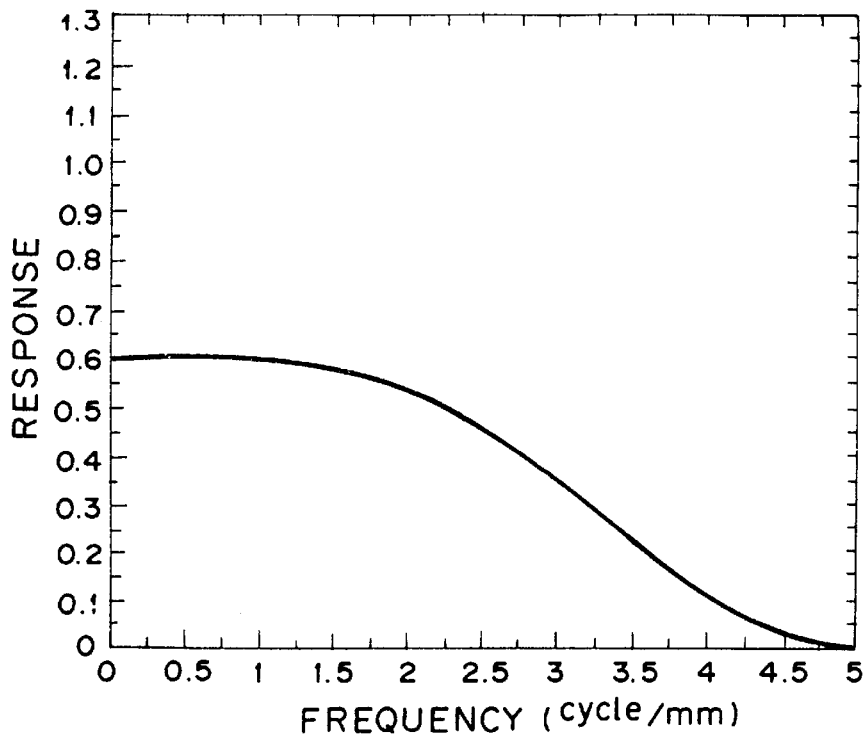
FIG. 42 is a graph showing frequency characteristics of a filter used for the convolution of an image signal S2 (radiation dose: 0.1 mR)
Figure 43:
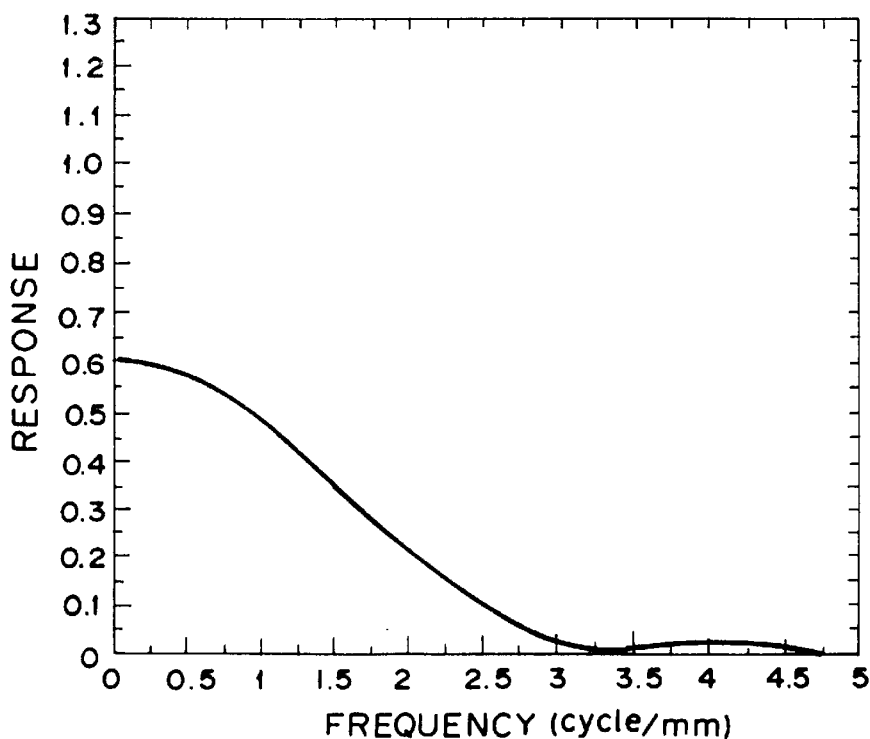
FIG. 43 is a graph showing frequency characteristics of a filter used for the convolution of an image signal S2 (radiation dose: 0.1 mR)
Figure 44:
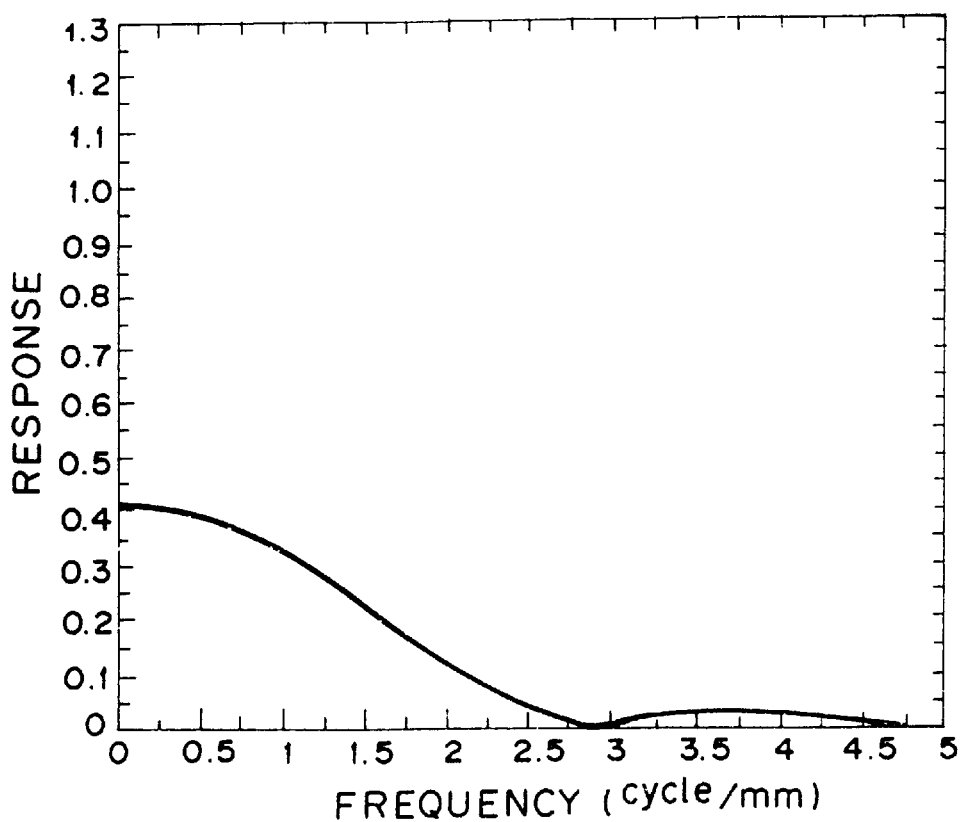
FIG. 44 is a graph showing frequency characteristics of a filter used for the convolution of an image signal S2 (radiation dose: 10 mR)

First, the filters F1 and F2 to be used for the convolutions of the image signals S1 and S2 are determined in accordance with the dose of radiation delivered to the object 1. When the dose of radiation delivered to the object 1 is large, in the noise components, the proportion of the fixed noise, which is due to the structure of the stimulable phosphor sheet, such as the state in which the stimulable phosphor is applied to the stimulable phosphor sheet, becomes higher than the proportion of the quantum noise of the radiation. Specifically, between the image signals S1 and S2 the correlation of the quantum noise of the radiation is small, but the correlation of the fixed noise is large. Therefore, when the dose of radiation delivered to the object 1 becomes large, the proportion of the noise components becomes high in the high frequency components of the image signal S2 which is obtained from the stimulable phosphor sheet 4B located at the position remote from the radiation source during the image recording operation. Accordingly, as for the image signal S2 when the dose of radiation delivered to the object 1 is 0.1 mR, a filter F2 having the frequency characteristics shown in FIG. 42 is set. Also, when the dose of radiation delivered to the object 1 is 1 mR, a filter F2 having the frequency characteristics shown in FIG. 43 is set. Further, when the dose of radiation delivered to the object 1 is 10 mR, a filter F2 having the frequency characteristics shown in FIG. 44 is set. As for the image signal S1, a filter F1 satisfying the condition of F1+F2=1 is set such that the energy of the signal values of the addition signal may be identical with the energy of the original image signals S1 and S2. The convolution of the image signal S1 is carried out with the filter F1, and the convolution of the image signal S2 is carried out with the filter F2.

The filter F2 having the frequency charactistics shown in FIG. 42, the filter F2 having the frequency characteristics shown in FIG. 43, and the filter F2 having the frequency characteristics shown in FIG. 44 can respectively be represented by Formulas (34), (35) and (36).

$$\begin{matrix} 4 & -16 & -40 & -16 & 4 \\ -16 & 64 & 160 & 64 & -16 \\ -40 & 160 & 400 & 160 & -40 \\ -16 & 64 & 160 & 64 & -16 \\ 4 & -16 & -40 & -16 & 4 \end{matrix} \Bigg/ 1696 \qquad (34)$$

-continued $$\begin{pmatrix} 9 & 27 & 36 & 27 & 9 \\ 27 & 81 & 108 & 81 & 27 \\ 36 & 108 & 144 & 108 & 36 \\ 27 & 81 & 108 & 81 & 27 \\ 9 & 27 & 36 & 27 & 9 \end{pmatrix} \Big/ 2124 \quad (35)$$

$$\begin{pmatrix} 4 & 10 & 12 & 10 & 4 \\ 10 & 25 & 30 & 25 & 10 \\ 12 & 30 & 36 & 30 & 12 \\ 10 & 25 & 30 & 25 & 10 \\ 4 & 10 & 12 & 10 & 4 \end{pmatrix} \Big/ 980 \quad (36)$$

As for the filter F1, such that it may satisfy the condition of F1+F2=1, the medians of the filters F2 shown in Formulas (34), (35), and (36) are altered to a value of (1−median), and the signs of the other filter elements are reversed. In this manner, the filters F1 are obtained which are represented by Formulas (37), (38), and (39).

$$\begin{pmatrix} -4 & 16 & 40 & 16 & -4 \\ 16 & -64 & -160 & -64 & 16 \\ 40 & -160 & 1296 & -160 & 40 \\ -16 & 64 & 160 & 64 & -16 \\ 4 & -16 & -40 & -16 & 4 \end{pmatrix} \Big/ 1696 \quad (37)$$

$$\begin{pmatrix} -9 & -27 & -36 & -27 & -9 \\ -27 & -81 & -108 & -81 & -27 \\ -36 & -108 & 1980 & -108 & -36 \\ -27 & -81 & -108 & -81 & -27 \\ -9 & -27 & -36 & -27 & -9 \end{pmatrix} \Big/ 2124 \quad (38)$$

$$\begin{pmatrix} -4 & -10 & -12 & -10 & -4 \\ -10 & -25 & -30 & -25 & -10 \\ -12 & -30 & 944 & -30 & -12 \\ -10 & -25 & -30 & -25 & -10 \\ -4 & -10 & -12 & -10 & -4 \end{pmatrix} \Big/ 980 \quad (39)$$

In this manner, in the image processing means 320, the three kinds of filters are set for each of the image signals S1 and S2 in accordance with the dose of radiation delivered to the object 1. In cases where the dose of radiation represented by the signal SM is XmR, if $0.1 \leq X \leq 1$, the filter F1 can be determined by calculating the elements of the filter F1 with the linear interpolation, or the like. The calculation is represented by Formula (40).

$$F_1(XmR) = \frac{\log_{10} 1.0 - \log_{10} X}{\log_{10} 1.0 - \log_{10} 0.1} \cdot F_1(0.1mR) + \frac{\log_{10} X - \log_{10} 1.0}{\log_{10} 1.0 - \log_{10} 0.1} \cdot F_1(1.0mR) \quad (40)$$

If $1 \leq X \leq 10$, the filter F1 can be determined by calculating the elements of the filter F1 with the linear interpolation, or the like. The calculation is represented by Formula (41).

$$F_1(XmR) = \frac{\log_{10} 10 - \log_{10} X}{\log_{10} 10 - \log_{10} 1.0} \cdot F_1(1.0mR) + \frac{\log_{10} X - \log_{10} 1.0}{\log_{10} 10 - \log_{10} 1.0} \cdot F_1(10mR) \quad (41)$$

In the same manner, the filter F2 is determined.

After the filters F1 and F2 are determined in accordance with the dose of radiation delivered to the object 1, the convolution of the image signal S1 is carried out with the filter F1. Also, the convolution of the image signal S2 is carried out with the filter F2. In this manner, processed image signals S1' and S2' are obtained. The processed image signals S1' and S2' are fed into an addition means 321 and added to each other.

The processing described above is represented by Formula (42).

$$S_{add} = F_1 * S_1 + F_2 * S_2 \quad (42)$$

where F1*S1 represents the convolution of S1 with F1.

The addition signal Sadd obtained in this manner is fed into an image reproducing means 322 and used for reproducing a visible image.

The image reproducing means 322 may be a display device, such as a cathode ray tube (CRT) display device, or a recording apparatus for recording an image on photosensitive film by scanning the photosensitive film with a light beam.

In the manner described above, the convolution of the image signal S1 is carried out with the filter F1 described above. Also, the convolution of the image signal S2 is carried out with the filter F2 described above. The image signals obtained from the convolution are then added to each other. In this manner, the addition signal can be obtained such that the noise components obtained from the stimulable phosphor sheet, which was located at the position remote from the radiation source, may be reduced, such that the information of the high frequency band obtained from the stimulable phosphor sheet, which was located at the position close to the radiation source, may be emphasized, and such that the dose of radiation delivered to the object may be taken into consideration. Therefore, from the addition signal thus obtained, an image, which has good image quality and in which the noise components have been reduced in accordance with the dose of radiation delivered to the object, can be reproduced. Also, the amount of calculation is not so large as in the wavelet transform or the Fourier transform. Therefore, the apparatus for carrying out the fourth embodiment of the superposition processing method for a radiation image in accordance with the present invention can be kept simple. Further, the operation can be carried out quickly.

In the aforesaid fourth embodiment of the superposition processing method for a radiation image in accordance with the present invention, the image processing is carried out on both of the image signals S1 and S2. Alternatively, the image processing described above may be carried out on either one of the image signals S1 and S2. However, in cases where the image processing is carried out on both of the image signals S1 and S2 an addition signal representing an image having better image quality can be obtained.

For reasons of the apparatus, for example, in cases where the capacity of the memory in the apparatus is small, it may be desired to carry out the convolution of the image signal S1 and the convolution of the image signal S2 with a single filter. In such cases, the addition may be carried out with the formulas shown below.

$$S_{add} = (S_1 - F_2 * S_1) + (F_2 * S_2) \quad (43)$$

(Because F1+F2=1, $$\begin{aligned} S_{add} &= F_1 * S_1 + F_2 * S_2 \\ &= (1 - F_2) * S_1 + F_2 * S_2 \\ &= (S_1 - F_2 * S_1) + (F_2 * S_2)) \end{aligned} \quad (44)$$

$$\text{or } S_{add} = F_1 * S_1 + S_2 - F_1 * S_2$$

In this manner, the same results as those with Formula (42) can be obtained.

In the aforesaid fourth embodiment of the superposition processing method for a radiation image in accordance with the present invention, in order for the image signals S1 and S2 to be added to each other in a desired addition ratio, it is necessary for the value of the filter coefficient to be determined such that the frequency characteristics of the filter F2 may become the desired characteristics. The filter F2 may be determined with one of the two techniques for determining the filter F2, which have been described above with reference to the aforesaid modification of the second embodiment of the superposition processing method for a radiation image in accordance with the present invention.

Also, in the aforesaid fourth embodiment of the superposition processing method for a radiation image in accordance with the present invention, the entire dose of radiation delivered to the object 1 is calculated, and the filters F1 and F2 are set in accordance with the calculated dose of radiation. Alternatively, the dose of radiation delivered to the object 1 may be calculated for each of different portions of the object 1, the patterns of which are embedded in the radiation image represented by each of the image signals S1 and S2 in accordance with, for example, the values of the respective image signal components of each of the image signals S1 and S2 or the unsharp mask signal of each of the image signals S1 and S2. Each of the filters F1 and F2 may be set for each of the portions of the object in accordance with the calculated dose of radiation. Thereafter, the convolution of each of the image signals S1 and S2 with the filter, which has been set for each of the portions of the object.

In cases where each of the filters F1 and F2 is set for each of portions of the object, the patterns of which are embedded in the radiation image, and the convolutions and the addition are then carried out, an addition signal can be obtained in an addition ratio optimum for each of the portions of the object. Therefore, it becomes possible to obtain the addition signal representing a radiation image which has good image quality with respect to each of the portions of the object and can serve as an effective tool in, particularly, the efficient and accurate diagnosis of an illness at each of the portions of the object.

Further, in the aforesaid fourth embodiment of the superposition processing method for a radiation image in accordance with the present invention, the filters satisfying the condition of F1+F2=1 are employed. Alternatively, filters, which do not satisfy the condition of F1+F2=1, may be employed. However, in cases where such filters are used, it is necessary to carry out a predetermined weighting process such that the energy of the signal values of the addition signal Sadd may become identical with the energy of the original image signals S1 and S2. Specifically, it is necessary for the addition signal Sadd to be calculated with Formula (45).

$$S_{add} = t \cdot F_1 * S_1 + (1-t) \cdot F_2 * S_2 \quad (45)$$

In the aforesaid fourth embodiment of the superposition processing method for a radiation image in accordance with the present invention, as illustrated in FIG. 1, the radiation images are recorded on the two stimulable phosphor sheets 4A and 4B. The image signals obtained from the two stimulable phosphor sheets 4A and 4B are then added to each other. Alternatively, as illustrated in FIG. 14, the radiation image of the object 1 may be recorded on the single stimulable phosphor sheet 4A. As illustrated in FIG. 15, two image signals to be added to each other may be obtained by detecting light emitted by the two surfaces of the stimulable phosphor sheet 4A.

The two image signals S1 and S2 which have been obtained from the analog-to-digital converters 17a and 17b in the same manner as that described above with reference to FIG. 15, are added to each other in the same manner as that in the aforesaid fourth embodiment of the superposition processing method for a radiation image in accordance with the present invention. In this manner, as in the aforesaid fourth embodiment of the superposition processing method for a radiation image in accordance with the present invention, an image having good image quality and containing little noise component can be reproduced from the addition signal, which has thus been obtained.

As another alternative, as illustrated in FIG. 16, the two surfaces of the stimulable phosphor sheet 4A may be scanned respectively with laser beams 11a and 11b, which have been produced by the laser beam sources 10a and 10b. The light emitted by the two surfaces of the stimulable phosphor sheet 4A may thus be detected, and two image signals may thereby be obtained.

In the aforesaid fourth embodiment of the superposition processing method for a radiation image in accordance with the present invention, the two image signals are superposed one upon the other. The processing described above can also be carried out when energy subtraction processing is carried out on two image signals. How the image processing is carried out on the image signals to be subjected to the energy subtraction processing will be described hereinbelow.

In the image recording apparatus for carrying out the one-shot energy subtraction processing, which is shown in FIG. 20, in the same manner as that described above, the two radiation images, in which different images of a specific structure of the object 1 are embedded, are stored on the two stimulable phosphor sheets 4A and 4B.

Thereafter, the radiation images are respectively read out from the two stimulable phosphor sheets 4A and 4B by using the radiation image read-out apparatus shown in FIG. 2. Two digital image signals S1 and S2 representing the radiation images are thereby obtained. The obtained image signals S1 and S2 are stored in the storage medium 18.

Figure 45:
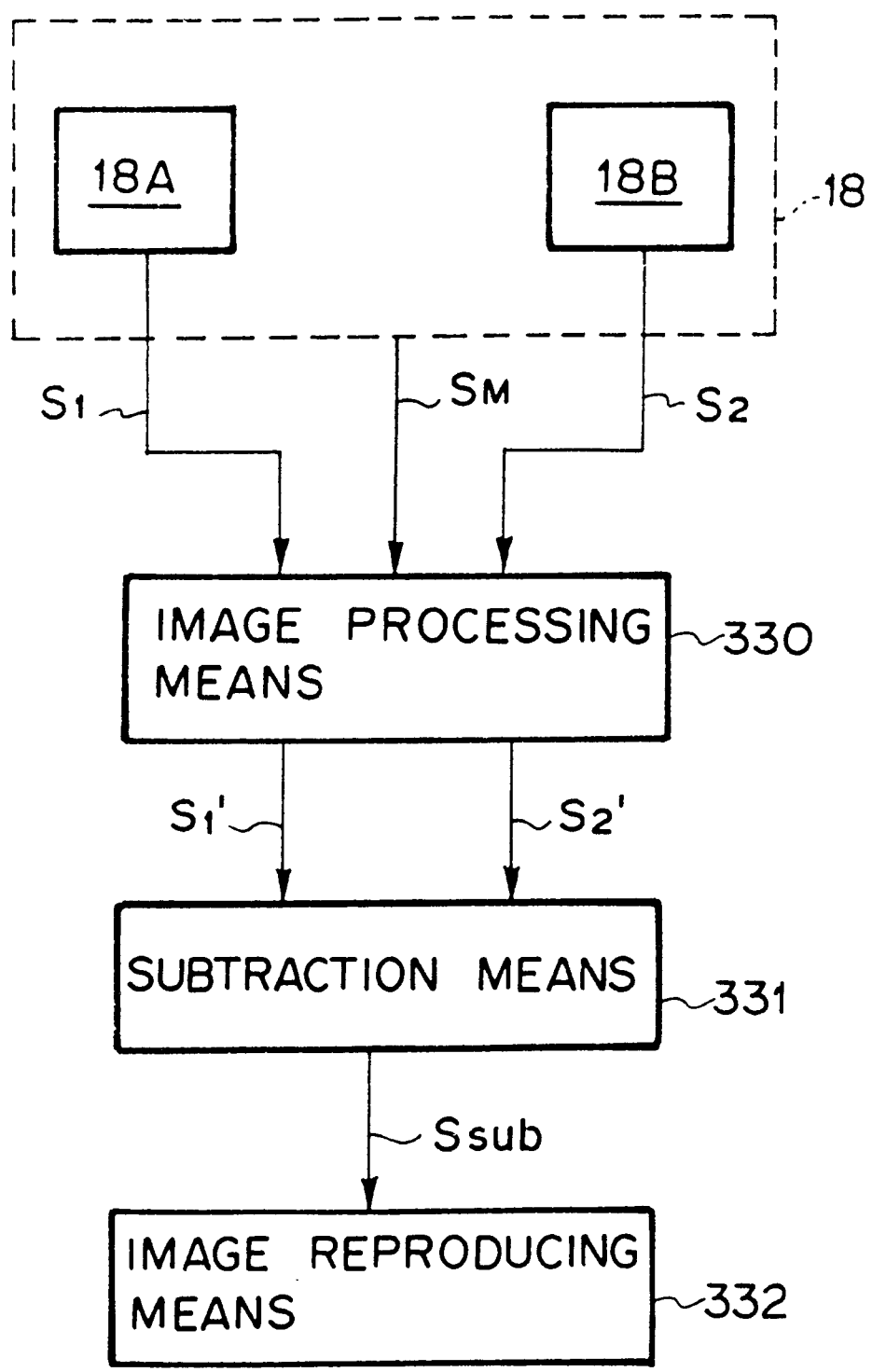
FIG. 45 is a block diagram showing an apparatus for carrying out a fourth embodiment of the energy subtraction processing method in accordance with the present invention.

Subtraction processing is then carried out on the digital image signals S1 and S2 which have been obtained in the manner described above. FIG. 45 is a block diagram showing an apparatus for carrying out a fourth embodiment of the energy subtraction processing method in accordance with the present invention. First, the image signals S1 and S2 are read from an image file 18A and an image file 18B in the storage medium 18 and fed into an image processing means 330. In the same manner as that in the aforesaid fourth embodiment of the superposition processing method for a radiation image in accordance with the present invention, the two image signals S1 and S2 are subjected to the processing, such as the convolution with the mask, in the image processing means 330. Processed image signals S1' and S2' are thereby obtained.

The image signals S1' and S2' thus obtained are fed into a subtraction means 331. In the subtraction means 331, subtraction processing is carried out on the image signals S1' and S2'.

Specifically, the subtractions are carried out with Formula (46)

$$S\text{sub} = t_1 \cdot F_1 * S_1' - t_2 \cdot F_2 * S_2' \qquad (46)$$

where t1 and t2 represent the energy subtraction factors.

In the manner described above, the subtraction signal Ssub is obtained from the subtraction means 331. The subtraction signal Ssub is fed into an image reproducing means 332 and used for reproducing a visible image.

In the aforesaid fourth embodiment of the energy subtraction processing method in accordance with the present invention, the one-shot energy subtraction processing is carried out. The aforesaid fourth embodiment of the energy subtraction processing method in accordance with the present invention is also applicable to the two-shot energy subtraction processing.

In the manner described above, the convolutions of the image signals S1 and S2 are carried out with the filters described above. The image signals obtained from the convolution are then subtracted from each other. In this manner, the difference signal can be obtained such that the noise components obtained from the stimulable phosphor sheet, which was located at the position remote from the radiation source, may be reduced, such that the information of the high frequency band obtained from the stimulable phosphor sheet, which was located at the position close to the radiation source, may be emphasized, and such that the dose of radiation delivered to the object may be taken into consideration. Therefore, from the difference signal thus obtained, an image, which has good image quality and in which the noise components have been reduced in accordance with the dose of radiation delivered to the object, can be reproduced. Also, the amount of calculation is not so large as in the wavelet transform or the Fourier transform. Therefore, the apparatus for carrying out the fourth embodiment of the energy subtraction processing method in accordance with the present invention can be kept simple. Further, the operation can be carried out quickly.

What is claimed is:

1. A superposition processing method for a radiation image, comprising the steps of:
    i) obtaining a plurality of image signals representing one or more radiation images of an object, each of the plurality of image signals having different respective frequency characteristics for noise, each of the plurality of image signals having respective image signal components,
    ii) for each of a plurality of different frequency bands, weighting the respective image signal components with weight factors to provide weighted image signal components, wherein, for each of said image signals, all the respective image signal components are identically weighted, and
    iii) adding all of the weighted image signal components to one another to obtain an addition signal representing the superposition of said plurality of image signals,
    wherein values of the weight factors used for ones of the plurality of image signal components having a low signal-to-noise ratio are smaller than values of the weight factors used for ones of the plurality of image signal components having a high signal-to-noise ratio, and
    wherein said weight factors are determined, at each of said plurality of different frequency bands, based on said different respective frequency characteristics for noise for said respective image signal.

2. A superposition processing method for a radiation image as defined in claim 1 wherein the image superposition processing is carried out by:
    a) carrying out a Fourier transform on each of the image signals, each of the image signals being thereby decomposed into a plurality of Fourier transform factor signals, each being of one of different frequency bands,
    b) weighting the Fourier transform factor signals, which are of a single frequency band, with the weight factors, such that the values of the weight factors may be varied for the Fourier transform factor signals of the different frequency bands,
    c) adding the weighted Fourier transform factor signals, which are of a single frequency band, to one another, an addition Fourier transform factor signal being thereby obtained for each of the different frequency bands, and
    d) carrying out an inverse Fourier transform on the addition Fourier transform factor signal.

3. A superposition processing method for a radiation image as defined in claim 1 wherein the image superposition processing is carried out by:
    a) subjecting each of the image signals to a transform to multi-resolution space, each of the image signals being thereby decomposed into a plurality of transform factor signals, each being of one of different frequency bands,
    b) weighting the transform factor signals, which are of a single frequency band, with the weight factors, such that the values of the weight factors may be varied for the transform factor signals of the different frequency bands,
    c) adding the weighted transform factor signals, which are of a single frequency band, to one another, an addition transform factor signal being thereby obtained for each of the different frequency bands, and
    d) carrying out an inverse transform on the addition transform factor signal.

4. A superposition processing method for a radiation image as defined in claim 3 wherein the transform to multi-resolution space is carried out with a wavelet transform.

5. A superposition processing method for a radiation image as defined in claim 1, 3, or 4 wherein the value of the weight factor with respect to a portion of the radiation image, to which a large dose of radiation reached during an operation for recording the radiation image, is rendered larger than the value of the weight factor with respect to a portion of the radiation image, to which a small dose of radiation reached during the operation for recording the radiation image, in accordance with the portions of the object, the patterns of which are embedded in the radiation image.

6. A superposition processing method for a radiation image as defined in claim 1, 2, 3, or 4, wherein the plurality of the image signals are obtained by:
    exposing the two surfaces or either one of the two surfaces of a single stimulable phosphor sheet, on which the radiation image has been stored, to stimulating rays, which cause the stimulable phosphor sheet to emit light in proportion to the amount of energy stored thereon during its exposure to radiation, and
    photoelectrically detecting the emitted light independently on the opposite surface sides of the stimulable phosphor sheet.

7. A superposition processing method for a radiation image as defined in claim 5 wherein the plurality of the image signals are obtained by:

exposing the two surfaces or either one of the two surfaces of a single stimulable phosphor sheet, on which the radiation image has been stored, to stimulating rays, which cause the stimulable phosphor sheet to emit light in proportion to the amount of energy stored thereon during its exposure to radiation, and photoelectrically detecting the emitted light independently on the opposite surface sides of the stimulable phosphor sheet.

8. A superposition processing method for a radiation image as defined in claim 1, 2, 3, or 4, wherein the plurality of the image signals are obtained by:

exposing each of at least two stimulable phosphor sheets, on each of which a radiation image has been stored, to stimulating rays, which cause the stimulable phosphor sheet to emit light in proportion to the amount of energy stored thereon during its exposure to radiation, and photoelectrically detecting the emitted light.

9. A superposition processing method for a radiation image as defined in claim 5 wherein the plurality of the image signals are obtained by:

exposing each of at least two stimulable phosphor sheets, on each of which a radiation image has been stored, to stimulating rays, which cause the stimulable phosphor sheet to emit light in proportion to the amount of energy stored thereon during its exposure to radiation, and photoelectrically detecting the emitted light.

10. An energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of respective image signal components, from the plurality of the radiation images, said image signals having different respective image signal frequency characteristics for noise, iii) for each of a plurality of different frequency bands, weighting the respective image signal components with weight factors to provide weighted image signal components, wherein, for each of said image signals, all the respective image signal components are identically weighted, and iv) subtracting the weighted image signal components of the plurality of the image signals from one another to obtain a difference signal representing an image of a specific structure of the object being thereby obtained, wherein values of the weight factors used for ones of the plurality of image signal components having a low signal-to-noise ratio are smaller than values of the weight factors used for ones of the plurality of image signal components having a high signal-to-noise ratio, and wherein said weight factors are determined, at each of said plurality of different frequency bands, based on said different respective frequency characteristics for noise for said respective image signal.

11. An energy subtraction processing method as defined in claim 10 wherein the difference signal is obtained by:

a) carrying out a Fourier transform on each of the image signals, each of the image signals being thereby decomposed into a plurality of Fourier transform factor signals, each being of one of different frequency bands, b) weighting the Fourier transform factor signals, which are of a single frequency band, with the weight factors, such that the values of the weight factors may be varied for the Fourier transform factor signals of the different frequency bands, c) subtracting the weighted Fourier transform factor signals, which are of a single frequency band, from one another, a subtraction Fourier transform factor signal being thereby obtained for each of the different frequency bands, and d) carrying out an inverse Fourier transform on the subtraction Fourier transform factor signal.

12. An energy subtraction processing method as defined in claim 10 wherein the subtraction signal is obtained by:

a) subjecting each of the image signals to a transform to multi-resolution space, each of the image signals being thereby decomposed into a plurality of transform factor signals, each being of one of different frequency bands, b) weighting the transform factor signals, which are of a single frequency band, with the weight factors, such that the values of the weight factors may be varied for the transform factor signals of the different frequency bands, c) subtracting the weighted transform factor signals, which are of a single frequency band, from one another, a subtraction transform factor signal being thereby obtained for each of the different frequency bands, and d) carrying out an inverse transform on the subtraction transform factor signal.

13. An energy subtraction processing method as defined in claim 12 wherein the transform to multi-resolution space is carried out with a wavelet transform.

14. An energy subtraction processing method as defined in claim 10, 12, or 13 wherein the value of the weight factor with respect to a portion of each radiation image, to which a large dose of radiation reached during an operation for recording the radiation image, is rendered larger than the value of the weight factor with respect to a portion of the radiation image, to which a small dose of radiation reached during the operation for recording the radiation image, in accordance with the portions of the object, the patterns of which are embedded in the radiation image.

15. A superposition processing method for a radiation image, comprising the steps of:

i) obtaining a plurality of image signals, which represent a radiation image of a single object or radiation images of the single object, and which have different respective image signal frequency characteristics including different respective levels of response and different respective noise image signal dispersions, each of the image signals having respective image signal components, and ii) adding the image signal components of the plurality of the image signals to one another to obtain an addition signal, the image signal components representing corresponding picture elements, wherein the addition signal is obtained by:

a) subjecting at least a single desired image signal of the plurality of the image signals to image processing which changes the frequency characteristics of the desired image signal, said changes of said frequency characteristics being based on said respective level of response of the at least a single desired image signal at each of a plurality of different frequency bands and also being based on said respective noise image signal dispersion, and b) adding the image signal which has been obtained from the image processing and the other image signals to one another.

16. A superposition processing method for a radiation image as defined in claim 15 wherein the image processing is the processing for carrying out the convolution of the desired image signal with a mask filter, which has predetermined frequency characteristics.

17. A superposition processing method for a radiation image as defined in claim 16 wherein the sum of the frequency characteristics of the mask filters employed for the plurality of the image signals is equal to 1 at an arbitrary frequency.

18. A superposition processing method for a radiation image as defined in claim 15, 16, or 17, wherein all of the plurality of the image signals are subjected to the image processing, which changes the frequency characteristics.

19. A superposition processing method for a radiation image, comprising the steps of:
   i) obtaining two image signals, which represent a radiation image of a single object or radiation images of the single object, and which have different frequency characteristics, each of the image signals being made up of a series of image signal components, and
   ii) adding the image signal components of the two image signals to one another, which image signal components represent corresponding picture elements, an addition signal being thereby obtained,
   wherein, such that the signal-to-noise ratio of the addition signal may be kept high, the addition signal is obtained by:
      a) obtaining a difference signal between the two image signals,
      b) carrying out the convolution of the difference signal with either one of two mask filters, which have predetermined frequency characteristics, the sum of the frequency characteristics of the two mask filters being equal to 1 at an arbitrary frequency, and
      c) adding the difference signal, which has been obtained from the convolution, and either one of the two image signals to each other.

20. An energy subtraction processing method comprising the steps of:
   i) forming a plurality of radiation images of a single object respectively with a plurality of kinds of radiation having different energy distributions, different images of at least part of the object being embedded in the plurality of the radiation images,
   ii) obtaining a plurality of image signals, each of which is made up of a series of image signal components, from the plurality of the radiation images,
   iii) weighting the image signal components of the plurality of the image signals, which image signal components represent corresponding picture elements in the plurality of radiation images, with predetermined weight factors, wherein, for each of the image signals, all the respective image signal components are identically weighted, and
   iv) subtracting the weighted image signal components of the plurality of the image signals from one another, which image signal components represent corresponding picture elements in the plurality of the radiation images, a difference signal representing an image of a specific structure of the object being thereby obtained,
   wherein the difference signal is obtained by:
      a) subjecting at least a single desired image signal to image processing which changes the frequency characteristics of the desired image signal, said image processing being based on a respective level of response and on a respective noise image signal dispersion of the at least a single desired image signal at each of a plurality of different frequency bands, and
      b) subtracting the image signal, which has been obtained from the image processing, and the other image signals, from one another.

21. An energy subtraction processing method as defined in claim 20 wherein the image processing is the processing for carrying out the convolution of the desired image signal with a predetermined mask filter.

22. An energy subtraction processing method as defined in claim 20 or 21 wherein all of the plurality of the image signals are subjected to the image processing, which changes the frequency characteristics.

23. A superposition processing method for a radiation image, comprising the steps of:
   i) obtaining a plurality of image signals, which represent a radiation image of a single object or radiation images of the single object, and which have different frequency characteristics, each of the image signals being made up of a series of image signal components, and
   ii) adding the image signal components of the plurality of the image signals to one another, which image signal components represent corresponding picture elements, an addition signal being thereby obtained,
   wherein the addition signal is obtained by:
      a) carrying out the convolution of at least a single desired image signal of the plurality of the image signals with a mask filter to provide a processed image signal, the mask filter having frequency characteristics based on a level of response of the at least a single desired image signal with respect to each frequency band thereof so that the mask filter keeps the signal-to-noise ratio of the addition signal high with respect to a desired frequency band and
      b) adding the processed image signal and the other image signals to one another to obtain the addition signal, wherein the addition signal has response characteristics which are altered as a result of the frequency characteristics of the mask filter.

24. A superposition processing method for a radiation image, comprising the steps of:
   i) obtaining a plurality of image signals, which represent a radiation image of a single object or radiation images of the single object, and which have different respective image signal frequency characteristics including different respective levels of response and different respective noise image signal dispersions, each of the image signals being made up of a series of image signal components, and
   ii) adding the image signal components of the plurality of the image signals to one another, which image signal components represent corresponding picture elements, an addition signal being thereby obtained,
   wherein the addition signal is obtained by:
      a) carrying out the convolution of at least a single desired image signal of the plurality of the image signals with a mask filter to provide a processed image signal, the mask filter having frequency characteristics based on said respective level of response and based on said respective noise image signal dispersion of the at least a single desired image signal, and b) adding the processed image signal and the other image signals to one another to obtain the addition signal, wherein the addition signal has response characteristics which are altered as a result of the frequency characteristics of the mask filter;

wherein each of the plurality of the image signals is obtained by scanning a sheet-like recording medium, on which the radiation image has been recorded, with a light beam in the main scanning direction and the sub-scanning direction, the radiation image being thereby read out photoelectrically; and wherein the processed image signal is obtained by carrying out the convolution of the desired image signal with the mask filter, which has different frequency characteristics with respect to the main scanning direction and the sub-scanning direction, such that the frequency response characteristics of the addition signal with respect to the main scanning direction and the frequency response characteristics of the addition signal with respect to the sub-scanning direction may become approximately identical with each other.

25. A superposition processing method for a radiation image as defined in claim 24, wherein the processing with the convolution is carried out on all of the plurality of the image signals.

26. An energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of radiation images, with predetermined weight factors, wherein, for each of the image signals, all the respective image signal components are identically weighted, and iv) subtracting the weighted image signal components of the plurality of the image signals from one another, which image signal components represent corresponding picture elements in the plurality of the radiation images, a difference signal representing an image of a specific structure of the object being thereby obtained, wherein the difference signal is obtained by:

a) carrying out the convolution of at least a single desired image signal of the plurality of the image signals with a mask filter to provide a processed image signal, the mask filter having frequency characteristics based on a respective level of response and on a respective noise image signal dispersion of the at least a single desired image signal at each of a plurality of different frequency bands thereof so that the mask filter keeps the signal-to-noise ratio of the difference signal high with respect to a desired one of said plurality of different frequency bands and b) subtracting the processed image signal and the other image signals from one another to obtain the difference signal, wherein the difference signal has response characteristics which are altered as a result of the frequency characteristics of the mask filter.

27. An energy subtraction processing method comprising the steps of:

i) forming a plurality of radiation images of a single object respectively with a plurality of kinds of radiation having different energy distributions, different images of at least part of the object being embedded in the plurality of the radiation images, ii) obtaining a plurality of image signals, each of which is made up of a series of image signal components, from the plurality of the radiation images, iii) weighting the image signal components of the plurality of the image signals, which image signal components represent corresponding picture elements in the plurality of radiation images, with predetermined weight factors, and iv) subtracting the weighted image signal components of the plurality of the image signals from one another, which image signal components represent corresponding picture elements in the plurality of the radiation images, a difference signal representing an image of a specific structure of the object being thereby obtained, wherein the difference signal is obtained by:

a) carrying out the convolution of at least a single desired image signal of the plurality of the image signals with a mask filter to provide a processed image signal, the mask filter having frequency characteristics based on a respective level of response and on a respective noise image signal dispersion of the at least a single desired image signal at each of a plurality of different frequency bands thereof so that the mask filter keeps the signal-to-noise ratio of the difference signal high with respect to a desired one of said plurality of different frequency bands and b) subtracting the processed image signal and the other image signals from one another to obtain the difference signal, wherein the difference signal has response characteristics which are altered as a result of the frequency characteristics of the mask filter;

wherein each of the plurality of the image signals is obtained by scanning a sheet-like recording medium, on which the radiation image has been recorded, with a light beam in the main scanning direction and the sub-scanning direction, the radiation image being thereby read out photoelectrically; and wherein the processed image signal is obtained by carrying out the convolution of the desired image signal with the mask filter, which has different frequency characteristics with respect to the main scanning direction and the sub-scanning direction, such that the frequency response characteristics of the difference signal with respect to the main scanning direction and the frequency response characteristics of the difference signal with respect to the sub-scanning direction become approximately identical with each other.

28. An energy subtraction processing method as defined in claim 27, wherein the processing with the convolution is carried out on all of the plurality of the image signals.

29. A superposition processing method for a radiation image, comprising the steps of:

i) obtaining a plurality of image signals, which represent a radiation image of a single object or radiation images of the single object having been formed by delivering radiation to the single object, and which have different frequency characteristics, each of the image signals being made up of a series of image signal components, and ii) adding the image signal components of the plurality of the image signals to one another, which image signal components represent corresponding picture elements, an addition signal being thereby obtained, wherein the addition signal is obtained by:
- a) calculating the dose of radiation delivered to the object,
- b) setting a mask filter for at least a single desired image signal, which is among the plurality of the image signals, in accordance with the calculated dose of radiation, said mask filter being based on a respective level of response and on a noise image signal dispersion of the at least a single desired image signal at each of a plurality of different frequency bands thereof, the mask filter having frequency characteristics capable of keeping the signal-to-noise ratio of the addition signal high when the addition signal is obtained by adding an image signal, that is obtained from the convolution of the desired image signal, and the other image signals to one another,
- c) carrying out the convolution of the desired image signal with the mask filter, and
- d) adding the image signal, which has been obtained from the convolution, and the other image signals to one another.

30. A superposition processing method for a radiation image as defined in claim 29 wherein the sum of the frequency characteristics of the mask filters, which are employed for the plurality of the image signals, is equal to 1 at an arbitrary frequency.

31. A superposition processing method for a radiation image as defined in claim 29 or 30 wherein the dose of radiation is calculated for each of portions of the object, the patterns of which are embedded in the radiation image, the mask filter is set for each of the portions of the object in accordance with the calculated dose of radiation, and the convolution of the desired image signal is carried out with the mask filter, which has been set for each of the portions of the object.

32. A superposition processing method for a radiation image as defined in claim 29 or 30 wherein the processing with the convolution is carried out on all of the plurality of the image signals.

33. A superposition processing method for a radiation image as defined in claim 31 wherein the processing with the convolution is carried out on all of the plurality of the image signals.

34. An energy subtraction processing method comprising the steps of:
- i) forming a plurality of radiation images of a single object respectively with a plurality of kinds of radiation having different energy distributions, different images of at least part of the object being embedded in the plurality of the radiation images,
- ii) obtaining a plurality of image signals, each of which is made up of a series of image signal components, from the plurality of the radiation images,
- iii) weighting the image signal components of the plurality of the image signals, which image signal components represent corresponding picture elements in the plurality of radiation images, with predetermined weight factors, wherein, for each of the image signals, all the respective image signal components are identically weighted, and
- iv) subtracting the weighted image signal components of the plurality of the image signals from one another, which image signal components represent corresponding picture elements in the plurality of the radiation images, a difference signal representing an image of a specific structure of the object being thereby obtained, wherein the difference signal is obtained by:
- a) calculating the dose of radiation delivered to the object,
- b) setting a mask filter for at least a single desired image signal, which is among the plurality of the image signals, in accordance with the calculated dose of radiation, said mask filter being based on a respective level of response and on a respective noise image signal dispersion of the at least a single desired image signal at each of a plurality of different frequency bands thereof, the mask filter having frequency characteristics capable of keeping the signal-to-noise ratio of the difference signal high when the difference signal is obtained by subtracting an image signal, that is obtained from the convolution of the desired image signal, and the other image signals from one another,
- c) carrying out the convolution of the desired image signal with the mask filter, and
- d) subtracting the image signal, which has been obtained from the convolution, and the other image signals from one another.

35. An energy subtraction processing method as defined in claim 34 wherein the dose of radiation is calculated for each of portions of the object, the patterns of which are embedded in the radiation image, the mask filter is set for each of the portions of the object in accordance with the calculated dose of radiation, and the convolution of the desired image signal is carried out with the mask filter, which has been set for each of the portions of the object.

36. An energy subtraction processing method as defined in claim 34 or 35 wherein the processing with the convolution is carried out on all of the plurality of the image signals.

37. An energy subtraction processing method as defined in claim 36 wherein the sum of the frequency characteristics of the mask filters, which are employed for the plurality of the image signals, is equal to 1 at an arbitrary frequency.

38. A method of combining a plurality of radiation images of a radiated object which are to be combined to produce a single combined radiation image, each of said plurality of radiation images having respective image components, said method comprising the steps of:
- (a) recording a respective contrast transfer chart for each of said plurality of radiation images, said respective contrast transfer chart representing levels of resolution of each of said plurality of radiation images with respect to a plurality of frequency bands;
- (b) determining a respective modulation transfer function for each of said plurality of radiation images based on said respective contrast transfer chart;
- (c) calculating respective frequency characteristics for noise for each of said plurality of radiation images on the basis of said respective modulation transfer function;
- (d) calculating a respective DQE index for each of said plurality of radiation images at each of said plurality of frequency bands based on said respective frequency characteristics;
- (e) determining an optimum combination ratio that provides the largest said DQE index for said plurality of radiation images;

(f) for each of said frequency bands, weighting said respective image components of one or more of said plurality of radiation signals in accordance with said optimum combination ratio to provide respective weighted image components; and then (g) providing said single combined radiation image by combining:
all of said respective weighted image components, and
any of said respective image components not weighted in said step (f).

39. The method of combining a plurality of radiation images as set forth in claim 38, wherein said combining in step (g) is accomplished by addition, and said single combined radiation image is a superposition of said plurality of radiation images.

40. The method of combining a plurality of radiation images as set forth in claim 38, wherein said combining in step (g) is accomplished by subtraction, and said single combined radiation image represents an image of only a specific structure included in said plurality of radiation images.

41. The method of combining a plurality of radiation images as set forth in claims 39 or 40, wherein said weighting of said step (f) is accomplished by:

performing signal processing which changes said frequency characteristics of said one or more of said plurality of radiation images.

42. The method of combining a plurality of radiation images as set forth in claims 39 or 40, wherein said weighting of said step (f) is accomplished by carrying out the convolution of said at least one of said plurality of radiation images with a mask filter which has frequency characteristics in accordance with said optimum combination ratio.

43. The method of combining a plurality of radiation images as set forth in claims 39 or 40, wherein said weighting of said step (f) is accomplished by the steps of:

calculating the dose of radiation delivered to said radiated object;

setting a mask filter for said at least one of said plurality of radiation images on the basis of said dose of radiation and said optimum combination ratio; and carrying out the convolution of said at least one of said plurality of radiation images with said mask filter.

* * * * *